(12) United States Patent
Ikenaga et al.

(10) Patent No.: US 7,728,078 B2
(45) Date of Patent: Jun. 1, 2010

(54) PROPYLENE COPOLYMER, POLYPROPYLENE COMPOSITION AND USES THEREOF, TRANSITION METAL COMPOUND AND OLEFIN POLYMERIZATION CATALYST

(75) Inventors: Shigenobu Ikenaga, Sodegaura (JP); Keiji Okada, Sodegaura (JP); Hiroshi Hoya, Ichihara (JP); Norihide Inoue, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/185,547

(22) Filed: Aug. 4, 2008

(65) Prior Publication Data

US 2009/0043050 A1 Feb. 12, 2009

Related U.S. Application Data

(62) Division of application No. 10/550,017, filed as application No. PCT/JP03/16972 on Dec. 26, 2003, now Pat. No. 7,488,789.

(30) Foreign Application Priority Data

Mar. 28, 2003 (JP) .............................. 2003-090161

(51) Int. Cl.
C08F 210/06 (2006.01)
C08F 210/08 (2006.01)
C08F 4/6592 (2006.01)
B32B 27/00 (2006.01)

(52) U.S. Cl. ...................... 525/240; 526/160; 526/165; 526/348; 526/348.6; 428/34.9; 428/515; 428/516

(58) Field of Classification Search ................ 525/240; 526/160, 165, 348.6, 348; 428/34.9, 515, 428/516

See application file for complete search history.

(56) References Cited

U.S. PATENT DOCUMENTS

| 5,036,034 | A | 7/1991 | Ewen |
| 5,084,534 | A | 1/1992 | Welborn, Jr. et al. |
| 5,416,228 | A | 5/1995 | Ewen et al. |
| 5,468,809 | A | 11/1995 | Ghisellini et al. |
| 5,998,039 | A | 12/1999 | Tanizaki et al. |
| 6,316,558 | B1 | 11/2001 | Kaneko et al. |
| 6,515,086 | B1 | 2/2003 | Razavi |
| 6,559,089 | B1 | 5/2003 | Razavi et al. |
| 2003/0195299 | A1 | 10/2003 | Stevens et al. |

FOREIGN PATENT DOCUMENTS

| EP | 0 791 626 A1 | 8/1997 |
| EP | 0 791 627 | 8/1997 |
| EP | 1 008 626 | 6/2000 |
| EP | 1138687 A1 | 10/2001 |
| EP | 1 275 670 A1 | 1/2003 |
| JP | 37-8483 B1 | 7/1962 |
| JP | 54-114887 A | 9/1979 |
| JP | 61-42626 B | 9/1986 |
| JP | 62-119212 A | 5/1987 |
| JP | 03-193796 A | 8/1991 |
| JP | 06-122718 A | 5/1994 |
| JP | 8-176218 A | 7/1996 |
| JP | 8-208909 A | 8/1996 |
| JP | 08-238733 A | 9/1996 |
| JP | 8-283343 A | 10/1996 |
| JP | 10-120733 A | 5/1998 |
| JP | 10-226694 A | 8/1998 |
| JP | 10-298221 A | 11/1998 |
| JP | 2000-198892 A | 7/2000 |
| JP | 2001-526730 A | 12/2001 |
| JP | 2002-510358 A | 4/2002 |
| JP | 2003-49044 A | 2/2003 |
| WO | WO-98/54230 | 12/1998 |
| WO | WO-99/02569 A1 | 1/1999 |
| WO | WO-01/27124 A1 | 4/2001 |

OTHER PUBLICATIONS

Kaminsky et al., Angew. Chem. Int. Ed. Engl. 24 (1985) No. 6, p. 507.
Ewen et al., J. Am. Chem. Soc. 1988, 110, p. 6255.
Miller et al., Organometallics 2002, 21, p. 934.
Office Action for Co-Pending U.S. Appl. No. 12/185,562 issued Dec. 17, 2009.

*Primary Examiner*—Caixia Lu
(74) *Attorney, Agent, or Firm*—Birch, Stewart, Kolasch & Birch, LLP

(57) ABSTRACT

A polypropylene composition containing a propylene/1-butene random copolymer which contains 60 to 90 mol % of propylene units and 10 to 40 mol % of 1-butene units and has a triad isotacticity of not less than 85% and not more than 97.5%, a molecular weight distribution of from 1 to 3, an intrinsic viscosity of from 0.1 to 12 dl/g, a melting point of from 40 to 75° C. and a crystallization rate at 45° C. of 10 minutes or less, and satisfying the following relation, 146 exp $(-0.022M) \geq Tm \geq 125$ exp $(-0.032M)$, and an olefin catalyst for preparation thereof.

3 Claims, 1 Drawing Sheet

PROPYLENE COPOLYMER, POLYPROPYLENE COMPOSITION AND USES THEREOF, TRANSITION METAL COMPOUND AND OLEFIN POLYMERIZATION CATALYST

CROSS-REFERENCE TO RELATED APPLICATIONS

The present application is a 37 CFR §1.53(b) divisional of U.S. application Ser. No. 10/550,017 filed Jun. 29, 2006, which claims priority on PCT International Application No. PCT/JP03/16972 filed Dec. 26, 2003, which in turn claims priority on Japanese Application No. 2003-090161 filed Mar. 28, 2003. Each of these applications is hereby incorporated by reference.

FIELD OF THE INVENTION

The present invention relates to a propylene/1-butene random copolymer, a propylene elastomer, a polypropylene composition containing the propylene/1-butene random copolymer, a sheet, a film and an oriented film comprising the polypropylene composition, and a polypropylene composite film that includes a layer comprising the polypropylene composition.

The present invention is also relates to a transition metal compound that has a novel and specific structure effective as a component for olefin polymerization catalyst, and an olefin polymerization catalyst containing the transition metal compound.

Further, the present invention relates to a polyolefin resin composition, and more particularly to a polyolefin resin composition comprising a specific propylene polymer and a specific elastomer.

BACKGROUND OF THE INVENTION

Polypropylenes are versatile thermoplastic molding materials with excellent properties, including high stiffness, heat resistance and transparency. On the other hand, the flexibility and impact resistance of polypropylenes are inadequate so that they are generally incorporated with soft rubber components. Although incorporation of soft rubber components compensates for the insufficient flexibility and impact resistance of polypropylenes, the resultant polypropylene compositions have lowered heat resistance. Further, such polypropylene compositions are required to have improved low-temperature heat-sealability.

Accordingly, there has been a demand for a polypropylene composition that has excellent flexibility and impact resistance as well as sufficient heat resistance and low-temperature heat-sealability.

Meanwhile, crystalline polypropylenes have excellent mechanical properties including tensile strength, stiffness, surface hardness and impact strength; optical properties including gloss and transparency; and food sanitation properties including nontoxicity and odorlessness. These properties provide wide applications particularly for food packaging purposes. However, single layer films consisting of the crystalline polypropylenes shrink at heat seal temperatures so that difficulties are caused in heat sealing such films. Therefore, the crystalline polypropylene films are generally combined with a heat-sealing layer that comprises a polymer such as a low-density polyethylene or a propylene/ethylene random copolymer.

The heat-sealing layers made from such polymers are required:

(1) to be heat-sealable at considerably lower temperatures than are the substrate films (crystalline polypropylene films);
(2) to have high heat-sealing strength of little deterioration with time;
(3) to have good adhesion to the substrate films;
(4) to be as transparent as or more transparent than the substrate films;
(5) to cause no blocking during storage;
(6) not to adhere to bag-making machines or jigs of filling and packaging machinery; and
(7) to have superior scratch resistance.

However, traditional heat-sealing materials do not satisfy all these properties. For example, low-density polyethylene films, although heat-sealable at low temperatures, have poor heat-sealing strength, bad adhesion to the substrate films and low transparency, and are also liable to adhere to packaging jigs.

Propylene/ethylene random copolymers can meet the above properties (2) to (7) but fail to satisfy the property (1). Therefore, the polypropylene composite films that include a heat-sealing layer comprising a propylene/ethylene random copolymer have a narrow range of heat-seal temperatures. Accordingly, heat sealing of these composite films by automatic packaging or bag-making machines requires strict control of the heat seal temperatures. Other materials proposed so far for the heat-sealing materials include blends of the propylene/ethylene random copolymers with ethylene/α-olefin copolymers. Such blends have improved low-temperature heat-sealability relative to the propylene/ethylene random copolymers, but their transparency is inferior.

The present applicant has found that a propylene/1-butene random copolymer which contains 55 to 85 wt % propylene and has a crystalline heat of fusion between 20 and 80 J/g as measured on a differential scanning calorimeter, is effectively used as a heat-sealing material because of its high transparency and excellent low-temperature heat-sealability. The present applicant has proposed a heat-sealing layer for polypropylene films that is formed from a composition which comprises the propylene/1-butene random copolymer in an amount of 50 wt % or more and an isotactic polypropylene (JP-A-S54-114887). The heat-sealing layer comprising the above composition has excellent low-temperature heat-sealability and blocking resistance, but is rather inferior in blocking and scratch resistances to the heat-sealing layers from the propylene/ethylene random copolymers. The present applicant has also proposed a composite film with excellent heat-sealability (JP-B-S61-42626); the composite film comprises an isotactic polypropylene film and a heat-sealing layer that comprises a composition containing the propylene/1-butene copolymer in an amount of 10 to 40 wt % and a crystalline propylene/α-olefin random copolymer.

Moreover, these polypropylene films need further improvements to meet the demand for higher-speed packaging. For example, excellent slip properties and blocking resistance as well as enhanced low-temperature heat-sealability are required.

JP-A-H08-238733 discloses a composite film that includes a heat-sealing layer comprising a metallocene-catalyzed propylene/1-butene copolymer and a crystalline propylene/α-olefin random copolymer. This reference has a problem that when the propylene/1-butene copolymer has a melting point of around 70° C., crystallization rate is lowered to cause bad productivity. Also, the moldability and the appearance of the film are more deteriorated when the propylene/1-butene copolymer has a large amount.

Metallocene compounds are of much interest recently as homogenous catalysts for olefin polymerization. Olefin polymerization with use of the metallocene compounds, particularly stereoregular polymerization of α-olefins, has been studied by many since the report of isotactic polymerization by W. Kaminsky, et al. (Angew. Chem. Int. Ed. Engl., 24, 507 (1985)).

In α-olefin polymerization using the metallocene compounds, it has been found that the stereoregularity and the molecular weights of resultant α-olefin polymers are widely varied by use of the compounds in which a substituent group is introduced into a cyclopentadienyl ring of a ligand or in which two cyclopentadienyl rings are bridged.

For example, propylene polymerization in the presence of a metallocene compound having a ligand in which a cyclopentadienyl ring and a fluorenyl ring are bridged, will yield stereoregular polymers such as:

syndiotactic polypropylenes when the polymerization is catalyzed by dimethylmethylene(cyclopentadienyl)(fluorenyl)zirconium dichloride (J. Am. Chem. Soc., 110, 6255 (1988));

hemiisotactic polypropylenes under catalysis by the above compound with introduction of a methyl group into the third position of the cyclopentadienyl ring, i.e., under catalysis by dimethylmethylene(3-methylcyclopentadienyl)(fluorenyl) zirconium dichloride (JP-A-H03-193796); and isotactic polypropylenes under catalysis by the above compound with introduction of a tert-butyl group into the third position of the cyclopentadienyl ring, i.e., under catalysis by dimethylmethylene(3-tert-butylcyclopentadienyl)(fluorenyl)zirconium dichloride (JP-A-H06-122718). Further, dimethylmethylene(3-tert-butyl-5-methylcyclopentadienyl) (fluorenyl)zirconium dichloride can catalyze polymerization of propylene to provide higher isotacticity when tert-butyl groups are introduced into the third and sixth positions of the fluorenyl ring (i.e., dimethylmethylene(3-tert-butyl-5-methylcyclopentadienyl)(3,6-di-tert-butylfluorenyl)zirconium dichloride) (WO01/27124).

With respect to the influence on the molecular weights:

dimethylmethylene(cyclopentadienyl)(fluorenyl)zirconium dichloride can produce syndiotactic polypropylenes having higher molecular weights when the bridging group between the cyclopentadienyl ring and fluorenyl ring is altered to a diphenylmethylene group (i.e., diphenylmethylene (cyclopentadienyl)(fluorenyl)zirconium dichloride) (JP-A-H02-274703);

dimethylmethylene(3-(2-adamantyl)-cyclopentadienyl) (fluorenyl)zirconium dichloride can produce isotactic-hemi-isotactic polypropylenes having higher molecular weights when the bridging group is altered to a diphenylmethylene group (i.e., diphenylmethylene(3-(2-adamantyl)-cyclopentadienyl)(fluorenyl)zirconium dichloride) (Organometallics, 21, 934 (2002)); and dimethylmethylene(3-tert-butylcyclopentadienyl)(fluorenyl)zirconium dichloride can produce isotactic polypropylenes having higher molecular weights when a methyl group is introduced into the fifth position of the cyclopentadienyl ring (i.e., dimethylmethylene(3-tert-butyl-5-methylcyclopentadienyl)(fluorenyl)zirconium dichloride) (JP-A-2001-526730).

Contrary, polypropylenes with lower molecular weights result when substituent groups are introduced into two adjacent positions in the cyclopentadienyl ring of a catalyst component (JP-A-2001-526730 and JP-A-H10-226694); for example, dimethylmethylene(3-tert-butyl-2-methylcyclopentadienyl)(fluorenyl)zirconium dichloride and diphenylmethylene(3,4-dimethylcyclopentadienyl)(fluorenyl)zirconium dichloride can catalyze polymerization so as to give lower molecular weight polypropylenes relative to dimethylmethylene(3-tert-butyl-5-methylcyclopentadienyl)(fluorenyl)zirconium dichloride and diphenylmethylene (3-methylcyclopentadienyl)(fluorenyl)zirconium dichloride, respectively.

Meanwhile, synthesis of metallocene compounds that have a ligand in which a cyclopentadienyl group with substituent groups at two non-adjacent positions (e.g. third and fifth positions) and a fluorenyl group are bridged via an (alkyl) (aryl)methylene group or a diarylmethylene group, has been unsuccessful. This is attributed to the troublesome preparation of such ligand by the established method due to difficult reaction between a fluorene metal salt and a 6,6-diphenylfulvene derivative whose five-membered ring is substituted with such as an electron-donating hydrocarbon group. Furthermore, such selective introduction of substituent groups into two non-adjacent positions is difficult with the method disclosed in JP-A-H10-226694.

In general, the polymerization catalysts containing the metallocene compounds are required for further improvements in terms of polymerization activity, stereoregularity and molecular weight control. In particular, a polymerization catalyst that contains a metallocene compound as described in JP-A-H10-298221 can copolymerize ethylene and propylene while avoiding fouling, but the resultant copolymer has a remarkably lower molecular weight than a propylene homopolymer obtained with the catalyst.

Also, a polymerization catalyst that contains a metallocene compound as described in JP-A-H10-120733 copolymerizes ethylene and propylene to provide a higher molecular weight copolymer with no fouling. However, since this polymerization catalyst essentially requires a specific combination of an ionic compound and a metallocene compound, its versatility is rather limited.

As described above, olefin polymerization, for example copolymerization of ethylene and propylene, with these catalysts containing the metallocene compounds, has been almost unable to produce polymers having high molecular weights.

The present invention aims at solving the aforesaid problems. The present inventors have developed a novel transition metal compound useful as an olefin polymerization catalyst component that has a ligand in which a cyclopentadienyl ring with substituent groups at two non-adjacent positions and a fluorenyl ring are bridged via an aryl-substituted carbon atom, and also an olefin polymerization catalyst containing the transition metal compound. The present invention has been accomplished based on these findings.

Polyolefin resins, such as propylene block copolymers, have many applications including daily necessities, kitchenware, packaging films, home electric appliances, machine parts, electrical parts and automobile parts. These products and parts are mainly manufactured by injection molding due to high productivity. When resin compositions that contain propylene block copolymers are injection molded, circular ripples, called flow marks or tiger marks, occur on molded articles in the cross-flow direction. Noticeable flow marks on surfaces deteriorate the appearance of the molded articles so that they are concealed by painting or the like according to need. To cover up or obscure the flow marks on the molded articles obtained from the resin compositions containing propylene block copolymers, the resin compositions are injected into a high-temperature mold. However, this process requires a special mold and also the molding cycle is prolonged, causing productivity problems.

On the other hand, JP-A-H10-1573 discloses a composition comprising a metallocene-catalyzed propylene block copolymer and an α-olefin copolymer rubber. The metallocene-catalyzed propylene block copolymers have low crystallinity due to an approximate 1% of occurrence of 1,3-insertion or 2,1-insertion of propylene monomer. As a result, their melting points fall around 150° C., while propylene block copolymers prepared using titanium catalysts have melting points of 160° C. or several degrees higher. Further, the metallocene-catalyzed propylene block copolymers have lower tensile strength and flexural strength properties and stiffness than propylene block copolymers prepared with use of titanium catalysts. Therefore, practical use of the compositions comprising the metallocene-catalyzed propylene block copolymers and α-olefin copolymer rubbers has been unrealized due to their inferior mechanical strength properties to the compositions comprising titanium-catalyzed propylene block copolymers and α-olefin copolymer rubbers.

DISCLOSURE OF THE INVENTION

The present invention has objects of providing a propylene/1-butene random copolymer that has excellent flexibility, impact resistance, heat resistance and low-temperature heat-sealability, a polypropylene composition comprising the propylene/1-butene random copolymer, and a polypropylene composite film that can be obtained with good moldability and has superior transparency, low-temperature heat-sealability, blocking resistance and mechanical strength such as scratch resistance.

The propylene/1-butene random copolymer (PBR) according to the present invention has:

(1) a content of propylene-derived units of 60 to 90 mol % and a content of 1-butene-derived units of 10 to 40 mol %;

(2) a triad isotacticity of 85 to 97.5% as determined from a $^{13}$C-NMR spectrum;

(3) a molecular weight distribution (Mw/Mn) of 1 to 3 as measured by gel permeation chromatography (GPC);

(4) an intrinsic viscosity of 0.1 to 12 dl/g as measured in decalin at 135° C.;

(5) a melting point (Tm) of 40 to 120° C. as measured on a differential scanning calorimeter; and (6) a relation between the melting point (Tm) and the content (M) of 1-butene constituent units (mol %) of:

$$146 \exp(-0.022M) \geq Tm \geq 125 \exp(-0.032M).$$

The polypropylene composition (CC-1) according to the invention comprises 5 to 95 wt % of a polypropylene (PP-A) and 95 to 5 wt % of a propylene/1-butene random copolymer (PBR), the propylene/1-butene random copolymer (PBR) having:

(1) a content of propylene-derived units of 60 to 90 mol % and a content of 1-butene-derived units of 10 to 40 mol %;

(2) a triad isotacticity of 85 to 97.5% as determined from a $^{13}$C-NMR spectrum;

(3) a molecular weight distribution (Mw/Mn) of 1 to 3 as measured by gel permeation chromatography (GPC);

(4) an intrinsic viscosity of 0.1 to 12 dl/g as measured in decalin at 135° C.;

(5) a melting point (Tm) of 40 to 120° C. as measured on a differential scanning calorimeter; and (6) a relation between the melting point (Tm) and the content (M) of 1-butene constituent units (mol %) of:

$$146 \exp(-0.022 M) \geq Tm \geq 125 \exp(-0.032 M).$$

The polypropylene composite film according to the present invention comprises a crystalline polypropylene layer (I) and a polypropylene composition layer (II) disposed on at least one surface of the crystalline polypropylene layer (I), the polypropylene composition layer (II) comprising a polypropylene composition (CC-2) that comprises 0 to 95 wt % of a crystalline polypropylene (PP-A) and 5 to 100 wt % of a propylene/1-butene random copolymer (PBR), the propylene/1-butene random copolymer (PBR) having:

(1) a content of propylene-derived units of 60 to 90 mol % and a content of 1-butene-derived units of 10 to 40 mol %;

(2) a triad isotacticity of 85 to 97.5% as determined from a $^{13}$C-NMR spectrum;

(3) a molecular weight distribution (Mw/Mn) of 1 to 3 as measured by gel permeation chromatography (GPC);

(4) an intrinsic viscosity of 0.1 to 12 dl/g as measured in decalin at 135° C.;

(5) a melting point (Tm) of 40 to 120° C. as measured on a differential scanning calorimeter; and (6) a relation between the melting point (Tm) and the content (M) of 1-butene constituent units (mol %) of:

$$146 \exp(-0.022 M) \geq Tm \geq 125 \exp(-0.032 M).$$

The propylene/1-butene random copolymer (PBR) is preferably obtained by copolymerizing propylene and 1-butene in the presence of an olefin polymerization catalyst that comprises:

(1a) a transition metal compound, (1b) an organoaluminum oxy-compound, and/or (2b) a compound capable of forming an ion pair by reacting with the transition metal compound (1a), and optionally (c) an organoaluminum compound; the transition metal compound (1a) having the formula (1a):

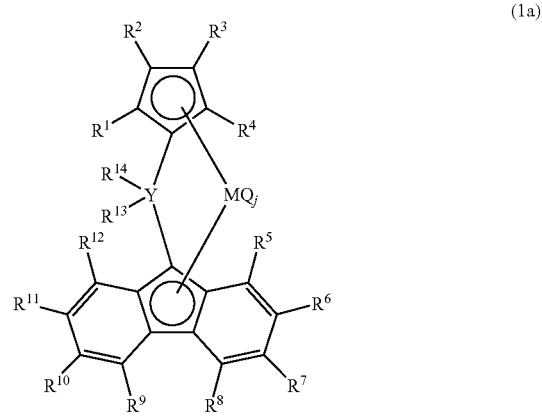

(1a)

wherein $R^3$ is a hydrocarbon group or a silicon-containing group; $R^1$, $R^2$ and $R^4$, which may be the same or different, are each a hydrogen atom, a hydrocarbon group or a silicon-containing group; $R^5$, $R^6$, $R^7$, $R^8$, $R^9$, $R^{10}$, $R^{11}$, $R^{12}$ and $R^{13}$ which may be the same or different, are each a hydrogen atom, a hydrocarbon group or a silicon-containing group; neighboring substituent groups of $R^5$ to $R^{12}$ may link together to form a ring; $R^{13}$ and $R^{14}$, which may be the same or different, may link together to form a ring; M denotes a Group-4 transition metal; Y denotes a carbon atom; Q denotes a halogen atom, a hydrocarbon group, an anionic ligand or a neutral ligand capable of coordination by a lone pair of electrons, and may be the same or different when plural; and j is an integer of 1 to 4.

The sheet or film according to the present invention comprises the polypropylene composition.

The oriented film of the present invention is obtained by orienting the sheet, film or composite film in at least one direction.

The propylene elastomer (PBER) according to the present invention contains (I):

(a) propylene-derived units in an amount of 50 to 85 mol %, (b) 1-butene-derived units in an amount of 5 to 25 mol %, and (c) ethylene-derived units in an amount of 10 to 25 mol %, with the propylene-derived units and the ethylene-derived units having a molar ratio of 89/11 to 70/30 (propylene content/ethylene content); and has a modules in tension (YM) of 40 MPa or less as measured in accordance with JIS 6301.

The propylene elastomer (PBER) is preferably obtained by copolymerizing propylene, ethylene and 1-butene in the presence of an olefin polymerization catalyst that comprises:

(1a) a transition metal compound, (1b) an organoaluminum oxy-compound, and/or (2b) a compound capable of forming an ion pair by reacting with the transition metal compound (1a), and optionally (c) an organoaluminum compound; the transition metal compound (1a) having the formula (1a):

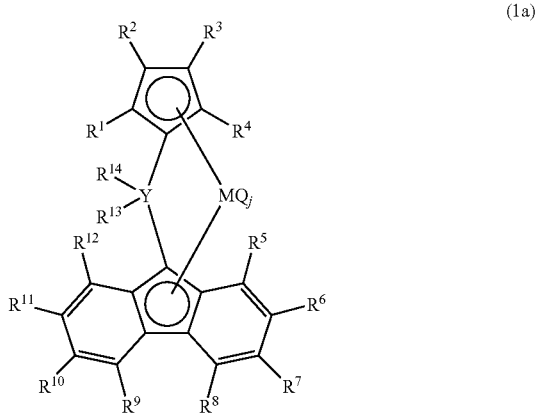

(1a)

wherein $R^3$ is a hydrocarbon group or a silicon-containing group; $R^1$, $R^2$ and $R^4$, which may be the same or different, are each a hydrogen atom, a hydrocarbon group or a silicon-containing group; $R^5$, $R^6$, $R^7$, $R^8$, $R^9$, $R^{10}$, $R^{11}$, $R^{12}$, $R^{13}$ and $R^{14}$ which may be the same or different, are each a hydrogen atom, a hydrocarbon group or a silicon-containing group; neighboring substituent groups of $R^5$ to $R^{12}$ may link together to form a ring; $R^{13}$ and $R^{14}$, which may be the same or different, may link together to form a ring; M denotes a Group-4 transition metal; Y denotes a carbon atom; Q denotes a halogen atom, a hydrocarbon group, an anionic ligand or a neutral ligand capable of coordination by a lone pair of electrons, and may be the same or different when plural; and j is an integer of 1 to 4.

The present invention has other objects of providing a novel transition metal compound useful as an olefin polymerization catalyst component, an olefin polymerization catalyst that contains the transition metal compound, and a process for producing high molecular weight olefin polymers.

The transition metal compound according to the present invention is represented by the formula (2a):

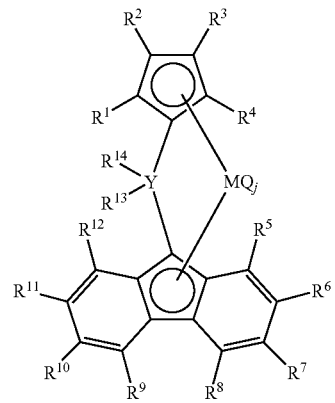

(2a)

wherein $R^1$ and $R^3$ are each a hydrogen atom; $R^2$ and $R^4$, which may be the same or different, are each a hydrocarbon group or a silicon-containing group; $R^5$, $R^6$, $R^7$, $R^8$, $R^9$, $R^{10}$, $R^{11}$, $R^{12}$ and $R^{13}$, which may be the same or different, are each a hydrogen atom, a hydrocarbon group or a silicon-containing group; neighboring substituent groups of $R^5$ to $R^{12}$ may link together to form a ring; $R^{14}$ is an aryl group; $R^{13}$ and $R^{14}$, which may be the same or different, may link together to form a ring; M denotes a Group-4 transition metal; Y denotes a carbon atom; Q denotes a halogen atom, a hydrocarbon group, an anionic ligand or a neutral ligand capable of coordination by a lone pair of electrons, and may be the same or different when plural; and j is an integer of 1 to 4.

The transition metal compound (3a) according to the present invention has the formula (2a) in which both $R^{13}$ and $R^{14}$ are aryl groups.

The olefin polymerization catalyst according to the present invention comprises (A) the transition metal compound (2a) or (3a) and (B) at least one compound selected from:

(B-1) an organometallic compound, (B-2) an organoaluminum oxy-compound, and (B-3) a compound capable of forming an ion pair by reacting with the transition metal compound (A).

The process for producing olefin polymers according to the present invention comprises polymerizing one or more monomers selected from ethylene and α-olefins in the presence of the olefin polymerization catalyst, wherein at least one monomer is ethylene or propylene.

In the process for producing olefin polymers, the transition metal compound (2a) or (3a) is preferably used in a supported form on a carrier.

The olefin polymerization catalyst containing the aforesaid transition metal compound can polymerize one or more monomers selected from ethylene and α-olefins to yield olefin copolymers having remarkably high molecular weights. The one or more monomers essentially contain at least either ethylene or propylene.

In consideration of the above-mentioned background art, the present invention has further objects of providing a polyolefin resin composition that comprises a specific propylene polymer and a specific elastomer, and uses of the polyolefin resin composition.

The polyolefin resin composition according to the present invention comprises a propylene polymer (PP-C) and at least one elastomer selected from metallocene-catalyzed elastomers (EL-1) to (EL-4) and contains the elastomer(s) in an amount of 10 parts by weight or more based on 100 parts by weight of the propylene polymer (PP-C); wherein:

the elastomer (EL-1) is a propylene/ethylene random copolymer that has:

I) contents of propylene-derived constituent units and of ethylene-derived constituent units in a molar ratio of 80/20 to 20/80;

II) an intrinsic viscosity [η] of 1.5 dl/g or more;

III) a ratio (Mw/Mn) of 1.0 to 3.5 in terms of a weight-average molecular weight (Mw) to a number-average molecular weight (Mn) as measured by gel permeation chromatography (GPC); and IV) a ratio of 1.0 mol % or less in terms of irregularly bonded propylene monomers based on 2,1-insertion to all the propylene constituent units as determined from a $^{13}$C-NMR spectrum;

the elastomer (EL-2) is a random copolymer of ethylene and an α-olefin of 4 to 20 carbon atoms that has:

I) contents of ethylene-derived constituent units and of α-olefin-derived constituent units in a molar ratio of 80/20 to 20/80;

II) an intrinsic viscosity [η] of 1.5 dl/g or more;

III) a ratio (Mw/Mn) of 1.0 to 3.5 in terms of a weight-average molecular weight (Mw) to a number-average molecular weight (Mn) as measured by gel permeation chromatography (GPC); and IV) a ratio of 1.0 mol % or less in terms of irregularly bonded α-olefin monomers based on 2,1-insertion to all the α-olefin constituent units as determined from a $^{13}$C-NMR spectrum;

the elastomer (EL-3) is a random copolymer of propylene and an α-olefin of 4 to 20 carbon atoms that has:

I) contents of propylene-derived constituent units and of α-olefin-derived constituent units in a molar ratio of 80/20 to 20/80;

II) an intrinsic viscosity [η] of 1.5 dl/g or more;

III) a ratio (Mw/Mn) of 1.0 to 3.5 in terms of a weight-average molecular weight (Mw) to a number-average molecular weight (Mn) as measured by gel permeation chromatography (GPC);

IV) a ratio of 1.0 mol % or less in terms of irregularly bonded propylene monomers based on 2,1-insertion to all the propylene constituent units as determined from a $^{13}$C-NMR spectrum; and V) a melting point (Tm) of not more than 150° C. or outside the measurable range according to DSC measurement;

the elastomer (EL-4) is a random copolymer of ethylene, propylene and an α-olefin of 4 to 20 carbon atoms that has:

I) contents of ethylene-derived constituent units and of propylene-derived constituent units in a molar ratio of 80/20 to 20/80;

II) contents of ethylene-derived and propylene-derived constituent units (EP), and of $C_{4-20}$ α-olefin-derived constituent units (OL) in a molar ratio of 99/1 to 20/80 ((EP)/(OL));

III) an intrinsic viscosity [η] of 1.5 dl/g or more;

IV) a ratio (Mw/Mn) of 1.0 to 3.5 in terms of a weight-average molecular weight (Mw) to a number-average molecular weight (Mn) as measured by gel permeation chromatography (GPC); and V) a ratio of 1.0 mol % or less in terms of irregularly bonded propylene monomers based on 2,1-insertion to all the propylene constituent units, and a ratio of 1.0 mol % or less in terms of irregularly bonded α-olefin monomers based on 2,1-insertion to all the α-olefin constituent units as determined from a $^{13}$C-NMR spectrum; and the metallocene catalyst comprises:

(1a) a transition metal compound, (1b) an organoaluminum oxy-compound, and/or (2b) a compound capable of forming an ion pair by reacting with the transition metal compound (1a), and optionally (c) an organoaluminum compound; the transition metal compound (1a) having the formula (1a):

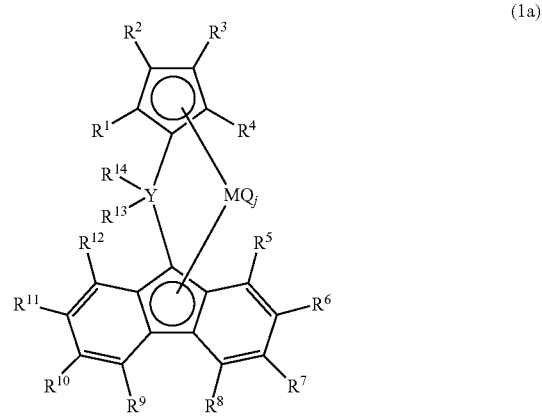

(1a)

wherein $R^3$ is a hydrocarbon group or a silicon-containing group; $R^1$, $R^2$ and $R^4$, which may be the same or different, are each a hydrogen atom, a hydrocarbon group or a silicon-containing group; $R^5$, $R^6$, $R^7$, $R^8$, $R^9$, $R^{10}$, $R^{11}$, $R^{12}$, $R^{13}$ and $R^{14}$, which may be the same or different, are each a hydrogen atom, a hydrocarbon group or a silicon-containing group; neighboring substituent groups of $R^5$ to $R^{12}$ may link together to form a ring; $R^{13}$ and $R^{14}$, which may be the same or different, may link together to form a ring; M denotes a Group-4 transition metal; Y denotes a carbon atom; Q denotes a halogen atom, a hydrocarbon group, an anionic ligand or a neutral ligand capable of coordination by a lone pair of electrons, and may be the same or different when plural; and j is an integer of 1 to 4.

The elastomers (EL-1) to (EL-4) of the present invention are preferably obtained by polymerization at 40° C. or above.

The polyolefin resin composition may contain the elastomers (EL-1) to (EL-4) in an amount of 20 parts by weight or more based on 100 parts by weight of the propylene polymer (PP-C).

The propylene polymer (PP-C) in the polyolefin resin composition may be a propylene homopolymer or a random copolymer of propylene and ethylene or an α-olefin of 4 to 20 carbon atoms that has:

I) a melting point (Tm) of 140° C. or above as measured by DSC; and

II) a melt flow rate (MFR) of 0.01 to 1000 g/10 min as measured at 230° C. under a load of 2.16 kg.

The propylene polymer (PP-C) in the polyolefin resin composition may be a propylene homopolymer or a random copolymer of propylene and ethylene and/or an α-olefin of 4 to 20 carbon atoms that has a ratio (Mw/Mn) of 1.0 to 4.0 in terms of a weight-average molecular weight (Mw) to a number-average molecular weight (Mn) as measured by gel permeation chromatography (GPC).

The propylene polymer (PP-C) in the polyolefin resin composition may be prepared using a magnesium-supported titanium catalyst.

The propylene polymer (PP-C) in the polyolefin resin composition may be prepared using a metallocene catalyst.

The propylene polymer (PP-C) in the polyolefin resin composition may comprise a polymer portion (A1) prepared mainly using a catalyst system of titanium tetrachloride supported on magnesium chloride, and a polymer portion (A2) prepared using a metallocene catalyst, with the polymer portions (A1) and (A2) having a weight ratio of 1/99 to 99/1 ((A1)/(A2)).

The propylene polymer portion (A2) in the polyolefin resin composition may have a ratio of 0.2 mol % or less in terms of irregularly bonded propylene monomers based on 2,1-insertion or 1,3-insertion to all the propylene constituent units as determined from a $^{13}$C-NMR spectrum.

The polyolefin resin composition may be obtained by producing the propylene polymer (PP-C) and successively producing the elastomers (EL-1) to (EL-4).

The polyolefin resin composition may also be obtained by producing a propylene polymer portion (PP-C2) with a metallocene catalyst and successively producing the elastomers (EL-1) to (EL-4), and adding a propylene polymer portion (PP-C1) obtained mainly with a catalyst system of titanium tetrachloride supported on magnesium chloride.

The polyolefin resin composition may also be obtained by mixing the propylene polymer portion (PP-C1) and the elastomers (EL-1) to (EL-4) produced as described above.

Uses of the polyolefin resin composition include injection molded articles for general purposes, injection molded articles for use as automobile parts, parts of home electric appliances, containers and medical apparatus parts, hollow vessels, films, sheets and fibers.

PREFERRED EMBODIMENTS OF THE INVENTION

Figure 1:
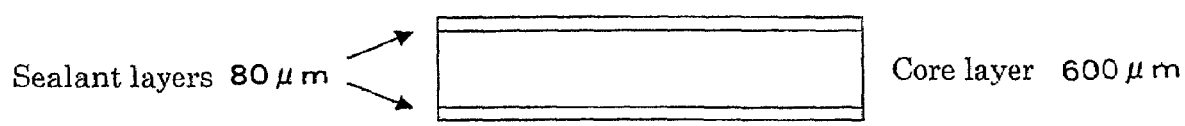
FIG. 1 is a schematic cross-sectional view of the unoriented sheet prepared in Example 1b.

Hereinbelow, the polypropylene composition according to the present invention will be described in detail. The polypropylene composition comprises a polypropylene described below and a specific propylene/1-butene copolymer.

The polypropylene (PP-A) for use in the present invention may be selected from numerous conventional polypropylenes. The polypropylene may be a homopolypropylene or a propylene random copolymer that contains a small amount, for example 10 mol % or less, preferably less than 5 mol %, of units derived from an olefin other than the propylene. In the present invention, the propylene random copolymer is preferably used.

The other olefins for the propylene random copolymer include α-olefins of 2 to 20 carbon atoms other than the propylene, such as ethylene, 1-butene, 1-pentene, 1-hexene, 1-heptene, 1-octene, 1-decene, 1-dodecene, 1-hexadecene and 4-methyl-1-pentene.

For use in the present invention, polypropylenes produced by the conventional process using a known solid titanium catalyst component are suitable. Metallocene-catalyzed polypropylenes may also be favorably used.

The polypropylene (PP-A) of the present invention desirably has a melting point (Tm) of 100 to 165° C., preferably 120 to 165° C. The polypropylene desirably has a melting point which is within the above range and is higher than that of a later-described propylene/1-butene random copolymer (PBR) when incorporated to the polypropylene composition. The melting point (TmA) of the polypropylene (PP-A) is higher than the melting point (TmB) of the propylene/1-butene random copolymer (PBR) by 10 to 100° C., preferably by 20 to 90° C.

The polypropylene (PP-A) desirably has a melt flow rate (MFR) (ASTM D1238, 230° C., 2.16 kg load) generally of 0.1 to 400 g/10 min, preferably 0.5 to 100 g/10 min, and has a molecular weight distribution (Mw/Mn) of above 3, desirably from 4 to 15.

The polypropylene (PP-A) generally has a hardness higher than that of the propylene/1-butene random copolymer (PBR).

The polypropylene composite film according to the invention includes a substrate layer (1) that is formed from a crystalline polypropylene (PP-B). The crystalline polypropylene of the present invention may be selected from those polypropylenes commonly used for films. Preferably, the crystalline polypropylene (PP-B) has an isotactic index (I.I.) (content of boiling n-heptane insolubles) of 75% or more, preferably from 75 to 99%, a density of 0.89 to 0.92 g/cm$^3$, and a melt index (otherwise a melt flow rate) at 230° C. of 0.1 to 10 dg/min. Although the crystalline polypropylene used herein is generally a homopolypropylene, a propylene random copolymer that contains a small amount, for example 5 mol % or less, of units derived from an olefin other than the propylene may be used without adversely affecting the objects of the present invention. The olefins include α-olefins of 2 to 20 carbon atoms other than the propylene, such as ethylene, 1-butene, 1-pentene, 1-hexene, 1-heptene, 1-octene, 1-decene, 1-dodecene, 1-hexadecene and 4-methyl-1-pentene. The crystalline polypropylene (PP-B) for use in the present invention may be obtained by the conventional process using a known solid titanium catalyst component or a metallocene catalyst component. The crystalline polypropylene (PP-B) may optionally contain additives, including heat stabilizers, ultraviolet light absorbers, anti-blocking agents, slip agents and antistatic agents.

In the present invention, the polypropylene (PP-B) may be selected from a number of known polypropylenes for forming the crystalline polypropylene layer. The polypropylene may be a homopolypropylene or a propylene random copolymer that contains a small amount, for example 10 mol % or less, preferably less than 5 mol %, of units derived from an olefin other than the propylene. The homopolypropylene may be preferably used in the present invention due to its high stiffness.

The propylene/1-butene random copolymer (PBR) contains propylene-derived units in an amount of 60 to 90 mol %, preferably 65 to 88 mol %, more preferably 70 to 85 mol %, and still more preferably 70 to 75 mol %, and 1-butene-derived units in an amount of 10 to 40 mol %, preferably 12 to 35 mol %, more preferably 15 to 30 mol %, and still more preferably 25 to 30 mol %. When the propylene/1-butene random copolymer of the present invention has a melting point of 75° C. or below, its crystallization rate (½ crystallization time) at 45° C. is 10 minutes or less, preferably 7 minutes or less.

The propylene/1-butene random copolymer (PBR) may contain additional constituent units derived from an olefin other than the propylene and the 1-butene, for example ethylene-derived constituent units, in an amount of 10 mol % or less.

(2) Stereoregularity (Triad Tacticity, mm Fraction) of Propylene/1-Butene Random Copolymer (PBR)

The stereoregularity of the propylene/1-butene copolymer (PBR) can be evaluated based on the triad tacticity (mm fraction).

The mm fraction is defined as a proportion of methyl groups branched in the same direction in a triad sequence of propylene units that are head-to-tail bonded to form a zigzag structure. The mm fraction is determined from a $^{13}$C-NMR spectrum as described below.

Determination of the mm fraction of the propylene/1-butene random copolymer (PBR) from a $^{13}$C-NMR spectrum involves investigation of peaks assigned to (i) a triad sequence of propylene units that are head-to-tail bonded and (ii) a triad sequence of propylene and butene units that are head-to-tail bonded with a propylene unit in the middle (the second unit).

The mm fraction is obtained from peak intensities assigned to side-chain methyl groups in the second units (propylene units) of the triad sequences (i) and (ii). Details are as follows.

An NMR sample is prepared in a sample tube by completely dissolving the propylene/1-butene random copolymer (PBR) in a lock solvent consisting of hexachlorobutadiene and a small amount of deuterated benzene, and the $^{13}$C-NMR spectrum of the resultant sample is recorded with complete proton decoupling at 120° C. Measurement conditions are such that the flip angle is 45° and the pulse intervals are at least 3.4 T1 (T1 is the longest spin-lattice relaxation time for the methyl group). The methylene and methine groups have shorter T1 than the methyl group, so that all the carbons in the sample will have a magnetization recovery rate of 99% or more under the above conditions. The chemical shift is based on tetramethylsilane as the standard: the peak assigned to the methyl group carbon of the third unit in a pentad sequence (mmmm) of head-to-tail bonded propylene units is set to 21.593 ppm, and other peaks of carbon are determined relative to that peak.

With respect to the $^{13}$C-NMR spectrum of the propylene/1-butene random copolymer (PBR) recorded as above, the carbons in the side-chain methyl groups of the propylene units give peaks in an approximate range of 19.5 to 21.9 ppm: the first peak range about 21.0 to 21.9 ppm, the second peak range about 20.2 to 21.0 ppm and the third peak range about 19.5 to 20.2 ppm.

In these peak ranges, the carbons in the side-chain methyl groups in the second unit (propylene unit) of the head-to-tail bonded triad sequences (i) and (ii) give peaks as shown in Table 1.

TABLE 1

| | | Peak range of methyl group carbons (19.5-21.9 ppm) | | |
|---|---|---|---|---|
| | Chemical shift | First range 21.0-21.9 ppm | Second range 20.2-21.0 ppm | Third range 19.5-20.2 ppm |
| Head-to-tail bonding type | Sequence (i) | PPP (mm) | PPP (mr) | PPP (rr) |
| | Sequence (ii) | PPB (mm) BPB (mm) | PPB (mr) BPB (mr) PPB (rr) BPB (rr) | |

In the table, P denotes a constituent unit derived from propylene, and B denotes that derived from 1-butene. Of the triad sequences (i) and (ii) with head-to-tail bondings given in Table 1, the triad sequence (i) consisting of three propylene units PPP (mm), PPP (mr) and PPP (rr) are illustrated below in terms of zigzag structures as a result of branched methyl groups. These illustrations for mm, mr and rr bondings also apply to the triad sequence (ii) that contains butene unit(s) (PPB and BPB).

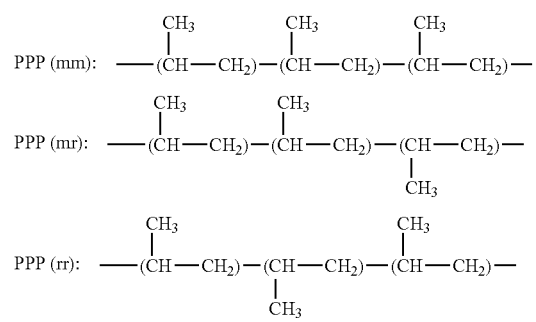

In the first range, the methyl groups in the second propylene unit of the mm-bonded triad sequences PPP, PPB and BPB give resonance peaks. The second range shows resonance peaks of the methyl groups in the second propylene unit of the mr-bonded triad sequences PPP, PPB and BPB, and those assigned to the methyl groups in the second propylene unit of the rr-bonded triad sequences PPB and BPB.

In the third range, the methyl group in the second propylene unit of the rr-cbonded triad sequence PPP gives a resonance peak. Therefore, the triad tacticity (mm fraction) of the propylene/1-butene random copolymer (PBR) is a proportion (percentage) of the area of the peaks appearing in the range of 21.0 to 21.9 ppm (first range) relative to the total (100%) of the areas of the peaks found within 19.5 to 21.9 ppm (methyl group carbon range) according to measurement by $^{13}$C-NMR spectroscopy (hexachlorobutadiene solution, with tetramethylsilane as the reference) based on the side-chain methyl groups in the second propylene unit of (i) the triad sequence of head-to-tail bonded propylene units or in the second propylene unit of (ii) the triad sequence of propylene and butene units that are head-to-tail bonded with a propylene unit as the second unit. Specifically, the mm fraction may be derived from the following formula (1):

$$\text{mm fraction (\%)} = \frac{[PPP(\text{mm}) + PBB(\text{mm}) + BPB(\text{mm})]\ \text{Intensities of methyl groups}}{\begin{bmatrix} PPP(\text{mm}) + PPB(\text{mm}) + BPB(\text{mm}) + \\ PPP(\text{mr}) + PPB(\text{mr}) + BPB(\text{mr}) + \\ PPP(\text{rr}) + PPB(\text{rr}) + BPB(\text{rr}) \end{bmatrix}\ \text{Intensities of methyl groups}} \times 100 \quad (1)$$

The mm fraction of the propylene/1-butene random copolymer (PBR) obtained as described above ranges from 85 to 97.5%, preferably from 87 to 97%, and more preferably from 90 to 97%. Importantly, the mm fraction in the present invention should fall in a moderate range. The mm fraction within the above range enables the copolymer to have a lower melting point while containing a relatively large amount of propylene. The propylene/1-butene random copolymer (PBR) contains, in addition to the head-to-tail bonded triad sequences (i) and (ii), a minor amount of structural units that include irregularly arranged units as illustrated in the formulae (iii), (iv) and (v). The side-chain methyl groups in these other propylene units also show peaks within the above methyl group carbon range (19.5 to 21.9 ppm).

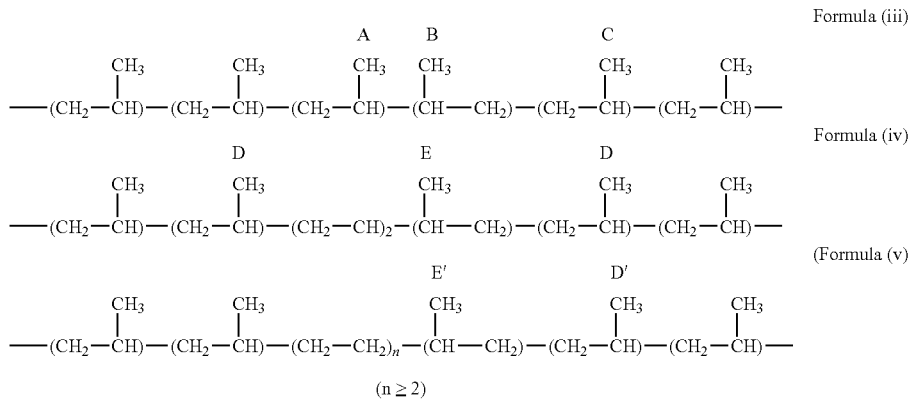

In the methyl groups in these structural units as illustrated in formulae (iii), (iv) and (v), the methyl group carbons A and B give resonance peaks at 17.3 ppm and 17.0 ppm respectively, outside the first to third peak ranges (19.5 to 21.9 ppm). Since the carbons A and B are not involved in forming the triad propylene sequence with head-to-tail bondings, the triad tacticity (mm fraction) should be calculated excluding them.

Meanwhile, the peaks assigned to the methyl group carbons C, D and D' appear in the second range, and those assigned to the methyl group carbons E and E' appear in the third range.

Therefore, the first to third peak ranges for the methyl group carbons show the peaks assigned to the PPE-methyl group (the side-chain methyl group in a propylene-propylene-ethylene sequence) (near 20.7 ppm), the EPE-methyl group (the side-chain methyl group in an ethylene-propylene-ethylene sequence) (near 19.8 ppm), the methyl group C, the methyl group D, the methyl group D', the methyl group E and the methyl group E'.

As described above, the peak ranges of methyl group carbons show peaks assigned to the methyl groups in sequences other than the head-to-tail bonded triad sequences (i) and (ii). Therefore, these peaks are calibrated as described below for determination of the mm fraction by the above formula.

The peak area of the PPE-methyl group can be obtained from the peak area of the PPE-methine group (resonance near 30.6 ppm). The peak area of the EPE-methyl group can be obtained from the peak area of the EPE-methine group (resonance near 32.9 ppm).

The peak area of the methyl group C can be obtained from the peak area of the adjacent methine group (resonance near 31.3 ppm). The peak area of the methyl group D is half the combined peak areas of α,β methylene carbons in the structural unit (iv) (resonance near 34.3 ppm and near 34.5 ppm). The peak area of the methyl group D' can be obtained from the peak area of the methine group (resonance near 33.3 ppm) adjacent to the methyl group E' in the structural unit (v).

The peak area of the methyl group E can be obtained from the peak area of the adjacent methine carbon (resonance near 33.7 ppm). The peak area of the methyl group E' can be obtained from the peak area of the adjacent methine carbon (resonance near 33.3 ppm).

Accordingly, subtracting these peak areas from the total peak areas in the second and third ranges gives an area of the peaks assigned to the methyl groups in the head-to-tail bonded triad propylene sequences (i) and (ii).

The peak area of the methyl groups in the head-to-tail bonded triad propylene sequences (i) and (ii) provided by the above subtraction is put in the above formula to work out the mm fraction.

The carbon peaks found in the spectrum may be assigned by reference to the literature "Polymer, 30, 1350 (1989)".

(3) Intrinsic Viscosity [η]

The propylene/1-butene random copolymer (PBR) has an intrinsic viscosity [η] of 0.1 to 12 dl/g, preferably 0.5 to 10 dl/g, and more preferably 1 to 5 dl/g as measured in decalin at 135° C.

(4) Molecular Weight Distribution

The propylene/1-butene random copolymer (PBR) has a molecular weight distribution (Mw/Mn) of 3 or less, preferably from 1.8 to 3.0, and more preferably from 1.9 to 2.5 according to measurement by gel permeation chromatography (GPC).

(5) Randomness

The propylene/1-butene random copolymer (PBR) has a parameter value B, indicative of randomness of distributed monomer sequences, of 0.9 to 1.3, preferably 0.95 to 1.25, and more preferably 0.95 to 1.2.

The parameter value B has been proposed by B. D. Coleman and T. G. Fox (J. Polym. Sci., A1, 3183 (1963)), and can be defined as follows:

$$B = P_{12}/(2P_1 \cdot P_2)$$

wherein $P_1$ and $P_2$ are fractions of first and second monomers respectively, and $P_{12}$ is a proportion of (first monomer)-(second monomer) sequences relative to all the dyad monomer sequences.

When the B-value is 1, the Bernoulli's statistics applies. When the B-value is smaller than 1 (B<1), the copolymer is arranged in the form of block chains. On the other hand, when the B-value is greater than 1 (B>1), the copolymer is arranged in the form of alternate chains. When the B-value is 2 (B=2), the copolymer is an alternating copolymer.

(6)

The propylene/1-butene random copolymer (PBR) has a melting point (Tm) of 40 to 120° C., preferably 50 to 100° C., and more preferably 55 to 90° C. as measured on a differential scanning calorimeter. The melting point (Tm) and the content (M) of 1-butene constituent units (mol %) satisfy the relation of:

$$146 \exp(-0.022 M) \geqq Tm \geqq 125 \exp(-0.032 M),$$

preferably $$146 \exp(-0.024M) \geqq Tm \geqq 125 \exp(-0.032M),$$

and more preferably $$146 \exp(-0.0265 M) \geqq Tm \geqq 125 \exp(-0.032 M).$$

When the melting point and the butene content have the above correlation, the copolymer can display a lowered melting point while containing a relatively large amount of propylene. As a result, the copolymer can display higher crystallization rate in spite of a low melting point.

The propylene/1-butene random copolymer (PBR) according to the present invention may contain a minor amount of irregularly bonded (irregularly arranged) propylene units based on 2,1-insertion or 1,3-insertion in the propylene sequence.

When polymerized, the propylene generally forms a head-to-tail bonded sequence with 1,2-insertion (in which the methylene groups bond a catalyst), but 2,1-insertion or 1,3-insertion also unusually occurs. The propylene units having 2,1-insertion or 1,3-insertion form irregularly arranged units as represented by the formulae (iii), (iv) and (v). As with the stereoregularity, the proportion of the propylene units with 2,1-insertion and 1,3-insertion relative to the polymer structural units may be determined from the following formula based on data obtained from a $^{13}$C-NMR spectrum with reference to the literature "Polymer, 30, 1350 (1989)."

The proportion of the irregularly arranged propylene units based on 2,1-insertion can be obtained from the formula:

$$\text{Proportion of irregularly arranged units with 2,1-insertion} = \frac{\left\{ \begin{array}{l} 0.5 I\alpha\beta(\text{structures(iii) and (v)}) + 0.25 I\alpha\beta(\text{structure(iv)}) \end{array} \right\}}{I\alpha\alpha + I\alpha\beta(\text{structures(iii) and (v)}) + 0.5(I\alpha\gamma + I\alpha\beta(\text{structure(iv)}) + I\alpha\delta)\}} \times 100$$

When determination of the peak areas of Iαβ, etc. is difficult owing to the overlapping peaks, calibration can be made with the peaks of carbon that have corresponding areas.

The propylene/1-butene random copolymer (PBR) according to the present invention may contain the irregularly bonded propylene units in terms of 2,1-insertion in an amount of 0.01% or above, specifically about 0.01 to 1.0% relative to all the propylene structural units.

The proportion of the irregularly arranged propylene units based on 1,3-insertion in the propylene/1-butene random copolymer (PBR) can be obtained from the peak of βγ peak (resonance near 27.4 ppm).

The propylene/1-butenerandom copolymer according to the present invention may contain the irregularly bonded propylene units based on 1,3-insertion in an amount of 0.05% or less.

An exemplary process for the production of the propylene/1-butene random copolymer (PBR) according to the present invention will be given below.

The propylene/1-butene random copolymer (PBR) may be prepared by copolymerizing propylene and 1-butene in the presence of an olefin polymerization catalyst that comprises:

a transition metal compound (1a), and at least one compound selected from:

an organoaluminum oxy-compound, and/or a compound capable of forming an ion pair by reacting with the transition metal compound (1a), and an organoaluminum compound.

The above transition metal compound (1a) has the formula (1a):

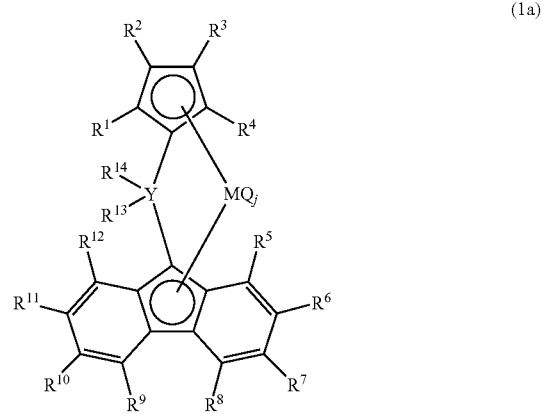

(1a)

wherein $R^3$ is a hydrocarbon group or a silicon-containing group; $R^1$, $R^2$ and $R^4$, which may be the same or different, are each a hydrogen atom, a hydrocarbon group or a silicon-containing group; $R^5$, $R^6$, $R^7$, $R^8$, $R^9$, $R^{10}$, $R^{11}$, $R^{12}$, $R^{13}$ and $R^{14}$, which may be the same or different, are each a hydrogen atom, a hydrocarbon group or a silicon-containing group; neighboring substituent groups of $R^5$ to $R^{12}$ may link together to form a ring; $R^{13}$ and $R^{14}$, which may be the same or different, may link together to form a ring; M denotes a Group-4 transition metal; Y denotes a carbon atom; Q denotes a halogen atom, a hydrocarbon group, an anionic ligand or a neutral ligand capable of coordination by a lone pair of electrons, and may be the same or different when plural; and j is an integer of 1 to 4.

Preferably, $R^1$ in the transition metal compound (1a) of the formula (1a) is a hydrocarbon group or a silicon-containing group.

Exemplary compounds having the formula (1a) include bridged metallocene compounds with C1 symmetry, such as isopropylidene(3-tert-butylcyclopentadienyl)(fluorenyl)zirconium dichloride, isopropylidene(3-tert-butylcyclopentadienyl)(2,7-di-tert-butylfluorenyl)zirconium dichloride, isopropylidene(3-tert-butylcyclopentadienyl)(3,6-di-tert-butylfluorenyl)zirconium dichloride, isopropylidene(3-tert-butylcyclopentadienyl)(octamethyloctahydridodibenzofluorenyl)zirconium dichloride, diphenylmethylene(3-tert-butylcyclopentadienyl)(fluorenyl)zirconium dichloride, diphenylmethylene(3-tert-butylcyclopentadienyl)(2,7-di-tert-butylfluorenyl)zirconium dichloride, diphenylmethylene(3-tert-butylcyclopentadienyl)(3,6-di-tert-butylfluorenyl)zirconium dichloride, diphenylmethylene(3-tert-butylcyclopentadienyl)(octamethyloctahydridodibenzofluorenyl)zirconium dichloride, cyclohexylidene(3-tert-butylcyclopentadienyl)(fluorenyl)zirconium dichloride, cyclohexylidene(3-tert-butylcyclopentadienyl)(2,7-di-tert-butylfluorenyl)zirconium dichloride, cyclohexylidene(3-tert-butylcyclopentadienyl)(3,6-di-tert-butylfluorenyl)zirconium dichloride, cyclohexylidene(3-tert-butylcyclopentadienyl)(octamethyloctahydridodibenzofluorenyl)zirconium dichloride, phenylmethylmethylene(3-tert-butylcyclopentadienyl)(fluorenyl)zirconium dichloride, phenylmethylmethylene(3-tert-butylcyclopentadienyl)(2,7-di-tert-butylfluorenyl)zirconium dichloride, phenylmethylmethylene(3-tert-butylcyclopentadienyl)(3,6-di-tert-butylfluorenyl)zirconium dichloride, phenylmethylmethylene(3-tert-butylcyclopentadienyl)(octamethyloctahydridodibenzofluorenyl)zirconium dichloride, isopropylidene(3-trimethylsilylcyclopentadienyl)(fluorenyl)zirconium dichloride, isopropylidene (3-trimethylsilylcyclopentadienyl)(2,7-di-tert-butylfluorenyl)zirconium dichloride, isopropylidene(3-trimethylsilylcyclopentadienyl)(3,6-di-tert-butylfluorenyl)zirconium dichloride, isopropylidene (3-trimethylsilylcyclopentadienyl)(octamethyloctahydridodibenzofluorenyl)zirconium dichloride, diphenylmethylene(3-trimethylsilylcyclopentadienyl)(fluorenyl)zirconium dichloride, diphenylmethylene (3-trimethylsilylcyclopentadienyl)(2,7-di-tert-butylfluorenyl)zirconium dichloride, diphenylmethylene(3-trimethylsilylcyclopentadienyl)(3,6-di-tert-butylfluorenyl)zirconium dichloride, diphenylmethylene(3-trimethylsilylcyclopentadienyl)(octamethyloctahydridodibenzofluorenyl)zirconium dichloride, cyclohexylidene (3-trimethylsilylcyclopentadienyl)(fluorenyl)zirconium dichloride, cyclohexylidene(3-trimethylsilylcyclopentadienyl)(2,7-di-tert-butylfluorenyl)zirconium dichloride, cyclohexylidene(3-trimethylsilylcyclopentadienyl)(3,6-di-tert-butylfluorenyl)zirconium dichloride, cyclohexylidene(3-trimethylsilylcyclopentadienyl)(octamethyloctahydridodibenzofluorenyl)zirconium dichloride, phenylmethylmethylene(3-trimethylsilylcyclopentadienyl)(fluorenyl)zirconium dichloride, phenylmethylmethylene(3-trimethylsilylcyclopentadienyl)(2,7-di-tert-butylfluorenyl)zirconium dichloride, phenylmethylmethylene (3-trimethylsilylcyclopentadienyl)(3,6-di-tert-butylfluorenyl)zirconium dichloride, phenylmethylmethylene(3-trimethylsilylcyclopentadienyl)(octamethyloctahydridodibenzofluorenyl)zirconium dichloride, isopropylidene(3-phenylcyclopentadienyl)(fluorenyl)zirconium dichloride, isopropylidene (3-phenylcyclopentadienyl)(2,7-di-tert-butylfluorenyl)zirconium dichloride, isopropylidene (3-phenylcyclopentadienyl)(3,6-di-tert-butylfluorenyl)zirconium dichloride, isopropylidene (3-phenylcyclopentadienyl)(octamethyloctahydridodibenzofluorenyl)zirconium dichloride, diphenylmethylene(3-phenylcyclopentadienyl)(fluorenyl)zirconium dichloride, diphenylmethylene(3-phenylcyclopentadienyl)(2,7-di-tert-butylfluorenyl)zirconium dichloride, diphenylmethylene(3-phenylcyclopentadienyl)(3,6-di-tert-butylfluorenyl)zirconium dichloride, diphenylmethylene(3-phenylcyclopentadienyl)(octamethyloctahydridodibenzofluorenyl)zirconium dichloride, cyclohexylidene (3-phenylcyclopentadienyl)(fluorenyl)zirconium dichloride, cyclohexylidene (3-phenylcyclopentadienyl)(2,7-di-tert-butylfluorenyl)zirconium dichloride, cyclohexylidene (3-phenylcyclopentadienyl)(3,6-di-tert-butylfluorenyl)zirconium dichloride, cyclohexylidene (3-phenylcyclopentadienyl)(octamethyloctahydridodibenzofluorenyl)zirconium dichloride, phenylmethylmethylene (3-phenylcyclopentadienyl)(fluorenyl)zirconium dichloride, phenylmethylmethylene(3-phenylcyclopentadienyl)(2,7-di-tert-butylfluorenyl)zirconium dichloride, phenylmethylmethylene(3-phenylcyclopentadienyl)(3,6-di-tert-butylfluorenyl)zirconium dichloride, phenylmethylmethylene(3-phenylcyclopentadienyl) (octamethyloctahydridodibenzofluorenyl)zirconium dichloride, isopropylidene(3-adamantylcyclopentadienyl)(fluorenyl)zirconium dichloride, isopropylidene (3-adamantylcyclopentadienyl)(2,7-di-tert-butylfluorenyl)zirconium dichloride, isopropylidene (3-adamantylcyclopentadienyl)(3,6-di-tert-butylfluorenyl)zirconium dichloride, isopropylidene (3-adamantylcyclopentadienyl)(octamethyloctahydridodibenzofluorenyl)zirconium dichloride, diphenylmethylene(3-adamantylcyclopentadienyl)(fluorenyl)zirconium dichloride, diphenylmethylene(3-adamantylcyclopentadienyl)(2,7-di-tert-butylfluorenyl)zirconium dichloride, diphenylmethylene(3-adamantylcyclopentadienyl)(3,6-di-tert-butylfluorenyl)zirconium dichloride, diphenylmethylene(3-adamantylcyclopentadienyl)(octamethyloctahydridodibenzofluorenyl)zirconium dichloride, cyclohexylidene(3-adamantylcyclopentadienyl)(fluorenyl)zirconium dichloride, cyclohexylidene(3-adamantylcyclopentadienyl)(2,7-di-tert-butylfluorenyl)zirconium dichloride, cyclohexylidene(3-adamantylcyclopentadienyl)(3,6-di-tert-butylfluorenyl)zirconium dichloride, cyclohexylidene(3-adamantylcyclopentadienyl)(octamethyloctahydridodibenzofluorenyl)zirconium dichloride, phenylmethylmethylene(3-adamantylcyclopentadienyl)(fluorenyl)zirconium dichloride, phenylmethylmethylene(3-adamantylcyclopentadienyl)(2,7-di-tert-butylfluorenyl)zirconium dichloride, phenylmethylmethylene (3-adamantylcyclopentadienyl)(3,6-di-tert-butylfluorenyl)zirconium dichloride, phenylmethylmethylene(3-adamantylcyclopentadienyl)(octamethyloctahydridodibenzofluorenyl)zirconium dichloride, isopropylidene (3-adamantyl-3'-methylcyclopentadienyl)(fluorenyl)zirconium dichloride, isopropylidene (3-adamantyl-3'-methylcyclopentadienyl)(2,7-di-tert-butylfluorenyl)zirconium dichloride, isopropylidene(3-adamantyl-3'-methylcyclopentadienyl)(3,6-di-tert-butylfluorenyl)zirconium dichloride, isopropylidene(3-adamantyl-3'-methylcyclopentadienyl)(octamethyloctahydridodibenzofluorenyl)zirconium dichloride, diphenylmethylene (3-adamantyl-3'-methylcyclopentadienyl)(fluorenyl)zirconium dichloride, diphenylmethylene(3-adamantyl-3'-methylcyclopentadienyl)(2,7-di-tert-butylfluorenyl)zirconium dichloride, diphenylmethylene (3-adamantyl-3'-methylcyclopentadienyl)(3,6-di-tert-butylfluorenyl)zirconium dichloride, diphenylmethylene(3-adamantyl-3'-methylcyclopentadienyl) (octamethyloctahydridodibenzofluorenyl)zirconium dichloride, cyclohexylidene (3-adamantyl-3'-methylcyclopentadienyl)(fluorenyl)zirconium dichloride, cyclohexylidene(3-adamantyl-3'-methylcyclopentadienyl)(2,7-di-tert-butylfluorenyl)zirconium dichloride, cyclohexylidene(3-adamantyl-3'-methylcyclopentadienyl)(3,6-di-tert-butylfluorenyl)zirconium dichloride, cyclohexylidene(3-adamantyl-3'-methylcyclopentadienyl)(octamethyloctahydridodibenzofluorenyl)zirconium dichloride, phenylmethylmethylene (3-adamantyl-3'-methylcyclopentadienyl)(fluorenyl)zirconium dichloride, phenylmethylmethylene(3-adamantyl-3'-methylcyclopentadienyl)(2,7-di-tert-butylfluorenyl)zirconium dichloride, phenylmethylmethylene (3-adamantyl-3'-methylcyclopentadienyl)(3,6-di-tert-butylfluorenyl)zirconium dichloride, phenylmethylmethylene(3-adamantyl-3'-methylcyclopentadienyl)(octamethyloctahydridodibenzofluorenyl)zirconium dichloride, isopropylidene(3-furylcyclopentadienyl)(fluorenyl)zirconium dichloride, isopropylidene (3-furylcyclopentadienyl)(2,7-di-tert-butylfluorenyl)zirconium dichloride, isopropylidene (3-furylcyclopentadienyl)(3,6-di-tert-butylfluorenyl)zirconium dichloride, isopropylidene (3-furylcyclopentadienyl)(octamethyloctahydridodibenzofluorenyl)zirconium dichloride, diphenylmethylene(3- furylcyclopentadienyl)(fluorenyl)zirconium dichloride, diphenylmethylene(3-furylcyclopentadienyl)(2,7-di-tert-butylfluorenyl)zirconium dichloride, diphenylmethylene(3-furylcyclopentadienyl)(3,6-di-tert-butylfluorenyl)zirconium dichloride, diphenylmethylene(3-furylcyclopentadienyl)(octamethyloctahydridodibenzofluorenyl)zirconium dichloride, cyclohexylidene(3-furylcyclopentadienyl)(fluorenyl)zirconium dichloride, cyclohexylidene (3-furylcyclopentadienyl)(2,7-di-tert-butylfluorenyl)zirconium dichloride, cyclohexylidene (3-furylcyclopentadienyl)(3,6-di-tert-butylfluorenyl)zirconium dichloride, cyclohexylidene (3-furylcyclopentadienyl)(octamethyloctahydridodibenzofluorenyl)zirconium dichloride, phenylmethylmethylene (3-furylcyclopentadienyl)(fluorenyl)zirconium dichloride, phenylmethylmethylene(3-furylcyclopentadienyl)(2,7-di-tert-butylfluorenyl)zirconium dichloride, phenylmethylmethylene(3-furylcyclopentadienyl)(3,6-di-tert-butylfluorenyl)zirconium dichloride, phenylmethylmethylene(3-furylcyclopentadienyl)(octamethyloctahydridodibenzofluorenyl)zirconium dichloride, isopropylidene(3-thienylcyclopentadienyl)(fluorenyl)zirconium dichloride, isopropylidene (3-thienylcyclopentadienyl)(2,7-di-tert-butylfluorenyl)zirconium dichloride, isopropylidene (3-thienylcyclopentadienyl)(3,6-di-tert-butylfluorenyl) zirconium dichloride, isopropylidene (3-thienylcyclopentadienyl)(octamethyloctahydridodibenzofluorenyl)zirconium dichloride, diphenylmethylene(3-thienylcyclopentadienyl)(fluorenyl)zirconium dichloride, diphenylmethylene(3-thienylcyclopentadienyl)(2,7-di-tert-butylfluorenyl)zirconium dichloride, diphenylmethylene(3-thienylcyclopentadienyl)(3,6-di-tert-butylfluorenyl)zirconium dichloride, diphenylmethylene(3-thienylcyclopentadienyl)(octamethyloctahydridodibenzofluorenyl)zirconium dichloride, cyclohexylidene(3-thienylcyclopentadienyl)(fluorenyl)zirconium dichloride, cyclohexylidene (3-thienylcyclopentadienyl)(2,7-di-tert-butylfluorenyl)zirconium dichloride, cyclohexylidene (3-thienylcyclopentadienyl)(3,6-di-tert-butylfluorenyl)zirconium dichloride, cyclohexylidene (3-thienylcyclopentadienyl)(octamethyloctahydridodibenzofluorenyl)zirconium dichloride, phenylmethylmethylene (3-thienylcyclopentadienyl)(fluorenyl)zirconium dichloride, phenylmethylmethylene(3-thienylcyclopentadienyl)(2,7-di-tert-butylfluorenyl)zirconium dichloride, phenylmethylmethylene(3-thienylcyclopentadienyl)(3,6-di-tert-butylfluorenyl)zirconium dichloride, phenylmethylmethylene(3-thienylcyclopentadienyl)(octamethyloctahydridodibenzofluorenyl)zirconium dichloride, isopropylidene (3-tert-butyl-5-methylcyclopentadienyl)(fluorenyl)zirconium dichloride, isopropylidene (3-tert-butyl-5-methylcyclopentadienyl)(2,7-di-tert-butylfluorenyl)zirconium dichloride, isopropylidene(3-tert-butyl-5-methylcyclopentadienyl)(3,6-di-tert-butylfluorenyl)zirconium dichloride, isopropylidene(3-tert-butyl-5-methylcyclopentadienyl)(octamethyloctahydridodibenzofluorenyl)zirconium dichloride, diphenylmethylene (3-tert-butyl-5-methylcyclopentadienyl)(fluorenyl)zirconium dichloride, diphenylmethylene(3-tert-butyl-5-methylcyclopentadienyl)(2,7-di-tert-butylfluorenyl)zirconium dichloride, diphenylmethylene(3-tert-butyl-5-methylcyclopentadienyl)(3,6-di-tert-butylfluorenyl)zirconium dichloride, diphenylmethylene(3-tert-butyl-5-methylcyclopentadienyl)(octamethyloctahydridodibenzofluorenyl)zirconium dichloride, cyclohexylidene (3-tert-butyl-5-methylcyclopentadienyl)(fluorenyl)zirconium dichloride, cyclohexylidene (3-tert-butyl-5-methylcyclopentadienyl)(2,7-di-tert-butylfluorenyl)zirconium dichloride, cyclohexylidene(3-tert-butyl-5-methylcyclopentadienyl)(3,6-di-tert-butylfluorenyl)zirconium dichloride, cyclohexylidene(3-tert-butyl-5-methylcyclopentadienyl)(octamethyloctahydridodibenzofluorenyl)zirconium dichloride, phenylmethylmethylene (3-tert-butyl-5-methylcyclopentadienyl)(fluorenyl)zirconium dichloride, phenylmethylmethylene(3-tert-butyl-5-methylcyclopentadienyl)(2,7-di-tert-butylfluorenyl)zirconium dichloride, phenylmethylmethylene (3-tert-butyl-5-methylcyclopentadienyl)(3,6-di-tert-butylfluorenyl)zirconium dichloride, phenylmethylmethylene(3-tert-butyl-5-methylcyclopentadienyl)(octamethyloctahydridodibenzofluorenyl)zirconium dichloride, isopropylidene (3-trimethylsilyl-5-methylcyclopentadienyl)(fluorenyl)zirconium dichloride, isopropylidene (3-trimethylsilyl-5-methylcyclopentadienyl)(2,7-di-tert-butylfluorenyl)zirconium dichloride, isopropylidene(3-trimethylsilyl-5-methylcyclopentadienyl)(3,6-di-tert-butylfluorenyl)zirconium dichloride, isopropylidene(3-trimethylsilyl-5-methylcyclopentadienyl)(octamethyloctahydridodibenzofluorenyl)zirconium dichloride, diphenylmethylene (3-trimethylsilyl-5-methylcyclopentadienyl)(fluorenyl)zirconium dichloride, diphenylmethylene(3-trimethylsilyl-5-methylcyclopentadienyl)(2,7-di-tert-butylfluorenyl)zirconium dichloride, diphenylmethylene (3-trimethylsilyl-5-methylcyclopentadienyl)(3,6-di-tert-butylfluorenyl)zirconium dichloride, diphenylmethylene(3-trimethylsilyl-5-methylcyclopentadienyl)(octamethyloctahydridodibenzofluorenyl)zirconium dichloride, cyclohexylidene (3-trimethylsilyl-5-methylcyclopentadienyl)(fluorenyl)zirconium dichloride, cyclohexylidene (3-trimethylsilyl-5-methylcyclopentadienyl)(2,7-di-tert-butylfluorenyl)zirconium dichloride, cyclohexylidene(3-trimethylsilyl-5-methylcyclopentadienyl)(3,6-di-tert-butylfluorenyl)zirconium dichloride, cyclohexylidene(3-trimethylsilyl-5-methylcyclopentadienyl)(octamethyloctahydridodibenzofluorenyl)zirconium dichloride, phenylmethylmethylene (3-trimethylsilyl-5-methylcyclopentadienyl)(fluorenyl)zirconium dichloride, phenylmethylmethylene(3-trimethylsilyl-5-methylcyclopentadienyl)(2,7-di-tert-butylfluorenyl)zirconium dichloride, phenylmethylmethylene (3-trimethylsilyl-5-methylcyclopentadienyl)(3,6-di-tert-butylfluorenyl)zirconium dichloride, phenylmethylmethylene(3-trimethylsilyl-5-methylcyclopentadienyl)(octamethyloctahydridodibenzofluorenyl)zirconium dichloride, isopropylidene (3-phenyl-5-methylcyclopentadienyl)(fluorenyl)zirconium dichloride, isopropylidene (3-phenyl-5-methylcyclopentadienyl)(2,7-di-tert-butylfluorenyl)zirconium dichloride, isopropylidene (3-phenyl-5-methylcyclopentadienyl)(3,6-di-tert-butylfluorenyl)zirconium dichloride, isopropylidene(3-phenyl-5-methylcyclopentadienyl)(octamethyloctahydridodibenzofluorenyl)zirconium dichloride, diphenylmethylene (3-phenyl-5-methylcyclopentadienyl)(fluorenyl)zirconium dichloride, diphenylmethylene (3-phenyl-5-methylcyclopentadienyl)(2,7-di-tert-butylfluorenyl)zirconium dichloride, diphenylmethylene(3-phenyl-5-methylcyclopentadienyl)(3,6-di-tert-butylfluorenyl)zirconium dichloride, diphenylmethylene(3-phenyl-5-methylcyclopentadienyl)(octamethyloctahydridodibenzofluorenyl)zirconium dichloride, cyclohexylidene (3-phenyl-5-methylcyclopentadienyl)(fluorenyl)zirconium dichloride, cyclohexylidene (3-phenyl-5-methylcyclopentadienyl)(2,7-di-tert-butylfluorenyl)zirconium dichloride, cyclohexylidene(3-phenyl-5-methylcyclopentadienyl)(3,6-di-tert-butylfluorenyl)zirconium dichloride, cyclohexylidene(3-phenyl-5- methylcyclopentadienyl)(octamethyloctahydridodibenzofluorenyl)zirconium dichloride, phenylmethylmethylene (3-phenyl-5-methylcyclopentadienyl)(fluorenyl)zirconium dichloride, phenylmethylmethylene(3-phenyl-5-methylcyclopentadienyl)(2,7-di-tert-butylfluorenyl)zirconium dichloride, phenylmethylmethylene(3-phenyl-5-methylcyclopentadienyl)(3,6-di-tert-butylfluorenyl)zirconium dichloride, phenylmethylmethylene(3-phenyl-5-methylcyclopentadienyl)(octamethyloctahydridodibenzofluorenyl)zirconium dichloride, isopropylidene (3-adamantyl-5-methylcyclopentadienyl)(fluorenyl)zirconium dichloride, isopropylidene(3-adamantyl-5-methylcyclopentadienyl)(2,7-di-tert-butylfluorenyl)zirconium dichloride, isopropylidene(3-adamantyl-5-methylcyclopentadienyl)(3,6-di-tert-butylfluorenyl)zirconium dichloride, isopropylidene(3-adamantyl-5-methylcyclopentadienyl)(octamethyloctahydridodibenzofluorenyl)zirconium dichloride, diphenylmethylene (3-adamantyl-5-methylcyclopentadienyl)(fluorenyl)zirconium dichloride, diphenylmethylene(3-adamantyl-5-methylcyclopentadienyl)(2,7-di-tert-butylfluorenyl)zirconium dichloride, diphenylmethylene(3-adamantyl-5-methylcyclopentadienyl)(3,6-di-tert-butylfluorenyl)zirconium dichloride, diphenylmethylene(3-adamantyl-5-methylcyclopentadienyl)(octamethyloctahydridodibenzofluorenyl)zirconium dichloride, cyclohexylidene (3-adamantyl-5-methylcyclopentadienyl)(fluorenyl)zirconium dichloride, cyclohexylidene(3-adamantyl-5-methylcyclopentadienyl)(2,7-di-tert-butylfluorenyl)zirconium dichloride, cyclohexylidene(3-adamantyl-5-methylcyclopentadienyl)(3,6-di-tert-butylfluorenyl)zirconium dichloride, cyclohexylidene(3-adamantyl-5-methylcyclopentadienyl)(octamethyloctahydridodibenzofluorenyl)zirconium dichloride, phenylmethylmethylene (3-adamantyl-5-methylcyclopentadienyl)(fluorenyl)zirconium dichloride, phenylmethylmethylene(3-adamantyl-5-methylcyclopentadienyl)(2,7-di-tert-butylfluorenyl)zirconium dichloride, phenylmethylmethylene (3-adamantyl-5-methylcyclopentadienyl)(3,6-di-tert-butylfluorenyl)zirconium dichloride, phenylmethylmethylene(3-adamantyl-5-methylcyclopentadienyl)(octamethyloctahydridodibenzofluorenyl)zirconium dichloride, isopropylidene (3-adamantyl-3'-methyl-5-methylcyclopentadienyl)(fluorenyl)zirconium dichloride, isopropylidene (3-adamantyl-3'-methyl-5-methylcyclopentadienyl)(2,7-di-tert-butylfluorenyl)zirconium dichloride, isopropylidene (3-adamantyl-3'-methyl-5-methylcyclopentadienyl)(3,6-di-tert-butylfluorenyl)zirconium dichloride, isopropylidene (3-adamantyl-3'-methyl-5-methylcyclopentadienyl)(octamethyloctahydridodibenzofluorenyl)zirconium dichloride, diphenylmethylene (3-adamantyl-3'-methyl-5-methylcyclopentadienyl)(fluorenyl)zirconium dichloride, diphenylmethylene(3-adamantyl-3'-methyl-5-methylcyclopentadienyl)(2,7-di-tert-butylfluorenyl)zirconium dichloride, diphenylmethylene (3-adamantyl-3'-methyl-5-methylcyclopentadienyl)(3,6-di-tert-butylfluorenyl)zirconium dichloride, diphenylmethylene(3-adamantyl-3'-methyl-5-methylcyclopentadienyl)(octamethyloctahydridodibenzofluorenyl)zirconium dichloride, cyclohexylidene (3-adamantyl-3'-methyl-5-methylcyclopentadienyl)(fluorenyl)zirconium dichloride, cyclohexylidene(3-adamantyl-3'-methyl-5-methylcyclopentadienyl)(2,7-di-tert-butylfluorenyl)zirconium dichloride, cyclohexylidene (3-adamantyl-3'-methyl-5-methylcyclopentadienyl)(3,6-di-tert-butylfluorenyl)zirconium dichloride, cyclohexylidene(3-adamantyl-3'-methyl-5-methylcyclopentadienyl)(octamethyloctahydridodibenzofluorenyl)zirconium dichloride, phenylmethylmethylene (3-adamantyl-3'-methyl-5-methylcyclopentadienyl)(fluorenyl)zirconium dichloride, phenylmethylmethylene(3-adamantyl-3'-methyl-5-methylcyclopentadienyl)(2,7-di-tert-butylfluorenyl)zirconium dichloride, phenylmethylmethylene (3-adamantyl-3'-methyl-5-methylcyclopentadienyl)(3,6-di-tert-butylfluorenyl)zirconium dichloride, phenylmethylmethylene(3-adamantyl-3'-methyl-5-methylcyclopentadienyl)(octamethyloctahydridodibenzofluorenyl)zirconium dichloride, isopropylidene (3-furyl-5-methylcyclopentadienyl)(fluorenyl)zirconium dichloride, isopropylidene (3-furyl-5-methylcyclopentadienyl)(2,7-di-tert-butylfluorenyl)zirconium dichloride, isopropylidene(3-furyl-5-methylcyclopentadienyl)(3,6-di-tert-butylfluorenyl)zirconium dichloride, isopropylidene(3-furyl-5-methylcyclopentadienyl)(octamethyloctahydridodibenzofluorenyl)zirconium dichloride, diphenylmethylene (3-furyl-5-methylcyclopentadienyl)(fluorenyl)zirconium dichloride, diphenylmethylene (3-furyl-5-methylcyclopentadienyl)(2,7-di-tert-butylfluorenyl)zirconium dichloride, diphenylmethylene(3-furyl-5-methylcyclopentadienyl)(3,6-di-tert-butylfluorenyl)zirconium dichloride, diphenylmethylene(3-furyl-5-methylcyclopentadienyl)(octamethyloctahydridodibenzofluorenyl)zirconium dichloride, cyclohexylidene (3-furyl-5-methylcyclopentadienyl)(fluorenyl)zirconium dichloride, cyclohexylidene (3-furyl-5-methylcyclopentadienyl)(2,7-di-tert-butylfluorenyl)zirconium dichloride, cyclohexylidene(3-furyl-5-methylcyclopentadienyl)(3,6-di-tert-butylfluorenyl)zirconium dichloride, cyclohexylidene(3-furyl-5-methylcyclopentadienyl)(octamethyloctahydridodibenzofluorenyl)zirconium dichloride, phenylmethylmethylene (3-furyl-5-methylcyclopentadienyl)(fluorenyl)zirconium dichloride, phenylmethylmethylene(3-furyl-5-methylcyclopentadienyl)(2,7-di-tert-butylfluorenyl)zirconium dichloride, phenylmethylmethylene(3-furyl-5-methylcyclopentadienyl)(3,6-di-tert-butylfluorenyl)zirconium dichloride, phenylmethylmethylene(3-furyl-5-methylcyclopentadienyl)(octamethyloctahydridodibenzofluorenyl)zirconium dichloride, isopropylidene (3-thienyl-5-methylcyclopentadienyl)(fluorenyl)zirconium dichloride, isopropylidene (3-thienyl-5-methylcyclopentadienyl)(2,7-di-tert-butylfluorenyl)zirconium dichloride, isopropylidene(3-thienyl-5-methylcyclopentadienyl)(3,6-di-tert-butylfluorenyl)zirconium dichloride, isopropylidene(3-thienyl-5-methylcyclopentadienyl)(octamethyloctahydridodibenzofluorenyl)zirconium dichloride, diphenylmethylene (3-thienyl-5-methylcyclopentadienyl)(fluorenyl)zirconium dichloride, diphenylmethylene (3-thienyl-5-methylcyclopentadienyl)(2,7-di-tert-butylfluorenyl)zirconium dichloride, diphenylmethylene(3-thienyl-5-methylcyclopentadienyl)(3,6-di-tert-butylfluorenyl)zirconium dichloride, diphenylmethylene(3-thienyl-5-methylcyclopentadienyl)(octamethyloctahydridodibenzofluorenyl)zirconium dichloride, cyclohexylidene (3-thienyl-5-methylcyclopentadienyl)(fluorenyl)zirconium dichloride, cyclohexylidene (3-thienyl-5-methylcyclopentadienyl)(2,7-di-tert-butylfluorenyl)zirconium dichloride, cyclohexylidene(3-thienyl-5-methylcyclopentadienyl)(3,6-di-tert-butylfluorenyl)zirconium dichloride, cyclohexylidene(3-thienyl-5-methylcyclopentadienyl)(octamethyloctahydridodibenzofluorenyl)zirconium dichloride, phenylmethylmethylene (3-thienyl-5-methylcyclopentadienyl)(fluorenyl)zirconium dichloride, phenylmethylmethylene(3-thienyl-5-methylcyclopentadienyl)(2,7- di-tert-butylfluorenyl)zirconium dichloride, phenylmethylmethylene(3-thienyl-5-methylcyclopentadienyl)(3,6-di-tert-butylfluorenyl)zirconium dichloride, phenylmethylmethylene(3-thienyl-5-methylcyclopentadienyl)(octamethyloctahydridodibenzofluorenyl)zirconium dichloride, and dibromide compounds, dialkyl compounds and dialkoxy compounds of the above metallocene compounds, and corresponding metallocene compounds to the above compounds except that the central metals are replaced with hafnium or titanium. The compounds listed above are just illustrative and do not limit the scope of the present invention.

The propylene elastomer (PBER) of the present invention contains:

(a) units derived from propylene in an amount of 50 to 85 mol %, preferably 60 to 85 mol %, and more preferably 65 to 80 mol %;

(b) units derived from 1-butene in an amount of 5 to 25 mol %, preferably 5 to 20 mol %, and more preferably 5 to 15 mol %; and (c) units derived from ethylene in an amount of 10 to 25 mol %, preferably 13 to 25 mol %, and more preferably 13 to 23 mol %.

The propylene content and the ethylene content have a molar ratio (propylene/ethylene) of 89/11 to 70/30, preferably 89/11 to 75/25, and more preferably 89/11 to 80/20. The propylene elastomer has a modulus in tension (YM) of 40 MPa or less, preferably 30 MPa or less, and more preferably 20 MPa or less as measured in accordance with JIS 6301.

The propylene elastomer (PBER) having the above properties exhibits high transparency, excellent flexibility and good compatibility with polypropylenes.

Preferably, the propylene elastomer (PBER) further has the following properties.

The propylene elastomer (PBER) has an mm fraction of 85 to 97.5%, preferably 87 to 97%, and more preferably 90 to 97% as determined by the procedure for the propylene/1-butene random copolymer (PBR). Importantly, the mm fraction should fall within a moderate upper limit. The mm fraction within the above specific range enables the elastomer to have a lower melting point while containing a relatively large amount of propylene.

The propylene elastomer (PBER) of the present invention has a molecular weight distribution (Mw/Mn) of 1 to 3, preferably 1.5 to 2.5 as measured by gel permeation chromatography (GPC). The intrinsic viscosity of the propylene elastomer (PBER) as measured in decalin at 135° C. ranges from 0.1 to 5 dl/g, preferably from 1 to 3 dl/g. The propylene elastomer (PEER) of the present invention has a glass transition temperature (Tg) of −15 to −40° C., preferably −20 to −35° C., and has no melting point (Tm).

The propylene elastomer (PBER) of the present invention is preferably produced using the metallocene catalyst systems used for the propylene/1-butene random copolymer (PBR). Specifically, the transition metal compound (1a) is preferable, and more preferably, $R^1$ of the transition metal compound (1a) is a hydrocarbon group or a silicon-containing group.

The polypropylene composition (CC-1) according to the present invention contains the aforesaid polypropylene (PP-A) in an amount of 5 to 95 wt %, preferably 20 to 95 wt %, and more preferably 40 to 90 wt %, and the propylene/1-butene random copolymer (PBR) in an amount of 95 to 5 wt %, preferably 80 to 5 wt %, and more preferably 60 to 10 wt %.

The polypropylene composition (CC-2) of the present invention contains the crystalline polypropylene (PP-A) in an amount of 0 to 95 wt %, preferably 5 to 95 wt %, and more preferably 20 to 95 wt %, and the propylene/1-butene random copolymer (PBR) in an amount of 5 to 100 wt %, preferably 5 to 95 wt %, and more preferably 5 to 80 wt %.

The polypropylene compositions (CC-1) and (CC-2) may be prepared by known processes for the production of resin compositions. For example, the polypropylene (PP-A) and the propylene/1-butene random copolymer (PBR) may be melt kneaded.

The polypropylene compositions (CC-1) and (CC-2) of the present invention may contain additives or other resins in addition to the polypropylene and the propylene/1-butene copolymer without adversely affecting the objects of the invention.

The additives include nucleating agents, antioxidants, hydrochloric acid absorbers, heat stabilizers, light stabilizers, ultraviolet light absorbers, lubricants, anti-blocking agents, antistatic agents, flame-retardants, pigments, dyes, dispersants, copper inhibitors, neutralizing agents, foaming agents, plasticizers, anti-foaming agents, crosslinking agents, flow modifiers such as peroxides, and weld strength improvers.

Additives, including those listed above, that are conventionally used for the polyolefin resins may be employed without limitation.

The antioxidants include phenol-based, sulfur-based and phosphorous-based antioxidants. The phenol-based antioxidants include phenols, such as 2,6-di-tert-butyl-p-cresol, stearyl (3,3-dimethyl-4-hydroxybenzyl) thioglycolate, stearyl-β-(4-hydroxy-3,5-di-tert-butylphenol)propionate, distearyl-3,5-di-tert-butyl-4-hydroxybenzyl phosphonate, 2,4,6-tris(3',5'-di-tert-butyl-4'-hydroxybenzylthio)-1,3,5-triazine, distearyl (4-hydroxy-3-methyl-5-tert-butylbenzyl)malonate, 2,2'-methylenebis(4-methyl-6-tert-butylphenol), 4,4'-methylenebis(2,6-di-tert-butylphenol), 2,2'-methylenebis[6-(1-methylcyclohexyl)p-cresol], bis[3,5-bis[4-hydroxy-3-tert-butylphenyl]butyric acid]glycol ester, 4,4'-butylidenebis (6-tert-butyl-m-cresol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris (2,6-dimethyl-3-hydroxy-4-tert-butyl)benzylisocyanurate, 1,3,5-tris(3,5-di-tert-butyl-4-hydroxybenzyl)-2,4,6-trimethylbenzene, tetrakis[methylene-3-(3,5-di-tert-butyl-4-hydroxyphenyl)propionate]methane, 1,3,5-tris(3,5-di-tert-butyl-4-hydroxybenzyl)isocyanurate, 1,3,5-tris[(3,5-di-tert-butyl-4-hydroxyphenyl) propionyloxyethyl]isocyanurate, 2-octylthio-4,6-di(4-hydroxy-3,5-di-tert-butyl)phenoxy-1,3, 5-triazine and 4,4'-thiobis(6-tert-butyl-m-cresol); and polyhydric phenol/carbonic acid oligoesters, such as carbonic acid oligoesters (e.g., polymerization degrees of 2 to 10) of 4,4'-butylidenebis(2-tert-butyl-5-methylphenol).

The sulfur-based antioxidants include dialkyl thiodipropionates such as dilauryl, dimyristyl and distearyl thiodipropionates; and esters (for example, pentaerythritoltetralauryl thiopropionate) formed between alkyl thiopropionic acids such as butyl, octyl, lauryl and stearyl thiopropionic acids and polyhydric alcohols such as glycerol, trimethylolethane, trimethylolpropane, pentaerythritol and trishydroxyethyl isocyanurate.

The phosphorous-based antioxidants include trioctyl phosphite, trilauryl phosphite, tridecyl phosphite, octyl-diphenyl phosphite, tris(2,4-di-tert-butylphenyl)phosphite, triphenyl phosphite, tris(butoxyethyl)phosphite, tris(nonylphenyl) phosphite, distearylpentaerythritol diphosphite, tetra(tridecyl)-1,1,3-tris (2-methyl-5-tert-butyl-4-hydroxyphenyl)butane diphosphite, tetra($C_{12-15}$ alkyls)-4,4'-isopropylidenediphenyl diphosphite, tetra(tridecyl)-4,4'-butylidenebis (3-methyl-6-tert-butylphenol) diphosphite, tris (3,5-di-tert-butyl-4-hydroxyphenyl)phosphite, tris(mono- and di-nonylphenyls) phosphite, hydrogenated-4,4'-isopropylidenediphenol polyphosphite, bis(octylphenyl) bis[4,4'-butylidenebis(3-methyl-6-tert-butylphenol)]•1,6-hexanediol diphosphite, phenyl 4,4'-isopropylidenediphenol pentaerythritol diphosphite, bis(2,4-di-tert-butylphenyl)pentaerythritol diphosphite, bis(2,6-di-tert-butyl-4-methylphenyl)pentaerythritol diphosphite, tris[4,4'-isopropylidenebis(2-tert-butylphenol)]phosphite, phenyl•diisodecyl phosphite, di(nonylphenyl)pentaerythritol diphosphite, tris(1,3-distearoyloxyisopropyl)phosphite, 4,4'-isopropylidenebis(2-tert-butylphenol)•di(nonylphenyl)phosphite, 9,10-di-hydro-9-oxa-9-oxa-10-phosphaphenanthrene-10-oxide and tetrakis (2,4-di-tert-butylphenyl)-4,4'-biphenylene diphosphonite.

Other antioxidants include 6-hydroxychromane derivatives, such as α-, β-, γ- and δ-tocopherols and mixtures thereof, 2,5-dimethyl substitution product, 2,5,8-trimethyl substitution product and 2,5,7,8-tetramethyl substitution product of 2-(4-methyl-penta-3-enyl)-6-hydroxychroman, 2,2,7-trimethyl-5-tert-butyl-6-hydroxychroman, 2,2,5-trimethyl-7-tert-butyl-6-hydroxychroman, 2,2,5-trimethyl-6-tert-butyl-6-hydroxychroman and 2,2-dimethyl-5-tert-butyl-6-hydroxychroman.

Exemplary hydrochloric acid absorbers include double compounds represented by $M_xAl_y(OH)_{2x+3y-2z}(A)_z \cdot aH_2O$ (wherein M is Mg, Ca or Zn; A is an anion other then the hydroxyl group; x, y and z are each a positive number; and a is 0 or a positive number), such as $Mg_6Al_2(OH)_{16}CO_3 \cdot 4H_2O$, $Mg_6Al_2(OH)_{20}CO_3 \cdot 5H_2O$, $Mg_5Al_2(OH)_{14}CO_3 \cdot 4H_2O$, $Mg_{10}Al_2(OH)_{22}(CO_3)_2 \cdot 4H_2O$, $Mg_6Al_2(OH)_{16}HPO_4 \cdot 4H_2O$, $Ca_6Al_2(OH)_{16}CO_3 \cdot 4H_2O$, $Zn_6Al_2(OH)_{16}CO_3 \cdot 4H_2O$, $Zn_6Al_2(OH)_{16}SO_4 \cdot 4H_2O$, $Mg_6Al_2(OH)_{16}SO_3 \cdot 4H_2O$ and $Mg_6Al_2(OH)_{12}CO_3 \cdot 3H_2O$.

The light stabilizers include hydroxybenzophenones, such as 2-hydroxy-4-methoxybenzophenone, 2-hydroxy-4-n-octoxybenzophenone, 2,2'-di-hydroxy-4-methoxybenzophenone and 2,4-dihydroxybenzophenone; benzotriazoles, such as 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-methylphenyl)benzotriazole and 2-(2'-hydroxy-3',5'-di-tert-amylphenyl) benzotriazole; benzoates, such as phenyl salicylate, p-tert-butylphenyl salicylate, 2,4-di-tert-butylphenyl-3,5-di-tert-butyl-4-hydroxybenzoate and hexadecyl-3,5-di-tert-butyl-4-hydroxybenzoate; nickel compounds, such as 2,2'-thiobis(4-tert-octylphenol) nickelate, [2,2'-thiobis(4-tert-octylphenolato)]-n-butylamine nickelate and (3,5-di-tert-butyl-4-hydroxybenzyl)monoethyl phosphonate nickelate; substituted acrylonitriles, such as α-cyano-β-methyl-β-(p-methoxyphenyl)methyl acrylate; oxalic acid diamides, such as N'-2-ethylphenyl-N-ethoxy-5-tert-butylphenyloxalic diamide and N-2-ethylphenyl-N'-2-ethoxyphenyloxalic diamide; and hindered amine compounds, such as bis(2,2,6,6-tetramethyl-4-piperidine)sebacate, poly[{(6-(1,1,3,3-tetramethylbutyl)imino}-1,3,5-triadine-2,4-diyl{4-(2,2,6,6-tetramethylpiperidyl)imino}hexamethylene] and a condensate of 2-(4-hydroxy-2,2,6,6-tetramethyl-1-piperidyl) ethanol and dimethyl succinate.

The lubricants include aliphatic hydrocarbons, such as paraffin waxes, polyethylene waxes and polypropylene waxes; higher fatty acids, such as capric acid, lauric acid, myristic acid, palmitic acid, margaric acid, stearic acid, arachidic acid and behenic acid, and metal salts thereof, such as lithium salts, calcium salts, sodium salts, magnesium salt and potassium salts thereof; aliphatic alcohols, such as palmityl alcohols, cetyl alcohols and stearyl alcohols; aliphatic amides, such as caproic amides, caprylic amides, capric amides, lauric amides, myristic amides, palmitic amides, stearic amides and erucic amides; esters of aliphatic compounds and alcohols; and fluorine compounds, such as fluoroalkylcarboxylic acids, metal salts thereof and metal salts of fluoroalkylsulfonic acids.

The anti-blocking agents include fine particles of inorganic compounds, such as silica, alumina, alumina silicate and diatomaceous earth; and fine particles of organic compounds, such as polyethylenes, crosslinked polyethylenes, polymethyl methacrylates and crosslinked polymethyl methacrylates.

The polypropylene composition may contain these additives in amounts between 0.0001 and 10 wt %. These additives enable the polypropylene composition of the present invention to provide molded articles that have further improved property balance, durability, paintability, printability, scratch resistance and molding processability.

As described earlier, the polypropylene composition of the present invention may contain a nucleating agent. Herein, various nucleating agents known in the art may be used without limitation. Particularly, aromatic phosphates, dibenzylidene sorbitols and other nucleating agents given below are preferable nucleating agents.

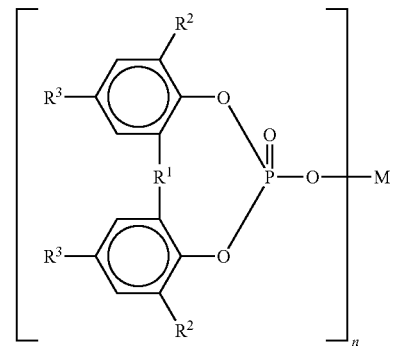

In the formula immediately above, $R^1$ is an oxygen atom, a sulfur atom or a hydrocarbon group of 1 to 10 carbon atoms; $R^2$ and $R^3$, which may be the same or different, are each a hydrogen atom or a hydrocarbon group of 1 to 10 carbon atoms; $R^{2'}$s, $R^{3'}$s, or $R^2$ and $R^3$ may link together to form a ring; M is a metal atom having a valency of 1 to 3; and n is an integer of 1 to 3.

The nucleating agents having this formula include sodium-2,2'-methylene-bis(4,6-di-t-butylphenyl)phosphate, sodium-2,2'-ethylidene-bis(4,6-di-t-butylphenyl)phosphate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl) phosphate, calcium-bis[2,2'-thiobis (4-methyl-6-t-butylphenyl)phosphate], calcium-bis[2,2'-thiobis(4-ethyl-6-t-butylphenyl)phosphate], calcium-bis[2,2'-thiobis-(4,6-di-t-butylphenyl)phosphate], magnesium-bis[2,2'-thiobis(4,6-di-t-butylphenyl)phosphate], magnesium-bis[2,2'-thiobis-(4-t-octylphenyl)phosphate], sodium-2,2'-butylidene-bis(4,6-di-methylphenyl)phosphate, sodium-2,2'-butylidene-bis(4,6-di-t-butylphenyl)phosphate, sodium-2,2'-t-octylmethylene-bis(4,6-di-methylphenyl) phosphate, sodium-2,2'-t-octylmethylene-bis(4,6-di-t-butylphenyl)phosphate, calcium-bis-(2,2'-methylene-bis(4,6-di-t-butylphenyl)phosphate), magnesium-bis[2,2'-methylene-bis(4,6-di-t-butylphenyl)phosphate], barium-bis[2,2'-methylene-bis(4,6-di-t-butylphenyl)phosphate], sodium-2,2'-methylene-bis(4- methyl-6-t-butylphenyl)phosphate, sodium-2,2'-methylene-bis(4-ethyl-6-t-butylphenyl)phosphate, sodium(4,4'-dimethyl-5,6'-di-t-butyl-2,2'-biphenyl)phosphate, calcium-bis[(4,4'-dimethyl-6,6'-di-t-butyl-2,2'-biphenyl)phosphate], sodium-2,2'-ethylidene-bis(4-m-butyl-6-t-butylphenyl) phosphate, sodium-2,2'-methylene-bis(4,6-di-methylphenyl) phosphate, sodium-2,2'-methylene-bis (4,6-di-ethylphenyl) phosphate, potassium-2,2'-ethylidene-bis(4,6-di-t-butylphenyl)phosphate, calcium-bis[2,2'-ethylidene-bis(4,6-di-t-butylphenyl)phosphate], magnesium-bis[2,2'-ethylidene-bis(4,6-di-t-butylphenyl)phosphate], barium-bis[2,2'-ethylidene-bis(4,6-di-t-butylphenyl)phosphate], aluminum-tris[2,2'-methylene-bis(4,6-di-t-butylphenyl) phosphate], aluminum-tris[2,2'-ethylidene-bis(4,6-di-t-butylphenyl)phosphate] and mixtures thereof. Of these, sodium-2,2'-methylene-bis(4,6-di-t-butylphenyl)phosphate is preferable.

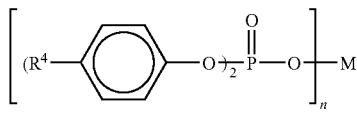

In the formula immediately above, $R^4$ is a hydrogen atom or a hydrocarbon group of 1 to 10 carbon atoms; M is a metal atom having a valency of 1 to 3; and n is an integer of 1 to 3.

The nucleating agents having this formula include sodium-bis(4-t-butylphenyl)phosphate, sodium-bis(4-methylphenyl) phosphate, sodium-bis(4-ethylphenyl)phosphate, sodium-bis (4-i-propylphenyl)phosphate, sodium-bis(4-t-octylphenyl) phosphate, potassium-bis(4-t-butylphenyl)phosphate, calcium-bis(4-t-butylphenyl)phosphate, magnesium-bis(4-t-butylphenyl)phosphate, lithium-bis(4-t-butylphenyl)phosphate, aluminum-bis(4-t-butylphenyl)phosphate, and mixtures thereof. Of these, sodium-bis(4-t-butylphenyl) phosphate is preferable.

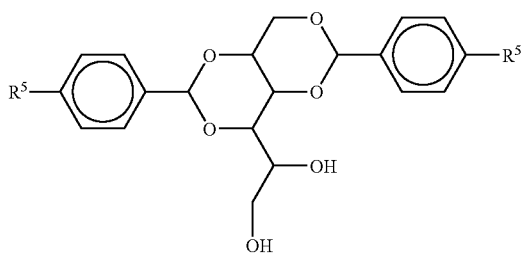

In the formula immediately above, each $R^5$ is a hydrogen atom or a hydrocarbon group of 1 to 10 carbon atoms.

The nucleating agents having this formula include 1,3,2,4-dibenzylidene sorbitol, 1,3-benzylidene-2,4-p-methylbenzylidene sorbitol, 1,3-benzylidene-2,4-p-ethylbenzylidene sorbitol, 1,3-p-methylbenzylidene-2,4-benzylidene sorbitol, 1,3-p-ethylbenzylidene-2,4-benzylidene sorbitol, 1,3-p-methylbenzylidene-2,4-p-ethylbenzylidene sorbitol, 1,3-p-ethylbenzylidene-2,4-p-methylbenzylidene sorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-1-propylbenzylidene)sorbitol, 1,3,2,4-di(p-n-butylbenzylidene)sorbitol, 1,3,2,4-di(p-s-butylbenzylidene) sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2-4-p-chlorobenzylidene sorbitol, 1,3-p-chlorobenzylidene-2,4-benzylidene sorbitol, 1,3-p-chlorobenzylidene-2,4-p-methylbenzylidene sorbitol, 1,3-p-chlorobenzylidene-2,4-p-ethylbenzylidene sorbitol, 1,3-p-methylbenzylidene-2,4-p-chlorobenzylidene sorbitol, 1,3-p-ethylbenzylidene-2,4-p-chlorobenzylidene sorbitol, 1,3,2,4-di(p-chlorobenzylidene)sorbitol and mixtures thereof. Of these, 1,3,2,4-dibenzylidene sorbitol, 1,3,2,4-di (p-methylbenzylidene)sorbitol, 1,3,2,4-di(p-ethylbenzylidene)sorbitol, 1,3-p-chlorobenzylidene-2,4-p-methylbenzylidene sorbitol, 1,3,2,4-di(p-chlorobenzylidene) sorbitol and mixtures thereof are preferable.

Other nucleating agents include metallic salts of aromatic carboxylic acids and of aliphatic carboxylic acids, such as aluminum benzoate, aluminum p-t-butylbenzoate, sodium adipate, sodium thiophenecarboxylate and sodium pyrrolecarboxylate.

Inorganic compounds such as talc are also employable as the nucleating agents. The polypropylene compositions (CC-1) and (CC-2) may each contain the nucleating agent in an amount of 0.001 to 10 wt %, preferably 0.01 to 5 wt %, and particularly preferably 0.1 to 3 wt %.

Examples of the other resins include thermoplastic resins and thermosetting resins, including α-olefin homopolymers such as polyethylene and poly-1-butene, α-olefin copolymers, copolymers of α-olefins and vinyl monomers, modified olefin polymers such as maleic anhydride-modified polypropylenes, nylons, polycarbonates, ABS resins, polystyrenes, polyvinyl chlorides, polyphenylene oxides, petroleum resins and phenolic resins.

Further, the polypropylene compositions (CC-1) and (CC-2) of the present invention may each contain an inorganic filler. Examples thereof include:

powdery fillers, including natural silicic acids and silicates such as fine powder talc, kaolinite, calcined clay, pyrophyllite, sericite and wollastonite; carbonates such as precipitated calcium carbonate, ground calcium carbonate and magnesium carbonate; hydroxides such as aluminum hydroxide and magnesium hydroxide; oxides such as zinc oxide, zinc white and magnesium oxide; and synthetic silicic acids and silicates such as hydrated calcium silicate, hydrated aluminum silicate, hydrated silicic acid and silicic anhydride;

flaky fillers, including mica;

fibrous fillers, including basic magnesium sulfate whisker, calcium titanate whisker, aluminum borate whisker, sepiolite, PMF (processed mineral fiber), xonotlite, potassium titanate and ellestadite; and balloon fillers, including glass balloon and fly ash balloon.

Of these fillers, fine powder talc is preferably used in the present invention. Particularly preferably, the fine powder talc has a mean particle diameter of 0.2 to 3 μm, especially 0.2 to 2.5 μm.

Desirably, the fine powder talc contains particles whose mean diameter is 5 μm or more in an amount of 10 wt % or less, preferably 8 wt % or less. The mean particle diameter of the talc can be measured by liquid-phase precipitation.

The talc for use in the present invention preferably has a mean aspect ratio (ratio of longitudinal or lateral length to thickness) of 3 or more, particularly 4 or more.

The inorganic fillers of the present invention, particularly talc, may be surface treated prior to use, which is not compulsory. The surface treatment can be carried out chemically, for example, using treating agents such as silane coupling agents, higher fatty acids, metal salts of fatty acids, unsaturated organic acids, organic titanates, resin acids and polyethylene glycols or physically.

The surface-treated inorganic fillers, such as talc, enable the polypropylene composition to exhibit excellent weld strength, paintability and molding processability.

The inorganic fillers as mentioned above may be used in combination of two or more kinds. If necessary, in the present invention, organic fillers such as high styrenes, lignins and reclaimed rubbers may be used together with the inorganic fillers.

The polypropylene composition (CC-1) of the present invention exhibits excellent heat resistance and low-temperature heat-sealability as well as adequate flexibility and impact resistance. The polypropylene composition may be favorably used to produce, in addition to the sheet or film as disclosed in the present invention, injection molded articles such as containers, stretch-blow molded articles and containers for retort pouch foods that have improved impact resistance.

The polypropylene composition (CC-1) of the present invention has other various applications, including home electric appliance parts such as housings and washing machine tubs; automobile interior parts such as trims, interior panels and column covers; automobile exterior parts such as fenders, bumpers, side moles, mudguards and mirror covers; and ordinary miscellaneous goods.

The propylene/1-butene random copolymer (PBR) described above may be partially or completely modified with an unsaturated carboxylic acid or an anhydride thereof. The modified propylene/1-butene random copolymer can exhibit enhanced overlap packaging properties and adhesion to metals.

The sheet or film obtained from the polypropylene composition according to the present invention has a thickness of 1 to 2000 μm, preferably 2 to 1500 μm.

The sheet or film obtainable from the polypropylene composition exhibits excellent flexibility, impact resistance, transparency, low-temperature heat-sealability, anti-blocking properties, and mechanical strength such as scratch resistance. Therefore, it can be suitably employed as transparent and flexible sheets, and as sealant films.

The sheet or film of the present invention may be produced by the known production method for polyolefin sheets or films. Exemplary processes include extrusion, such as cast film extrusion and inflation film extrusion, and calendering. Since the polypropylene composition of the present invention has an excellent balance between the melting point and the crystallization rate, it can provide sheets or films having good appearance by the above processes with good productivity.

The laminate according to the present invention comprises a crystalline polypropylene layer (I) and a polypropylene resin composition layer (II) disposed on at least one surface of the crystalline polypropylene layer (I). The crystalline polypropylene layer (I) ranges in thickness from 1 to 2000 μm, preferably from 2 to 1500 μm, and the polypropylene composition layer (II) has a thickness of 0.1 to 200 μm, preferably 0.2 to 150 μm.

The laminate of the present invention has excellent transparency, low-temperature heat-sealability, anti-blocking properties, and mechanical strength such as scratch resistance. Therefore, it can be suitably employed as sealant films.

The laminate of the present invention may be produced by the known production process for polyolefin laminates. Preferred processes include coextrusion. Since the polypropylene composition of the present invention has an excellent balance between the melting point and the crystallization rate, it can provide sheets or films having good appearance by the above process with good productivity.

The sheet, film or laminate (otherwise composite film) according to the present invention may be unoriented or oriented in at least one direction. The unoriented or oriented sheet or film may be corona treated on either or both surfaces by the conventional method.

The oriented film may be favorably used as sealant films and shrink films. Particularly, the oriented film obtainable from the polypropylene composition of the present invention is ideal as a shrink film because of its excellent shrink properties. Orientation may be carried out by conventional methods for stretching polyolefin films. Specific examples include rolling orientation, tentering and tubular orientation. The draw ratio is 1.5 to 30 times, and generally 3 to 15 times.

The sheet, film, laminate, oriented film and oriented laminate of the present invention may be used singly or, for the purpose of higher barrier properties and rigidity, may be laminated with another film. The laminating films include polyolefin films, polystyrene films, polyester films, polyamide films, oriented films thereof, laminates of polyolefin films and gas-barrier films, aluminum foils, paper and metallized films. Preferred laminating processes include extrusion laminating and dry laminating.

The sheet, film and laminate comprising the polypropylene composition of the present invention have excellent transparency, flexibility, anti-blocking properties and heat-sealability. Particularly, they can be heat sealed even at lower temperatures to provide a wide range of heat seal temperatures. Also, they can be heat sealed with sufficient strength. The film remains unchanged in terms of heat seal strength even after long storage, so that stable heat sealing is ensured. The film obtained by orienting the sheet, film or laminate according to the present invention exhibits superior heat sealability, blocking resistance and shrink properties.

The sheet, film, laminate, oriented film and oriented laminate (otherwise composite film) of the present invention have exceptional transparency, scratch resistance and blocking resistance to allow high-speed packaging. Therefore, they are favorably used in, for example, food packaging, packed wrapping and fiber packaging.

Hereinbelow, descriptions will be sequentially presented for the transition metal compound of the formula (2a), exemplary preferred transition metal compounds, production process for the transition metal compound, preferred embodiment of the transition metal compound in olefin polymerization catalysts, and olefin polymerization in the presence of an olefin polymerization catalyst containing the transition metal compound of the present invention.

Transition Metal Compound

The transition metal compound according to the present invention has the formula (2a):

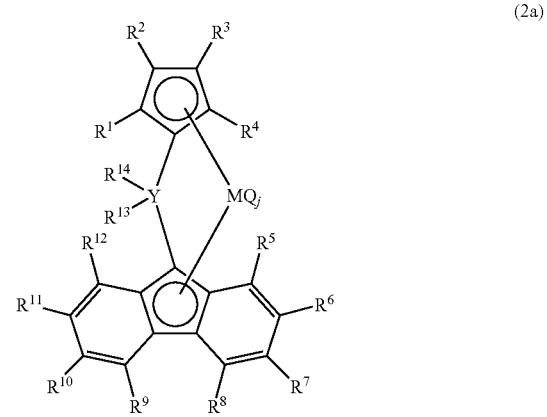

(2a)

wherein $R^1$ and $R^3$ are each a hydrogen atom; $R^2$ and $R^4$, which may be the same or different, are each a hydrocarbon group or a silicon-containing group; and $R^5$, $R^6$, $R^8$, $R^9$, $R^{10}$, $R^{11}$, $R^{12}$ and $R^{13}$, which may be the same or different, are each a hydrogen atom, a hydrocarbon group or a silicon-containing group.

The hydrocarbon groups include linear hydrocarbon groups such as methyl, ethyl, n-propyl, allyl, n-butyl, n-pentyl, n-hexyl, n-heptyl, n-octyl, n-nonyl and n-decanyl groups; branched hydrocarbon groups such as isopropyl, tert-butyl, amyl, 3-methylpentyl, 1,1-diethylpropyl, 1,1-dimethylbutyl, 1-methyl-1-propylbutyl, 1,1-dipropylbutyl, 1,1-dimethyl-2-methylpropyl and 1-methyl-1-isopropyl-2-methylpropyl groups; saturated cyclic hydrocarbon groups such as cyclopentyl, cyclohexyl, cycloheptyl, cyclooctyl, norbornyl and adamantyl groups; unsaturated cyclic hydrocarbon groups such as phenyl, tolyl, naphthyl, biphenyl, phenanthryl and anthracenyl groups; saturated hydrocarbon groups substituted with unsaturated cyclic hydrocarbon groups, such as benzyl, cumyl, 1,1-diphenylethyl and triphenylmethyl groups; and heteroatom-containing hydrocarbon groups such as methoxy, ethoxy, phenoxy, furyl, N-methylamino, N,N-dimethylamino, N-phenylamino, pyrryl and thienyl groups.

The silicon-containing groups include trimethylsilyl, triethylsilyl, dimethylphenylsilyl, diphenylmethylsilyl and triphenylsilyl groups. Neighboring substituent groups of $R^5$ to $R^{12}$ may link together to form a ring. Examples of the substituted fluorenyl group include benzofluorenyl, dibenzofluorenyl, octahydrodibenzofluorenyl, octahydrooctahydrodibenzofluorenyl and octamethyltetrahydrodicyclopentafluorenyl groups.

$R^{14}$ is an aryl group. Examples thereof include the above-mentioned unsaturated cyclic hydrocarbon groups, saturated hydrocarbon groups substituted with unsaturated cyclic hydrocarbon groups, and heteroatom-containing unsaturated cyclic hydrocarbon groups such as furyl, pyrryl and thienyl groups. $R^{13}$ and $R^{14}$ may be the same or different and may link together to form a ring. Examples of such substituent groups include:

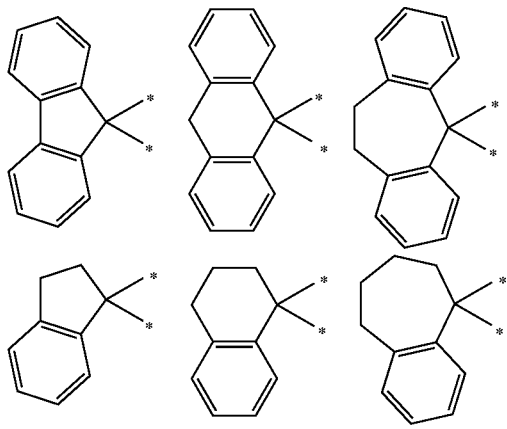

*: Links with cyclopentadienyl groups and fluorenyl groups

In the formula (2a), $R^2$ and $R^4$, substituent groups to the cyclopentadienyl ring, are preferably hydrocarbon groups of 1 to 20 carbon atoms. Examples of the hydrocarbon groups of 1 to 20 carbon atoms include the aforementioned hydrocarbon groups. More preferably, $R^2$ is a bulky substituent group such as tert-butyl, adamantyl or triphenylmethyl group, and $R^4$ is a sterically smaller substituent group than $R^2$, such as methyl, ethyl or n-propyl group. As used herein, "sterically smaller" means that the substituent group has a smaller volume.

Of the substituent groups $R^5$ to $R^{12}$ to the fluorenyl rings in the formula (2a), arbitrary two or more groups of $R^6$, $R^7$, $R^{10}$ and $R^{11}$ are preferably hydrocarbon groups of 1 to 20 carbon atoms. Examples of the hydrocarbon groups of 1 to 20 carbon atoms include the aforesaid hydrocarbon groups. For the purpose of easy synthesis of a ligand, these groups are preferably symmetrical: $R^6$ and $R^{11}$ are the same groups and $R^7$ and $R^{10}$ are the same groups. In one of such preferred embodiments, $R^6$ and $R^7$ form an aliphatic ring (AR-1) and $R^{10}$ and $R^{11}$ form an aliphatic ring (AR-2) identical to the aliphatic ring (AR-1).

Referring to the formula (2a), Y bridging the cyclopentadienyl and fluorenyl rings is a carbon atom. The substituent groups $R^{13}$ and $R^{14}$ to Y are preferably both aryl groups having 6 to 20 carbon atoms. These substituent groups may be the same or different, and may link together to form a ring. Exemplary aryl groups of 6 to 20 carbon atoms include the above-mentioned unsaturated cyclic hydrocarbon groups, saturated hydrocarbon groups substituted with unsaturated cyclic hydrocarbon groups, and heteroatom-containing unsaturated cyclic hydrocarbon groups. $R^{13}$ and $R^{14}$ may be the same or different, and may link together to form a ring. Preferred examples thereof include fluorenylidene, 10-hydroanthracenylidene and dibenzocycloheptadienylidene groups.

In the formula (2a), M denotes a Group-4 transition metal, such as Ti, Zr or Hf; Q denotes a halogen atom, a hydrocarbon group, an anionic ligand or a neutral ligand capable of coordination by a lone pair of electrons, and may be the same or different when plural; and j is an integer of 1 to 4. When j is 2 or greater, Q may be the same or different. The halogens include fluorine, chlorine, bromine and iodine. Examples of the hydrocarbon group are as described above. Exemplary anionic ligands include alkoxy groups such as methoxy, tert-butoxy and phenoxy groups; carboxylate groups such as acetate and benzoate groups; and sulfonate groups such as mesylate and tosylate groups. The neutral ligands capable of coordination by a lone pair of electrons include organophosphorus compounds such as trimethylphosphine, triethylphosphine, triphenylphosphine and diphenylmethylphosphine; and ethers such as tetrahydrofuran, diethylether, dioxane and 1,2-dimethoxyethane. Preferably, at least one Q is the halogen atom or alkyl group.

Exemplary Preferred Transition Metal Compounds

Preferred transition metal compounds for the present invention include diphenylmethylene(3,5-dimethyl-cyclopentadienyl)(fluorenyl)zirconium dichloride, diphenylmethylene(3,5-dimethyl-cyclopentadienyl)(2,7-di-tert-butylfluorenyl)zirconium dichloride, diphenylmethylene(3,5-dimethyl-cyclopentadienyl)(3,6-di-tert-butylfluorenyl) zirconium dichloride, diphenylmethylene(3,5-dimethyl-cyclopentadienyl)(octamethyloctahydrodibenzofluorenyl) zirconium dichloride, diphenylmethylene(3-tert-butyl-5-methyl-cyclopentadienyl)(fluorenyl)zirconium dichloride, diphenylmethylene(3-tert-butyl-5-methyl-cyclopentadienyl) (2,7-di-tert-butylfluorenyl)zirconium dichloride, diphenylmethylene(3-tert-butyl-5-methyl-cyclopentadienyl)(3,6-di-tert-butylfluorenyl)zirconium dichloride, diphenylmethylene (3-tert-butyl-5-methyl-cyclopentadienyl) (octamethyloctahydrodibenzofluorenyl)zirconium dichloride, diphenylmethylene(3-(2-adamantyl)-5-methyl-cyclopentadienyl)(fluorenyl)zirconium dichloride, diphenylmethylene(3-(2-adamantyl)-5-methyl-cyclopentadienyl)(2,7-di-tert-butylfluorenyl)zirconium dichloride, diphenylmethylene(3-(2-adamantyl)-5-methyl-cyclopentadienyl)(3,6-di-tert-butylfluorenyl)zirconium dichloride, diphenylmethylene(3-(2-adamantyl)-5-methyl-cyclopentadienyl)(octamethyloctahydrodibenzofluorenyl)zirconium dichloride, diphenylmethylene(3-tert-butyl-5-ethyl-cyclopentadienyl)(fluorenyl)zirconium dichloride, diphenylmethylene(3-tert-butyl-5-ethyl-cyclopentadienyl) (2,7-di-tert-butylfluorenyl)zirconium dichloride, diphenylmethylene(3-tert-butyl-5-ethyl-cyclopentadienyl)(3,6-di-tertbutylfluorenyl)zirconium dichloride, diphenylmethylene(3-tert-butyl-5-ethyl-cyclopentadienyl)(octamethyloctahydrodibenzofluorenyl)zirconium dichloride, diphenylmethylene(3-tert-butyl-2,5-dimethyl-cyclopentadienyl)(fluorenyl)zirconium dichloride, diphenylmethylene(3-tert-butyl-2,5-dimethyl-cyclopentadienyl)(2,7-di-tert-butylfluorenyl)zirconium dichloride, diphenylmethylene(3-tert-butyl-2,5-dimethyl-cyclopentadienyl)(3,6-di-tert-butylfluorenyl)zirconium dichloride, diphenylmethylene(3-tert-butyl-2,5-dimethyl-cyclopentadienyl)(octamethyloctahydrodibenzofluorenyl)zirconium dichloride, di(p-tolyl)methylene(3,5-dimethyl-cyclopentadienyl)(fluorenyl)zirconium dichloride, di(p-tolyl)methylene(3,5-dimethyl-cyclopentadienyl)(2,7-di-tert-butylfluorenyl)zirconium dichloride, di(p-tolyl)methylene(3,5-dimethyl-cyclopentadienyl)(3,6-di-tert-butylfluorenyl)zirconium dichloride, di(p-tolyl)methylene(3,5-dimethyl-cyclopentadienyl)(octamethyloctahydrodibenzofluorenyl)zirconium dichloride, di(p-tolyl)methylene(3-tert-butyl-5-methyl-cyclopentadienyl)(fluorenyl)zirconium dichloride, di(p-tolyl)methylene(3-tert-butyl-5-methyl-cyclopentadienyl)(2,7-di-tert-butylfluorenyl)zirconium dichloride, di(p-tolyl)methylene(3-tert-butyl-5-methyl-cyclopentadienyl)(3,6-di-tert-butylfluorenyl)zirconium dichloride, di(p-tolyl)methylene(3-tert-butyl-5-methyl-cyclopentadienyl)(octamethyloctahydrodibenzofluorenyl)zirconium dichloride, di(p-tolyl)methylene(3-(2-adamantyl)-5-methyl-cyclopentadienyl)(fluorenyl)zirconium dichloride, di(p-tolyl)methylene(3-(2-adamantyl)-5-methyl-cyclopentadienyl)(2,7-di-tert-butylfluorenyl)zirconium dichloride, di(p-tolyl)methylene(3-(2-adamantyl)-5-methyl-cyclopentadienyl)(3,6-di-tert-butylfluorenyl)zirconium dichloride, di(p-tolyl)methylene(3-(2-adamantyl)-5-methyl-cyclopentadienyl)(octamethyloctahydrodibenzofluorenyl)zirconium dichloride, di(p-tolyl)methylene(3-tert-butyl-5-ethyl-cyclopentadienyl)(fluorenyl)zirconium dichloride, di(p-tolyl)methylene(3-tert-butyl-5-ethyl-cyclopentadienyl)(2,7-di-tert-butylfluorenyl)zirconium dichloride, di(p-tolyl)methylene(3-tert-butyl-5-ethyl-cyclopentadienyl)(3,6-di-tert-butylfluorenyl)zirconium dichloride, di(p-tolyl)methylene(3-tert-butyl-5-ethyl-cyclopentadienyl)(octamethyloctahydrodibenzofluorenyl)zirconium dichloride, di(p-tolyl)methylene(3-tert-butyl-2,5-dimethyl-cyclopentadienyl)(fluorenyl)zirconium dichloride, di(p-tolyl)methylene(3-tert-butyl-2,5-dimethyl-cyclopentadienyl)(2,7-di-tert-butylfluorenyl)zirconium dichloride, di(p-tolyl)methylene(3-tert-butyl-2,5-dimethyl-cyclopentadienyl)(3,6-di-tert-butylfluorenyl)zirconium dichloride, di(p-tolyl)methylene (3-tert-butyl-2,5-dimethyl-cyclopentadienyl)(octamethyloctahydrodibenzofluorenyl)zirconium dichloride, di(p-tert-butylphenyl)methylene(3,5-dimethyl-cyclopentadienyl)(fluorenyl)zirconium dichloride, di(p-tert-butylphenyl)methylene(3,5-dimethyl-cyclopentadienyl)(2,7-di-tert-butylfluorenyl)zirconium dichloride, di(p-tert-butylphenyl)methylene (3,5-dimethyl-cyclopentadienyl)(3,6-di-tert-butylfluorenyl)zirconium dichloride, di(p-tert-butylphenyl)methylene(3,5-dimethyl-cyclopentadienyl)(octamethyloctahydrodibenzofluorenyl)zirconium dichloride, di(p-tert-butylphenyl)methylene(3-tert-butyl-5-methyl-cyclopentadienyl)(fluorenyl)zirconium dichloride, di(p-tert-butylphenyl)methylene (3-tert-butyl-5-methyl-cyclopentadienyl)(2,7-di-tert-butylfluorenyl)zirconium dichloride, di(p-tert-butylphenyl)methylene(3-tert-butyl-5-methyl-cyclopentadienyl)(3,6-di-tert-butylfluorenyl)zirconium dichloride, di(p-tert-butylphenyl)methylene(3-tert-butyl-5-methyl-cyclopentadienyl)(octamethyloctahydrodibenzofluorenyl)zirconium dichloride, di(p-tert-butylphenyl)methylene(3-(2-adamantyl)-5-methyl-cyclopentadienyl)(fluorenyl)zirconium dichloride, di(p-tert-butylphenyl)methylene(3-(2-adamantyl)-5-methyl-cyclopentadienyl)(2,7-di-tert-butylfluorenyl)zirconium dichloride, di(p-tert-butylphenyl)methylene(3-(2-adamantyl)-5-methyl-cyclopentadienyl)(3,6-di-tert-butylfluorenyl)zirconium dichloride, di(p-tert-butylphenyl)methylene(3-(2-adamantyl)-5-methyl-cyclopentadienyl)(octamethyloctahydrodibenzofluorenyl)zirconium dichloride, di(p-tert-butylphenyl)methylene(3-tert-butyl-5-ethyl-cyclopentadienyl)(fluorenyl)zirconium dichloride, di(p-tert-butylphenyl)methylene (3-tert-butyl-5-ethyl-cyclopentadienyl)(2,7-di-tert-butylfluorenyl)zirconium dichloride, di(p-tert-butylphenyl)methylene(3-tert-butyl-5-ethyl-cyclopentadienyl)(3,6-di-tert-butylfluorenyl)zirconium dichloride, di(p-tert-butylphenyl)methylene(3-tert-butyl-5-ethyl-cyclopentadienyl)(octamethyloctahydrodibenzofluorenyl)zirconium dichloride, di(p-tert-butylphenyl)methylene(3-tert-butyl-2,5-dimethyl-cyclopentadienyl)(fluorenyl)zirconium dichloride, di(p-tert-butylphenyl)methylene(3-tert-butyl-2,5-dimethyl-cyclopentadienyl)(2,7-di-tert-butylfluorenyl)zirconium dichloride, di(p-tert-butylphenyl)methylene(3-tert-butyl-2,5-dimethyl-cyclopentadienyl)(3,6-di-tert-butylfluorenyl)zirconium dichloride, di(p-tert-butylphenyl)methylene(3-tert-butyl-2,5-dimethyl-cyclopentadienyl)(octamethyloctahydrodibenzofluorenyl)zirconium dichloride, (methyl)(phenyl)methylene(3-tert-butyl-5-methyl-cyclopentadienyl)(fluorenyl)zirconium dichloride, (methyl)(phenyl)methylene (3-tert-butyl-5-methyl-cyclopentadienyl)(2,7-di-tert-butylfluorenyl)zirconium dichloride, (methyl)(phenyl)methylene(3-tert-butyl-5-methyl-cyclopentadienyl)(3,6-di-tert-butylfluorenyl)zirconium dichloride, (methyl)(phenyl)methylene(3-tert-butyl-5-methyl-cyclopentadienyl) (octamethyloctahydrodibenzofluorenyl) zirconium dichloride, (p-tolyl)(phenyl)methylene(3-tert-butyl-5-methyl-cyclopentadienyl)(fluorenyl)zirconium dichloride, (p-tolyl)(phenyl)methylene(3-tert-butyl-5-methyl-cyclopentadienyl)(2,7-di-tert-butylfluorenyl)zirconium dichloride, (p-tolyl)(phenyl)methylene(3-tert-butyl-5-methyl-cyclopentadienyl)(3,6-di-tert-butylfluorenyl)zirconium dichloride, (p-tolyl)(phenyl)methylene(3-tert-butyl-5-methyl-cyclopentadienyl)(octamethyloctahydrodibenzofluorenyl)zirconium dichloride, dibenzylmethylene(3-tert-butyl-5-methyl-cyclopentadienyl)(fluorenyl)zirconium dichloride, dibenzylmethylene(3-tert-butyl-5-methyl-cyclopentadienyl)(2,7-di-tert-butylfluorenyl)zirconium dichloride, dibenzylmethylene(3-tert-butyl-5-methyl-cyclopentadienyl)(3,6-di-tert-butylfluorenyl)zirconium dichloride, dibenzylmethylene(3-tert-butyl-5-methyl-cyclopentadienyl)(octamethyloctahydrodibenzofluorenyl)zirconium dichloride, fluorenylidene(3-tert-butyl-5-methyl-cyclopentadienyl)(fluorenyl)zirconium dichloride, fluorenylidene (3-tert-butyl-5-methyl-cyclopentadienyl)(2,7-di-tert-butylfluorenyl)zirconium dichloride, fluorenylidene(3-tert-butyl-5-methyl-cyclopentadienyl)(3,6-di-tert-butylfluorenyl)zirconium dichloride, fluorenylidene(3-tert-butyl-5-methyl-cyclopentadienyl)(octamethyloctahydrodibenzofluorenyl)zirconium dichloride, diphenylmethylene(3-tert-butyl-5-methyl-cyclopentadienyl)(fluorenyl)zirconium dimethyl, diphenylmethylene(3-tert-butyl-5-methyl-cyclopentadienyl)(2,7-di-tert-butylfluorenyl)zirconium dimethyl, diphenylmethylene(3-tert-butyl-5-methyl-cyclopentadienyl)(3,6-di-tert-butylfluorenyl)zirconium dimethyl, diphenylmethylene(3-tert-butyl-5-methyl-cyclopentadienyl)(octamethyloctahydrodibenzofluorenyl)zirconium dimethyl, diphenylmethylene(3-tert-butyl-5-methyl-cyclopentadienyl)

(fluorenyl)titanium dichloride, diphenylmethylene(3-tert-butyl-5-methyl-cyclopentadienyl) (2,7-di-tert-butylfluorenyl) titanium dichloride, diphenylmethylene(3-tert-butyl-5-methyl-cyclopentadienyl)(3,6-di-tert-butylfluorenyl) titanium dichloride, diphenylmethylene(3-tert-butyl-5-methyl-cyclopentadienyl) (octamethyloctahydrodibenzofluorenyl)titanium dichloride, diphenylmethylene(3-tert-butyl-5-methyl-cyclopentadienyl) (fluorenyl)hafnium dichloride, diphenylmethylene(3-tert-butyl-5-methyl-cyclopentadienyl)(2,7-di-tert-butylfluorenyl) hafnium dichloride, diphenylmethylene(3-tert-butyl-5-methyl-cyclopentadienyl)(3,6-di-tert-butylfluorenyl) hafnium dichloride and diphenylmethylene(3-tert-butyl-5-methyl-cyclopentadienyl) (octamethyloctahydrodibenzofluorenyl)hafnium dichloride. The transition metal compound of the present invention is not limited to the above compounds, and all the compounds that can meet the requirements specified in Claims are comprehended.

Production Process for the Transition Metal Compound

The transition metal compound, for example the compound of the formula (2a), may be synthesized as described below.

First, a precursor compound (1) of the compound represented by the formula (2a) is prepared by a series of steps [A] or [B] illustrated below:

[A]

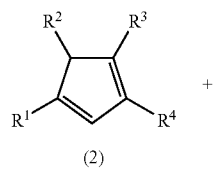

(2)

+

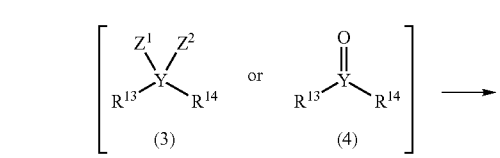

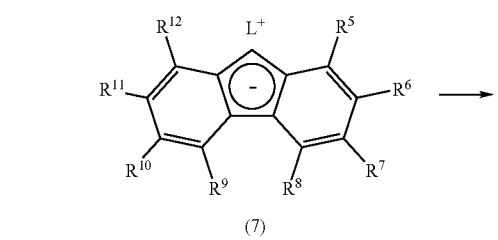

(7)

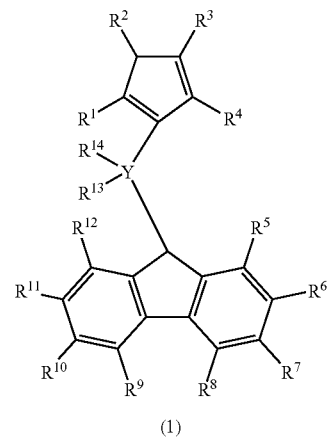

(1)

[B]

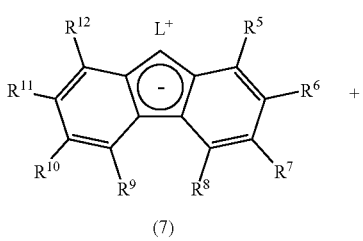

(7)

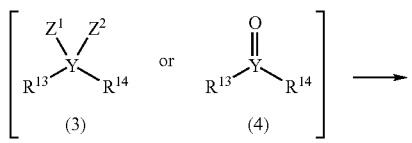

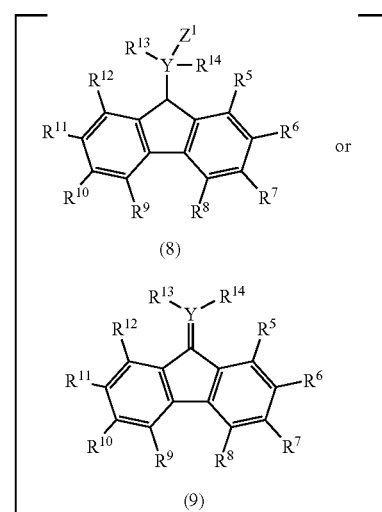

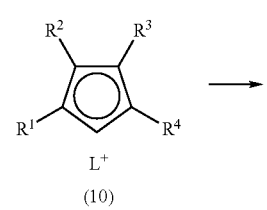

(10)

-continued

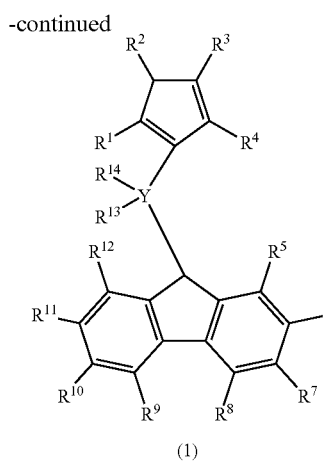

(1)

wherein $R^1$ to $R^{14}$ and Y are as defined for the formula (2a); L is an alkali metal; $Z^1$ and $Z^2$, which may be the same or different, are each a halogen or an anionic ligand; and (1), (2) and (5), which are shown with one exemplary form in the formulae, may be each an isomer different only in the positions of the double bonds in the cyclopentadienyl ring, or a mixture of such isomers.

In the reaction process [A] or [B], the alkali metal used may be lithium, sodium or potassium; the alkali earth metal may be magnesium or calcium; the halogen may be fluorine, chlorine, bromine or iodine; and the anionic ligand may be an alkoxy group such as methoxy, tert-butoxy or phenoxy, a carboxylate group such as acetate or benzoate, or a sulfonate group such as mesylate or tosylate.

An exemplary process for the preparation of the metallocene compound from the precursor compound (1) will be given below. The precursor compound (1) obtained by the reaction process [A] or [B] is brought into contact with an alkali metal, a hydrogenated alkali metal or an organoalkali metal in an organic solvent at a reaction temperature of −80 to 200° C. to form a dialkali metal salt. Examples of the organic solvent used herein include aliphatic hydrocarbons such as pentane, hexane, heptane, cyclohexane and decalin; aromatic hydrocarbons such as benzene, toluene and xylene; ethers such as tetrahydrofuran, diethylether, dioxane and 1,2-dimethoxyethane; and halogenated hydrocarbons such as dichloromethane and chloroform. Exemplary alkali metals for use in the reaction include lithium, sodium and potassium; exemplary alkali metal hydrides include sodium hydride and potassium hydride; and exemplary organoalkali metals include methyllithium, butyllithium and phenyllithium.

Thereafter, the dialkali metal salt resulting from the above contact is reacted in an organic solvent with a compound represented by the formula (11) below to give the metallocene compound of the formula (2a):

$$MZ_k \quad (11)$$

wherein M is a metal selected from Group 4 of the periodic table; Z is a halogen, an anionic ligand or a neutral ligand capable of coordination by a lone pair of electrons, and may be the same or different; and k is an integer of 3 to 6. Preferred compounds having the formula (11) include trivalent or tetravalent titanium fluorides, titanium chlorides, titanium bromides and titanium iodides; tetravalent zirconium fluorides, zirconium chlorides, zirconium bromides and zirconium iodides; tetravalent hafnium fluorides, hafnium chlorides, hafnium bromides and hafnium iodides; and complexes thereof with ethers such as tetrahydrofuran, diethylether, dioxane and 1,2-dimethoxyethane. The organic solvent used herein is as described above. The reaction between the dialkali metal salt and the compound of the formula (11) is preferably an equimolar reaction and is carried out in the organic solvent at a reaction temperature of −80 to 200° C. The resultant metallocene compound may be isolated and purified by, for example, extraction, recrystallization and sublimation. Identification of the transition metal compound of the present invention obtained as above can be made by a proton NMR spectrum, a $^{13}$C-NMR spectrum, mass spectrometric analysis and elemental analysis.

Preferred Embodiment of the Transition Metal Compound in Olefin Polymerization Catalysts A preferable embodiment of the transition metal compound of the present invention for use in an olefin polymerization catalyst will be given below. When the transition metal compound of the present invention is used to form an olefin polymerization catalyst, catalyst components preferably comprise:

(A) the transition metal compound, (B) at least one compound selected from:

(B-1) an organometallic compound, (B-2) an organoaluminum oxy-compound and (B-3) a compound capable of forming an ion pair by reacting with the transition metal compound (A), and optionally (C) a particle carrier.

Each component will be described in detail hereinbelow.

(B-1) Organometallic Compound

The organometallic compound (B-1) for use in the present invention is a compound of an organic metal compound selected from Group 1, 2, 12 and 13, for example:

(B-1a) organoaluminum compounds represented by:

$$R^a_m Al(OR^b)_n H_p X_q$$

wherein $R^a$ and $R^b$, which may be the same or different, are each a hydrocarbon group of 1 to 15, preferably 1 to 4 carbon atoms, X is a halogen atom, $0<m\leq3$, $0\leq n<3$, $0\leq p<3$, $0\leq q<3$ and $m+n+p+q=3$, such as trimethylaluminum, triethylaluminum, triisobutylaluminum and diisobutylaluminumhydride;

(B-1b) alkyl complex compounds of Group 1 metal and aluminum, represented by:

$$M^2 Al R^a_4$$

wherein $M^2$ is Li, Na or K, and $R^a$ is a hydrocarbon group of 1 to 15, preferably 1 to 4 carbon atoms, such as $LiAl(C_2H_5)_4$ and $LiAl(C_7H_{15})_4$;

(B-1c) dialkyl compounds of Group 2 or 12 metal, represented by:

$$R^a R^b M^3$$

wherein $R^a$ and $R^b$, which may be the same or different, are each a hydrocarbon group of 1 to 15, preferably 1 to 4 carbon atoms, and $M^3$ is Mg, Zn or Cd.

Of the above organometallic compounds (B-1), the organoaluminum compounds are preferred. The organometallic compounds (B-1) may be used individually or in combination of two or more kinds.

(B-2) Organoaluminum Oxy-Compound

The organoaluminum oxy-compound (B-2) for use in the present invention may be a conventional aluminoxane, or a benzene-insoluble organoaluminum oxy-compound as disclosed in JP-A-H02-78687.

For example, the conventional aluminoxanes may be prepared by the following methods, and are normally obtained as solution in a hydrocarbon solvent.

(1) An organoaluminum compound, such as trialkylaluminum, is added to a hydrocarbon medium suspension of a compound containing absorbed water or a salt containing water of crystallization (such as magnesium chloride hydrate, copper sulfate hydrate, aluminum sulfate hydrate, nickel sulfate hydrate or cerous chloride hydrate), to react the organoaluminum compound with the absorbed water or water of crystallization.

(2) Water, ice or water vapor is allowed to react directly with an organoaluminum compound, such as trialkylaluminum, in such a medium as benzene, toluene, diethylether or tetrahydrofuran.

(3) An organoaluminum compound, such as trialkylaluminum, is reacted with an organotin oxide, such as dimethyltin oxide or dibutyltin oxide, in such a medium as decane, benzene or toluene.

The aluminoxane may contain small amounts of organometallic components. After the solvent and unreacted organoaluminum compound are distilled away from the recovered solution of the aluminoxane, the remainder may be redissolved in a solvent or suspended in a poor solvent for the aluminoxane. Examples of the organoaluminum compound used in preparing the aluminoxane include the compounds listed as the organoaluminum compounds (B-1a). Of those compounds, trialkylaluminum and tricycloalkylaluminum are preferred, and trimethylaluminum is particularly preferred. The organoaluminum compounds may be used individually or in combination of two or more kinds.

The benzene-insoluble organoaluminum oxy-compound of the present invention desirably contains Al components that will dissolve in 60° C. benzene, in an amount of 10% or less, preferably 5% or less, and particularly preferably 2% or less in terms of Al atom. That is, the organoaluminum oxy-compound is preferably insoluble or hardly soluble in benzene. The organoaluminum oxy-compounds (B-2) may be used individually or in combination of two or more kinds.

(B-3) Compound Capable of Forming an Ion Pair by Reacting with the Transition Metal Compound The compound (B-3) capable of forming an ion pair by reacting with the transition metal compound (A) (hereinafter the "ionizing ionic compound") of the present invention can be selected from, for example, the Lewis acids, ionic compounds, borane compounds and carborane compounds disclosed in JP-A-H01-501950, JP-A-H01-502036, JP-A-H03-179005, JP-A-H03-179006, JP-A-H03-207703, JP-A-H03-207704 and U.S. Pat. No. 5,321,106. Further, heteropoly compounds and isopoly compounds are also employable. These ionizing ionic compounds (B-3) may be used individually or in combination of two or more kinds. When the transition metal compound of the present invention is used in combination with the organoaluminum oxy-compound (B-2), for example methyl aluminoxane, as an auxiliary catalyst component, the resultant olefin polymerization catalyst will exhibit particularly high polymerization activity for olefin compounds.

In addition to the transition metal compound (A) and at least one compound (B) of the organometallic compound (B-1), the organoaluminum oxy-compound (B-2) and the ionizing ionic compound (B-3), the olefin polymerization catalyst may optionally contain a carrier (C).

(C) Carrier

The carrier (C) used in the present invention is an inorganic or organic solid compound of granular or fine particle state. Preferred inorganic compounds include porous oxides, inorganic chlorides, clays, clay minerals and ion-exchange layered compounds.

Suitable porous oxides include $SiO_2$, $Al_2O_3$, $MgO$, $ZrO_2$, $TiO_2$, $B_2O_3$, $CaO$, $ZnO$, $BaO$, $ThO_2$, and composites and mixtures thereof such as natural or synthetic zeolites, $SiO_2$—$MgO$, $SiO_2$—$Al_2O_3$, $SiO_2$—$TiO_2$, $SiO_2$—$V_2O_5$, $SiO_2$—$Cr_2O_3$ and $SiO_2$—$TiO_2$—$MgO$. Of these, porous oxides whose main components are $SiO_2$ and/or $Al_2O_3$ are preferable. The porous oxides have various properties depending on the types and how they are produced. The carrier used in the present invention desirably ranges in particle diameter from 5 to 300 μm, preferably from 10 to 200 μm, and in specific surface area from 50 to 1000 $m^2/g$, preferably 100 to 700 $m^2/g$, and in pore volume from 0.3 to 3.0 $cm^3/g$. The carrier may optionally be calcined at 100 to 1000° C., preferably at 150 to 700° C. prior to use.

Suitable inorganic chlorides include $MgCl_2$, $MgBr_2$, $MnCl_2$ and $MnBr_2$. The inorganic chlorides may be used directly or after ground by a ball mill or a vibration mill. Alternative prior-to-use treatment is such that the inorganic chlorides are dissolved in a solvent, such as alcohol, and are separated out as fine particles by means of a separating agent.

The clay for use in the present invention mainly comprises a clay mineral. The ion-exchange layered compound for use in the present invention has a crystal structure in which planes formed by ionic bonds pile parallel one another with weak bonding strength, and contains exchangeable ions. Most clay minerals are the ion-exchange layered compounds. The clays, clay minerals and ion-exchange layered compounds may be natural or synthetic. Examples of the clays, clay minerals and ion-exchange layered compounds include clays, clay minerals and ionic crystalline compounds having a layered crystal structure such as hexagonal closest packing structure, antimony structure, $CdCl_2$ structure or $CdI_2$ structure. Exemplary clays and clay minerals include kaolin, bentonite, kibushi clay, potter's clay, allophane, hisingerite, pyrophyllite, mica, montmorillonite, vermiculite, chlorite, palygorskite, kaolinite, nacrite, dickite and halloysite. Exemplary ion-exchange layered compounds include crystalline acid salts of polyvalent metals, such as α-$Zr(HAsO_4)_2 \cdot H_2O$, α-$Zr(HPO_4)_2$, α-$Zr(KPO_4)_2 \cdot 3H_2O$, α-$Ti(HPO_4)_2$, α-$Ti(HAsO_4)_2 \cdot H_2O$, α-$Sn(HPO_4)_2 \cdot H_2O$, γ-$Zr(HPO_4)_2$, γ-$Ti(HPO_4)_2$ and γ-$Ti(NH_4PO_4)_2 \cdot H_2O$. Preferably, the clays and clay minerals of the present invention are chemically treated. The chemical treatment may be, for example, a surface treatment to remove impurities adhering to the surface or a treatment affecting the crystal structure of the clay. Examples of such chemical treatments include acid treatment, alkali treatment, salt treatment and organic substance treatment.

The ion-exchange layered compound used in the present invention may be enlarged in interlaminar spacing by replacing the exchangeable ions between layers with larger and bulkier ions by means of its ion exchangeability. The bulkier ions play a role as supporting columns in the layered structure, and are generally called pillars. Introduction of different compounds between layers of a layered compound is called intercalation. Guest compounds for the intercalation include cationic inorganic compounds such as $TiCl_4$ and $ZrCl_4$, metallic alkoxides such as $Ti(OR)_4$, $Zr(OR)_4$, $PO(OR)_3$ and $B(OR)_3$ (wherein R is a hydrocarbon group or the like), and metallic hydroxide ions such as $[Al_{13}O_4(OH)_{24}]^{7+}$, $[Zr_4(H)_{14}]^{2+}$ and $[Fe_3O(OCOCH_3)_6]^+$. These compounds may be used individually or in combination of two or more kinds. The intercalation of these compounds may be carried out in the presence of polymers obtained by hydrolysis of metallic alkoxides such as $Si(OR)_4$, $Al(OR)_3$ and $Ge(OR)_4$ (wherein R is a hydrocarbon group or the like), or in the presence of colloidal inorganic compounds such as $SiO_2$. Exemplary pillars include oxides which occur as a result of thermal dehydration after the metallic hydroxide ions have been intercalated between layers. Of the inorganic compounds, the clays and clay minerals, particularly montmorillonite, vermiculite, pectolite, taeniolite and synthetic mica, are preferred.

Exemplary organic compounds include granular or particulate solids ranging from 5 to 300 µm in particle diameters. Specific examples include (co)polymers mainly comprising α-olefins of 2 to 14 carbon atoms such as ethylene, propylene, 1-butene and 4-methyl-1-pentene; (co)polymers mainly comprising vinylcyclohexane and styrene; and modified products thereof.

In addition to the aforementioned transition metal compound (A), at least one compound (B) of the organometallic compound (B-1), the organoaluminum oxy-compound (B-2) and the ionizing ionic compound (B-3), and optional carrier (C), the olefin polymerization catalyst of the present invention may optionally contain a specific organic compound component (D).

(D) Organic Compound Component

The organic compound component (D) of the present invention is used optionally for the purpose of improving the polymerization activity and obtaining polymers with enhanced properties. Examples of the organic compound include, although not limited thereto, alcohols, phenolic compounds, carboxylic acids, phosphorous compounds and sulfonates.

In carrying out polymerization, the above components may be used arbitrarily in any addition sequence. Some examples are given below:

(1) The component (A) alone is fed to a polymerization reactor.

(2) The components (A) and (B) are fed to a polymerization reactor in arbitrary sequence.

(3) A catalyst component in which the component (A) is supported on the carrier (C), and the component (B) are fed to a polymerization reactor in arbitrary sequence.

(4) A catalyst component in which the component (B) is supported on the carrier (C), and the component (A) are fed to a polymerization reactor in arbitrary sequence.

(5) A catalyst component in which the components (A) and (B) are supported on the carrier (C) is fed to a polymerization reactor.

In the above methods (2) to (5), the two or more catalyst components may be previously in contact with each other when they are fed to a polymerization reactor. In the method (4) and (5) in which the component (B) is supported on the carrier, an unsupported component (B) may be added at an arbitrary sequence according to necessity. The supported component (B) and the unsupported component (B) may be the same or different. The solid catalyst component in which the component (A) is supported on the component (C) or in which the components (A) and (B) are supported on the component (C), may be prepolymerized with an olefin. Another catalyst component may be supported on the prepolymerized solid catalyst component.

In the production process for olefin polymers according to the present invention, one or more olefins are polymerized or copolymerized in the presence of the aforesaid olefin polymerization catalyst to give olefin polymers. The polymerization may be carried out by a liquid-phase polymerization process, such as solution polymerization or suspension polymerization, or a gas-phase polymerization process. The liquid-phase polymerization may be conducted using an inert hydrocarbon solvent. Examples thereof include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; and mixtures thereof. The olefin itself can work as a solvent.

In carrying out polymerization of olefins in the presence of the olefin polymerization catalyst, the component (A) is used in an amount of $10^{-8}$ to $10^{-2}$ mol, preferably $10^{-7}$ to $10^{-3}$ mol per liter of the reaction volume. The component (B-1) is used in an amount such that the molar ratio ((B-1)/M) of the component (B-1) to all the transition metal atoms (M) in the component (A) will be 0.01 to 5000, preferably 0.05 to 2000. The component (B-2) is used in an amount such that the molar ratio ((B-2)/M) of the component (B-2) in terms of aluminum atom to all the transition metal atoms (M) in the component (A) will be 10 to 5000, preferably 20 to 2000. The component (B-3) is used in an amount such that the molar ratio ((B-3)/M) of the component (B-3) to the transition metal atoms (M) in the component (A) will be 1 to 10, preferably 1 to 5.

The component (D) is used in an amount such that:

the molar ratio ((D)/(B-1)) will be 0.01 to 10, preferably 0.1 to 5 in the case that the component (B) is the component (B-1);

the molar ratio ((D)/(B-2)) will be 0.01 to 2, preferably 0.005 to 1 in the case that the component (B) is the component (B-2); and the molar ratio ((D)/(B-3)) will be 0.01 to 10, preferably 0.1 to 5 in the case that the component (B) is the component (B-3).

The olefin polymerization using the olefin polymerization catalyst is generally conducted at −50 to +200° C., preferably 0 to 170° C. The polymerization pressure may range from atmospheric pressure to 10 MPa (gauge pressure), preferably from atmospheric pressure to 5 MPa (gauge pressure). The polymerization can be carried out batchwise, semi-continuously or continuously, and in two or more stages under different conditions. The molecular weights of resulting olefin polymers may be adjusted by adding hydrogen to the polymerization system, by controlling the polymerization temperature or by changing the amount of the component (B). When hydrogen is added, the addition is suitably conducted at 0.001 to 100 NL based on 1 kg of olefin.

For the polymerization of the present invention, at least one monomer is preferably selected from ethylene and α-olefins, in which ethylene or propylene is an essential monomer. Examples of the α-olefins include linear or branched α-olefins of 3 to 20, preferably 3 to 10 carbon atoms, such as propylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene. Suitable monomers further include cycloolefins of 3 to 30, preferably 3 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene; polar monomers, such as α,β-unsaturated carboxylic acids, including acrylic acid, methacrylic acid, fumaric acid, maleic anhydride, itaconic acid, itaconic anhydride and bicyclo[2.2.1]-5-heptene-2,3-dicarboxylic anhydride, and metal salts thereof with sodium, potassium, lithium, zinc, magnesium and calcium; α,β-unsaturated carboxylates, such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate; vinyl esters, such as vinyl acetate, vinyl propionate, vinyl caproate, vinyl caprate, vinyl laurate, vinyl stearate and vinyl trifluoroacetate; and unsaturated glycidyls, such as glycidyl acrylate, glycidyl methacrylate and monoglycidyl itaconate. Also, the polymerization can be carried out in the presence of vinylcyclohexanes, dienes, polyenes and aromatic vinyl compounds; for example, styrene and mono- or poly-alkyl styrenes, such as o-methylstyrene, m-methylstyrene, p-methylstyrene, o,p-dimethylstyrene, o-ethylstyrene, m-ethylstyrene and p-ethylstyrene; styrene derivatives containing a functional group, such as methoxystyrene, ethoxystyrene, vinylbenzoic acid, vinyl methylbenzoate, vinylbenzyl acetate, hydroxystyrene, o-chlorostyrene, p-chlorostyrene and divinylbenzene; and 3-phenylpropylene, 4-phenylpropylene and α-methylstyrene.

In the olefin polymerization as described above, at least one monomer is ethylene or propylene. When two or more monomers are used, either the ethylene or propylene, or both the ethylene and propylene will preferably have an amount of 50 mol % or more relative to all the monomers. The process described above may be favorably used to produce, for example, ethylene/propylene copolymers (EPR), propylene/ethylene copolymers (PER), propylene/ethylene random copolymers (random PP), propylene/ethylene block copolymers (block PP) and propylene/butene random copolymers (PBR).

Next, the polyolefin resin composition according to the present invention will be described in detail.

The polyolefin resin composition of the present invention comprises a propylene polymer (PP-C) and an elastomer (EL).

Each component for the polyolefin resin composition of the present invention will be described in detail hereinbelow.

Propylene Polymer (PP-C)

The propylene polymer (PP-C) for incorporating to the polyolefin resin composition of the present invention may be a propylene homopolymer or a random copolymer of propylene and ethylene, and/or an α-olefin having 4 to 20 carbon atoms.

The α-olefins of 4 to 20 carbon atoms include 1-butene, 1-pentene, 1-hexene, 4-methyl-1-pentene, 1-octene, 1-decene, 1-dodecene, 1-tetradecene, 1-hexadecene, 1-octadecene, 1-eicosene, norbornene, tetracyclododecene, butadiene, pentadiene, isoprene and hexadiene.

The propylene polymer (PP-C) desirably has a melting point (Tm) of 140° C. or above, preferably 145° C. or above, more preferably 150° C. or above, and even more preferably 155° C. or above. Herein, the melting point (Tm) is measured on a differential scanning calorimeter (DSC) in which a polymer sample is heated at 240° C. for 10 minutes, cooled to 30° C. and maintained at the temperature for 5 minutes, and heated again at a rate of 10° C./min to obtain a peak attributed to the fusion of the crystalline polymer. Lower melting points are unfavorable since they lead to poorer mechanical strength such as low rigidity.

The propylene polymer (PP-C) desirably has a melt flow rate (MFR), as measured at 230° C. and under a load of 2.16 kg in accordance with ASTM D1238, of 0.01 to 1000 g/min, preferably 0.05 to 500 g/min.

Although the propylene polymer (PP-C) may be selected from commercially available propylene polymers without limitation, it preferably has a ratio (Mw/Mn) of 1 to 4, more preferably 1.1 to 3.5 in terms of a weight-average molecular weight (Mw) to a number-average molecular weight (Mn) measured by gel permeation chromatography (GPC). Excessively broad molecular weights bring about bad appearance of molded articles.

The propylene polymer (PP-C) may be prepared using a magnesium-supported titanium catalyst system or a metallocene catalyst system.

The magnesium-supported titanium catalyst system is desirably comprised of a solid titanium catalyst component (I) essentially containing titanium, magnesium and halogen, an organometallic compound catalyst component (II), and optionally an electron donor (III).

[Solid Titanium Catalyst Component (I)]

The solid titanium catalyst component (I) can be prepared by contacting a magnesium compound, a titanium compound and an electron donor as described below.

(Magnesium Compound)

The magnesium compounds include those magnesium compounds with or without reducing ability.

Examples of the magnesium compounds with reducing ability include organomagnesium compounds represented by the following formula:

$X_n MgR_{2-n}$, wherein $0 \leq n < 2$; R denotes a hydrogen atom, an alkyl group of 1 to 20 carbon atoms, an aryl group or a cycloalkyl group; when n is 0, two R's may be the same or different; and X is a halogen.

Specific examples of the organomagnesium compounds with reducing ability include alkylmagnesium compounds, such as dimethylmagnesium, diethylmagnesium, dipropylmagnesium, dibutylmagnesium, diamylmagnesium, dihexylmagnesium, didecylmagnesium, octylbutylmagnesium and ethylbutylmagnesium; alkylmagnesium halides, such as ethylmagnesium chloride, propylmagnesium chloride, butylmagnesium chloride, hexylmagnesium chloride and amylmagnesium chloride; alkylmagnesium alkoxides, such as butylethoxymagnesium, ethylbutoxymagnesium and octylbutoxymagnesium; butylmagnesium hydrides and magnesium hydrides.

Metallic magnesium is also employable.

Specific examples of the magnesium compounds without reducing ability include halogenated magnesiums, such as magnesium chloride, magnesium bromide, magnesium iodide and magnesium fluoride; alkoxymagnesium halides, such as methoxymagnesium chloride, ethoxymagnesium chloride, isopropoxymagnesium chloride, butoxymagnesium chloride and octoxymagnesium chloride; aryloxymagnesium halides, such as phenoxymagnesium chloride and methylphenoxymagnesium chloride; dialkoxymagnesiums, such as diethoxymagnesium, diisopropoxymagnesium, dibutoxymagnesium, di-n-octoxymagnesium, di-2-ethylhexoxymagnesium and methoxyethoxymagnesium; diaryloxymagnesiums, such as diphenoxymagnesium, di-methylphenoxymagnesium and phenoxymethylphenoxymagnesium; and magnesium carboxylates, such as magnesium laurate and magnesium stearate.

The magnesium compounds without reducing ability may be the compounds derived from the magnesium compounds with reducing ability or may be the compounds derived at the preparation of the catalyst component. The magnesium compounds without reducing ability can be derived from the magnesium compounds with reducing ability by bringing the magnesium compounds with reducing ability into contact with, for example, a polysiloxane compound, a halogen-containing silane compound, a halogen-containing aluminum compound, an ester-containing, alcohol-containing or halogen-containing compound or a compound having an OH group or an active carbon-oxygen bond.

The magnesium compounds with and without reducing ability may each form a complex compound or a composite compound with other metal, such as aluminum, zinc, boron, beryllium, sodium or potassium, or may each be a mixture with other metallic compound. The magnesium compounds may be used either individually or in combination of two or more kinds.

The solid magnesium compounds among the above-mentioned magnesium compounds may be liquefied by use of an electron donor (i). Examples of the electron donor (i) include alcohols, phenols, ketones, aldehydes, ethers, amines, pyridines and metallic acid esters.

Specific examples thereof include:

alcohols of 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;

halogen-containing alcohols of 1 to 18 carbon atoms, such as trichloromethanol, trichloroethanol and trichlorohexanol;

alkoxyalcohols, such as 2-propoxyethanol, 2-butoxyethanol, 2-ethoxypropanol, 3-ethoxypropanol, 1-methoxybutanol, 2-methoxybutanol and 2-ethoxybutanol;

phenols of 6 to 20 carbon atoms which may have a lower alkyl group, such as phenol, cresol, xylenol, ethylphenol, propylphenol, nonylphenol, cumylphenol and naphthol;

ketones of 3 to 15 carbon atoms, such as acetone, methyl ethyl ketone, methyl isobutyl ketone, acetophenone, benzophenone and benzoquinone;

aldehydes of 2 to 15 carbon atoms, such as acetaldehyde, propionaldehyde, octyl aldehyde, benzaldehyde, tolualdehyde and naphthaldehyde;

ethers of 2 to 20 carbon atoms, such as methyl ether, ethyl ether, isopropyl ether, butyl ether, amyl ether, tetrahydrofuran, anisole and diphenyl ether;

amines, such as trimethylamine, triethylamine, tributylamine, tribenzylamine and tetramethylethylenediamine;

pyridines, such as pyridine, methylpyridine, ethylpyridine and dimethylpyridine; and metallic acid esters, such as tetraethoxytitanium, tetra-n-propoxytitanium, tetra-i-propoxytitanium, tetrabutoxytitanium, tetrahexoxytitanium, tetrabutoxyzirconium and tetraethoxyzirconium. These may be used individually or in combination of two or more kinds.

Of the above compounds, the alcohols, the alkoxyalcohols and the metallic acid esters are particularly preferable.

Solubilization of the solid magnesium compound by use of the electron donor (i) is normally conducted by contacting these two and optionally heating the mixture. The contact temperature ranges from 0 to 200° C., preferably from 20 to 180° C., and more preferably from 50 to 150° C.

The solubilization may be carried out in the presence of a hydrocarbon solvent or the like. Exemplary hydrocarbon solvents include aliphatic hydrocarbons, such as pentane, hexane, heptane, octane, decane, dodecane, tetradecane and kerosene; alicyclic hydrocarbons, such as cyclopentane, methylcyclopentane, cyclohexane, methylcyclohexane, cyclooctane and cyclohexene; aromatic hydrocarbons, such as benzene, toluene and xylene; and halogenated hydrocarbons, such as dichloroethane, dichloropropane, trichloroethylene, chlorobenzene and 2,4-dichlorotoluene.

There are many magnesium compounds other than those listed above that can be used in preparing the solid titanium catalyst component (I). The magnesium compound preferably exists as a halogen-containing magnesium compound in the final solid titanium catalyst component (I); therefore, when the magnesium compound used contains no halogen, it is preferably brought into contact with a halogen-containing compound in the course of the preparation.

In particular, the magnesium compounds without reducing ability are preferred, and especially the halogen-containing magnesium compounds are preferable. Of such compounds, magnesium chloride, alkoxymagnesium chloride and aryloxymagnesium chloride are preferred.

(Titanium Compound)

The titanium compound used herein is preferably tetravalent. Exemplary tetravalent titanium compounds include those represented by the formula:

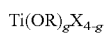

wherein R is a hydrocarbon group, X is a halogen atom and $0 \leq g \leq 4$. Specific examples of such compounds include tetrahalogenated titaniums, such as $TiCl_4$, $TiBr_4$ and $TiI_4$; trihalogenated alkoxytitaniums, such as $Ti(OCH_3)Cl_3$, $Ti(OC_2H_5)Cl_3$, $Ti(O\ n\text{-}C_4H_9)Cl_3$, $Ti(OC_2H_5)Br_3$ and $Ti(O\text{-iso-}C_4H_9)Br_3$; dihalogenated dialkoxytitaniums, such as $Ti(OCH_3)_2Cl_2$, $Ti(OC_2H_5)_2Cl_2$, $Ti(On\text{-}C_4H_9)_2Cl_2$ and $Ti(OC_2H_5)_2Br_2$; monohalogenated trialkoxytitaniums, such as $Ti(OCH_3)_3Cl$, $Ti(OC_2H_5)_3Cl$, $Ti(O\ n\text{-}C_4H_9)_3Cl$ and $Ti(OC_2H_5)_3Br$; and tetraalkoxytitaniums, such as $Ti(OCH_3)_4$, $Ti(OC_2H_5)_4$, $Ti(O\ n\text{-}C_4H_9)_4$, $Ti(\beta\text{ iso-}C_4H_9)_4$ and $Ti(O\ 2\text{-ethylhexyl})_4$.

Of these, the tetrahalogenated titaniums are preferred, and titanium tetrachloride is particularly preferred. The titanium compounds may be used individually or in combination of two or more kinds. The titanium compounds may be used together with an aromatic hydrocarbon, or may be diluted with a hydrocarbon or a halogenated hydrocarbon.

(Electron Donor (ii))

Preparation of the solid titanium catalyst component (I) preferably involves the electron donor (ii). Exemplary electron donors (ii) include acid halides, acid amides, nitriles, acid anhydrides, organic esters and polyethers given below.

Specific examples include acid halides of 2 to 15 carbon atoms, such as acetyl chloride, benzoyl chloride, toluic chloride and anisic chloride; acid amides, such as N,N-dimethylacetamide, N,N-diethylbenzamide and N,N-dimethyltoluamide; nitriles, such as acetonitrile, benzonitrile and tolunitrile; acid anhydrides, such as acetic anhydride, phthalic anhydride and benzoic anhydride; and organic esters of 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarin, phthalide and ethyl carbonate.

Examples of the organic esters further include polyvalent carboxylic acid esters having a skeleton represented by any of the following formulae (1):

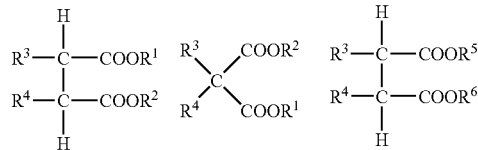
(1)

wherein $R^1$ denotes a substituted or unsubstituted hydrocarbon group; $R^2$, $R^5$ and $R^6$ each denote hydrogen or a substituted or unsubstituted hydrocarbon group; $R^3$ and $R^4$ each denote hydrogen or a substituted or unsubstituted hydrocarbon group, and at least one of the two is preferably a substituted or unsubstituted hydrocarbon group; $R^3$ and $R^4$ may link together to form a cyclic structure; and when the hydrocarbon groups $R^1$ to $R^6$ are substituted, the substituent groups contain a hetero atom, such as N, O or S, to form a group as C—O—C, COOR, COOH, OH, $SO_3H$, —C—N—C— or $NH_2$.

Specific examples of the polyvalent carboxylic acid esters include aliphatic polycarboxylates, alicyclic polycarboxylates, aromatic polycarboxylates and heterocyclic polycarboxylates.

Preferred examples of the polyvalent carboxylic acid esters with the skeletons represented by the formulae (1) include diethyl succinate, dibutyl succinate, diethyl methylsuccinate, diaryl methylsuccinate, diisobutyl α-methylglutarate, diisopropyl β-methylglutarate, diisobutyl methylmalonate, dibutyl ethylmalonate, diethyl ethylmalonate, diethyl isopropylmalonate, diethyl isopropylmalonate, dibutyl butylmalonate, dibutyl phenylmalonate, diethyl diethylmalonate, dibutyl dibutylmalonate, diethyl dibutylmalonate, n-butyl maleate, dibutyl methylmaleate, dibutyl butylmaleate, di-2-ethylhexyl fumarate, di-n-hexyl cyclohexenecarboxylate, diethyl nadiate, diisopropyl tetrahydrophthalate, diethyl phthalate, monoethyl phthalate, dipropyl phthalate, diisobutyl phthalate, diisopropyl phthalate, ethylisobutyl phthalate, di-n-butyl phthalate, di-n-heptyl phthalate, di-n-octyl phthalate, di-2-ethylhexyl phthalate, di(2-methylpentyl)phthalate, di(3-methylpentyl)phthalate, di(4-methylpentyl)phthalate, di(2,3-dimethylbutyl) phthalate, di(3-methylhexyl)phthalate, di(4-methylhexyl)phthalate, di(5-methylhexyl)phthalate, di(3-ethylpentyl)phthalate, di(3,4-dimethylpentyl)phthalate, di(2,4-dimethylpentyl)phthalate, di(2-methylhexyl)phthalate, di(2-methyloctyl)phthalate, didecyl phthalate, diphenyl phthalate and mixtures of these phthalic acid diesters, diethyl naphthalenedicarboxylate, dibutyl naphthalenedicarboxylate, triethyl trimellitate, tributyl trimellitate, dibutyl 3,4-furandicarboxylate, diethyl adipate, dibutyl adipate, dioctyl sebacate and dibutyl sebacate.

Of these, the phthalic acid diesters are preferably used.

Exemplary electron donors further include compounds in which at least two ether bonds are present via plural atoms (such compounds will be referred to also as "polyethers" hereinafter). Examples of the polyethers include compounds in which the atoms between the ether bonds are carbon, silicon, oxygen, nitrogen, phosphorus, boron, sulfur or at least two of them. Of such compounds, preferable are the compounds in which a relatively bulky substituent group is bonded to the atom between the ether bonds and further in which the atoms between the 2 or more ether bonds include plural carbon atoms. For example, the polyethers represented by the following formula (2) are preferable:

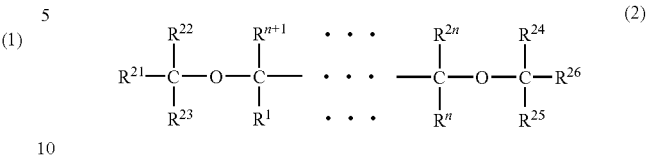
(2)

wherein n is an integer of $2 \leq n \leq 10$, $R^1$ to $R^{26}$ each denote a substituent group having at least one element selected from carbon, hydrogen, oxygen, halogen, nitrogen, sulfur, phosphorus, boron and silicon; arbitrary groups of $R^1$ to $R^{26}$, preferably of $R^1$ to $R^{2n}$ may form in association a ring other than the benzene ring; and the main chain may contain atoms other than carbon.

Specific examples of the polyether compounds include 2-(2-ethylhexyl)-1,3-dimethoxypropane, 2-isopropyl-1,3-dimethoxypropane, 2-butyl-1,3-dimethoxypropane, 2-s-butyl-1,3-dimethoxypropane, 2-cyclohexyl-1,3-dimethoxypropane, 2-phenyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(2-fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-bis(p-chlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-s-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 2,3-diphenyl-1,4-diethoxybutane, 2,3-dicyclohexyl-1,4-diethoxybutane, 2,2-dibenzyl-1,4-diethoxybutane, 2,3-dicyclohexyl-1,4-diethoxybutane, 2,3-diisopropyl-1,4-diethoxybutane, 2,2-bis(p-methylphenyl)-1,4-dimethoxybutane, 2,3-bis(p-chlorophenyl)-1,4-dimethoxybutane, 2,3-bis(p-fluorophenyl)-1,4-dimethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane, 2,4-diisoamyl-1,5-dimethoxypentane, 3-methoxymethyltetrahydrofuran, 3-methoxymethyldioxane, 1,2-diisobutoxypropane, 1,2-diisobutoxyethane, 1,3-diisoamyloxyethane, 1,3-diisoamyloxypropane, 1,3-diisoneopentyloxyethane, 1,3-dineopentyloxypropane, 2,2-tetramethylene-1,3-dimethoxypropane, 2,2-pentamethylene-1,3-dimethoxypropane, 2,2-hexamethylene-1,3-dimethoxypropane, 1,2-bis (methoxymethyl)cyclohexane, 2,8-dioxaspiro[5,5]undecane, 3,7-dioxabicyclo[3,3,1]nonane, 3,7-dioxabicyclo[3,3,0]octane, 3,3-diisobutyl-1,5-oxononane, 6,6-diisobutyldioxyheptane, 1,1-dimethoxymethylcyclopentane, 1,1-bis(dimethoxymethyl)cyclohexane, 1-bis(methoxymethyl)bicyclo[2,2,1]heptane, 1,1-dimethoxymethylcyclopentane, 2-methyl-2-methoxymethyl-1,3-dimethoxypropane, 2-cyclohexyl-2-ethoxymethyl-1,3-diethoxypropane, 2-cyclohexyl-2-methoxymethyl-1,3-dimethoxypropane, 2,2-diisobutyl-1,3-dimethoxycyclohexane, 2-isopropyl-2-isoamyl-1,3-dimethoxycyclohexane, 2-cyclohexyl-2-methoxymethyl-1,3-dimethoxycyclohexane, 2-isopropyl-2-methoxymethyl-1,3-dimethoxycyclohexane, 2-isobutyl-2-methoxymethyl-1,3-dimethoxycyclohexane, 2-cyclohexyl-2-ethoxymethyl-1,3-diethoxycyclohexane, 2-cyclohexyl-2-ethoxymethyl-1,3-dimethoxycyclohexane, 2-isopropyl-2-ethoxymethyl-1,3-diethoxycyclohexane, 2-isopropyl-2-ethoxymethyl-1,3-dimethoxycyclohexane, 2-isobutyl-2-ethoxymethyl-1,3-diethoxycyclohexane and 2-isobutyl-2-ethoxymethyl-1,3-dimethoxycyclohexane.

Exemplary polyethers further include tris(p-methoxyphenyl)phosphine, methylphenyl bis(methoxymethyl)silane, diphenyl bis(methoxymethyl)silane, methylcyclohexyl bis(methoxymethyl)silane, di-t-butyl bis(methoxymethyl)silane, cyclohexyl-t-butyl bis(methoxymethyl)silane and i-propyl-t-butyl bis(methoxymethyl)silane.

Of the polyether compounds, 2,2-diisobutyl-1,3-dimethoxypropane, 2-isopropyl-2-isobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane are preferred.

Of the electron donors (ii) described above, the organic esters and the polyethers are preferable, and the aromatic diesters such as the phthalic acid diesters, and the polyethers are more preferably employed. The electron donors may be used individually or in combination of two or more kinds. Further, compounds that can form the electron donors during the preparation of the solid titanium catalyst component (I) may be used even if they are not exactly the compounds as described above, since the above-listed electron donors should be contained as such in the final solid titanium catalyst component (I). In this case too, such compounds may be used to form two or more kinds of the electron donors (ii).

(Preparation of the Solid Titanium Catalyst Component (I))

Various processes are available to prepare the solid titanium catalyst component (I) from the above compounds without limitation. Exemplary preparation is presented below, in which the organometallic compound used may be as detailed later as the organometallic compound (II).

(1) A solution essentially consisting of the magnesium compound, the electron donor (i) and the hydrocarbon solvent is optionally brought into contact with an organometallic compound to cause precipitation of a solid. During or after the precipitation, the liquid titanium compound is added to the reaction solution to form a solid component. The solid component is reacted with the aromatic hydrocarbon, the liquid titanium compound and the electron donor (ii) by being brought into contact therewith at least once, preferably several times.

(2) A product from the contact between the liquid organomagnesium compound and an inorganic or organic carrier is optionally brought into contact with an organometallic compound to cause precipitation of a solid. During or after the precipitation, the liquid titanium compound is added to the reaction solution to form a solid component. The solid component is then reacted with the aromatic hydrocarbon, the liquid titanium compound and the electron donor (ii) by being brought into contact therewith at least once, preferably several times. Before reaction with the aromatic hydrocarbon, etc., the solid component may be brought into contact with a halogen-containing compound and/or an organometallic compound.

[Organometallic Compound Catalyst Component (II)]

The organometallic compound catalyst component (II) preferably contains a metal selected from Group 13 of the periodic table. Particularly, organoaluminum compounds, organoboron compounds and alkyl complex compounds of a Group 1 element and aluminum or boron are preferable. For example, the organoaluminum compounds may be represented by the following formula:

$$R^a_n AlX_{3-n},$$

wherein $R^a$ denotes a hydrocarbon group of 1 to 12 carbon atoms, X denotes a halogen or hydrogen, and n ranges from 1 to 3.

The hydrocarbon groups of 1 to 12 carbon atoms designated by $R^a$ include alkyl, cycloalkyl and aryl groups. Specific examples thereof include methyl, ethyl, n-propyl, isopropyl, isobutyl, pentyl, hexyl, octyl, cyclopentyl, cyclohexyl, phenyl and tolyl groups.

Examples of such organoaluminum compounds include trialkylaluminums, such as trimethylaluminum, triethylaluminum, triisopropylaluminum, triisobutylaluminum, trioctylaluminum and tri-2-ethylhexylaluminum; trialkenylaluminums, such as triisoprenylaluminum; dialkylaluminum halides, such as dimethylaluminum chloride, diethylaluminum chloride, diisopropylaluminum chloride, diisobutylaluminum chloride and dimethylaluminum bromide; alkylaluminum sesquihalides, such as methylaluminum sesquichloride, ethylaluminum sesquichloride, isopropylaluminum sesquichloride, butylaluminum sesquichloride and ethylaluminum sesquibromide; alkylaluminum dihalides, such as methylaluminum dichloride, ethylaluminum dichloride, isopropylaluminum dichloride and ethylaluminum dibromide; and alkylaluminum hydrides, such as diethylaluminum hydride, diisobutylaluminum hydride and ethylaluminum dihydride.

Compounds having the following formula may also be employed as the organoaluminum compounds:

$$R^a_n AlY_{3-n}$$

wherein $R^a$ is the same as described above; Y is a group represented by $-OR^b$, $-OSiR^c_3$, $-OAlR^d_2$, $-NR^e_2$, $-SiR^f_3$ or $-N(R^g)AlR^h_2$; n is 1 or 2; $R^b$, $R^c$, $R^d$ and $R^h$ are each a methyl, ethyl, isopropyl, isobutyl, cyclohexyl or phenyl group etc.; $R^e$ is a hydrogen atom or a methyl, ethyl, isopropyl, phenyl or trimethylsilyl group etc.; and $R^f$ and $R^g$ are each a methyl or ethyl group etc.

Examples of such organoaluminum compounds include:

(I) Compounds represented by $R^a_n Al(OR^b)_{3-n}$, such as dimethylaluminum methoxide, diethylaluminum ethoxide and diisobutylaluminum methoxide.

(II) Compounds represented by $R^a_n Al(OSiR^c)_{3-n}$, such as $Et_2Al(OSiMe_3)$, $(iso-Bu)_2Al(OSiMe_3)$ and $(iso-Bu)_2Al(OSiEt_3)$.

(III) Compounds represented by $R^a_n Al(OAlR^d_2)_{3-n}$, such as $Et_2AlOAlEt_2$ and $(iso-Bu)_2AlOAl(iso-Bu)_2$.

(IV) Compounds represented by $R^a_n Al(NR^e_2)_{3-n}$, such as $Me_2AlNEt_2$, $Et_2AlNHMe$, $Me_2AlNHEt$, $Et_2AlN(Me_3Si)_2$ and $(iso-Bu)_2AlN(Me_3Si)_2$.

(V) Compounds represented by $R^a{}_n Al(SiR^{f}{}_3)_{3-n}$, such as (iso-Bu)$_2$AlSiMe$_3$.

(VI) Compounds represented by $R^a{}_n Al[N(R^g)-AlR^h{}_2]_{3-n}$, such as Et$_2$AlN(Me)—AlEt$_2$ and (iso-Bu)$_2$AlN(Et)Al(iso-Bu)$_2$.

Further, compounds analogous to the above compounds, such as organoaluminum compounds in which at least two aluminums are bonded via an oxygen atom or a nitrogen atom, are also employable. Specific examples thereof include (C$_2$H$_5$)$_2$AlOAl(C$_2$H$_5$)$_2$, (C$_4$H$_9$)$_2$AlOAl(C$_4$H$_9$)$_2$ and (C$_2$H$_5$)$_2$AlN(C$_2$H$_5$)Al(C$_2$H$_5$)$_2$. Furthermore, aluminoxanes (organoaluminum oxy-compounds), such as methyl aluminoxane, may also be used.

Organoaluminum compounds represented by the following formula are also employable:

$$R^a AlXY$$

wherein $R^a$, X and Y are the same as mentioned above.

Examples of the organoboron compounds include triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, tris(3,5-dimethylphenyl)boron, thexylborane, dicyclohexylborane, dicyamylborane, diisopinocamphenylborane, 9-borabicyclo[3.3.1]nonane, catecholborane, B-bromo-9-borabicyclo[3.3.1]nonane, borane-triethylamine complex and borane-methylsulfide complex.

Ionic compounds may be used as the organoboron compounds. Examples of such compounds include triethylammonium tetra(phenyl)boron, tripropylammonium tetra(phenyl)boron, trimethylammonium tetra(p-tolyl)boron, trimethylammonium tetra(o-tolyl)boron, tri(n-butyl)ammonium tetra(pentafluorophenyl)boron, tripropylammonium tetra(o,p-dimethylphenyl)boron, tri(n-butyl)ammonium tetra(p-trifluoromethylphenyl)boron, N,N-dimethylanilinium tetra(phenyl)boron, dicyclohexylammonium tetra(phenyl)boron, triphenylcarbenium tetrakis(pentafluorophenyl)borate, N,N-dimethylanilinium tetrakis(pentafluorophenyl)borate, bis[tri(n-butyl)ammonium]nonaborate and bis[tri(n-butyl)ammonium]decaborate.

The alkyl complex compounds of a Group 1 element and aluminum include compounds represented by the following formula:

$$M^1 AlR^j{}_4$$

wherein $M^1$ denotes Li, Na or K, and $R^j$ denotes a hydrocarbon group of 1 to 15 carbon atoms.

Specific examples thereof include LiAl(C$_2$H$_5$)$_4$ and LiAl(C$_7$H$_{15}$)$_4$.

Examples of the organoboron compounds and of the alkyl complex compounds of a Group 1 element and boron include corresponding compounds to the organoaluminum compounds and to the alkyl complex compounds of a Group 1 element and aluminum except that the aluminum is substituted with boron, respectively.

[Electron Donor (III)]

Examples of the electron donor (III) include the compounds listed above as the electron donors (ii) for use in the preparation of the solid titanium catalyst component (I), and further include organosilicon compounds having the following formula:

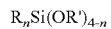

$$R_n Si(OR')_{4-n}$$

wherein R and R' are each a hydrocarbon group and 0<n<4.

Specific examples of the organosilicon compounds represented by the above formula include trimethylmethoxysilane, trimethylethoxysilane, dimethyldimethoxysilane, dimethyldiethoxysilane, diisopropyldimethoxysilane, tert-butylmethyldimethoxysilane, tert-butylmethyldiethoxysilane, tert-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, tert-butyltriethoxysilane, n-butyltriethoxysilane, isobutyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyl tris (β-methoxyethoxysilane), vinyltriacetoxysilane, dimethyltetraethoxydisiloxane, cyclopentyltrimethoxysilane, 2-methylcyclopentyltrimethoxysilane, 2,3-dimethylcyclopentyltrimethoxysilane, cyclopentyltriethoxysilane, dicyclopentyldimethoxysilane, bis(2-methylcyclopentyl)dimethoxysilane, bis(2,3-dimethylcyclopentyl)dimethoxysilane, dicyclopentyldiethoxysilane, tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane and cyclopentyldimethylethoxysilane.

Of these, preferable are ethyltriethoxysilane, n-propyltriethoxysilane, tert-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane.

Further examples of the electron donor (III) include nitrogen-containing electron donors, such as 2,6-substituted piperidines, 2,5-substituted piperidines, substituted methylenediamines (e.g. N,N,N',N'-tetramethylmethylenediamine and N,N,N',N'-tetraethylmethylenediamine), and substituted imidazolidines (e.g. 1,3-dibenzylimidazolidine and 1,3-dibenzyl-2-phenylimidazolidine); phosphorus-containing electron donors, such as phosphites, including triethyl phosphite, tri-n-propyl phosphite, triisopropyl phosphite, tri-n-butyl phosphite, triisobutyl phosphite, diethyl-n-butyl phosphite and diethylphenyl phosphite; and oxygen-containing electron donors, such as 2,6-substituted tetrahydropyrans and 2,5-substituted tetrahydropyrans. The electron donors (III) may be used individually or in combination of two or more kinds.

The metallocene catalyst comprises a metallocene compound (a), at least one compound selected from an organometallic compound (b-1), an organoaluminum oxy-compound (b-2) and a compound (b-3) capable of forming an ion pair by reacting with the metallocene compound (a), and optionally a fine particle carrier (c). Herein, the organometallic compound (b-1), organoaluminum oxy-compound (b-2), compound (b-3) capable of forming an ion pair by reacting with the metallocene compound (a), and fine particle carrier (c) are used to refer to the organometallic compound (B-1), organoaluminum oxy-compound (B-2), compound (B-3) capable of forming an ion pair by reacting with the transition metal compound, and carrier (C), respectively.

The metallocene compound (a) is not particularly limited as far as the propylene polymer (PP-C) that has the aforesaid properties results. The transition metal compound (1a) is a preferred example of the metallocene compound, and particularly the transition metal compound (1a) of the formula (1a) in which $R^1$ is a hydrocarbon group or a silicon-containing group is preferable.

In carrying out polymerization, the catalyst components may be used arbitrarily and in any addition sequence. Some exemplary processes are given below.

(1) The component (a) and at least one compound (b) selected from the organometallic compound (b-1), the organoaluminum oxy-compound (b-2) and the ionizing ionic compound (b-3) (hereinafter simply "component (b)") are fed to a polymerization reactor in an arbitrary order.

(2) A catalyst resulting from the contact between the component (a) and the component (b) is fed to a polymerization reactor.

(3) A catalyst component resulting from the contact between the component (a) and the component (b), and the component (b) are fed to a polymerization reactor in an arbitrary order. In this case, the components (b) may be the same or different.

(4) A catalyst component in which the component (a) is supported on the fine particle carrier (c), and the component (b) are fed to a polymerization reactor in an arbitrary order.

(5) A catalyst in which the components (a) and (b) are supported on the fine particle carrier (c) is fed to a polymerization reactor.

(6) A catalyst component in which the components (a) and (b) are supported on the fine particle carrier (c), and the component (b) are fed to a polymerization reactor in an arbitrary order. In this case, the components (b) may be the same or different.

(7) A catalyst component in which the component (b) is supported on the fine particle carrier (c), and the component (a) are fed to a polymerization reactor in an arbitrary order.

(8) A catalyst component in which the component (b) is supported on the fine particle carrier (c), the component (a) and the component (b) are fed to a polymerization reactor in an arbitrary order. In this case, the components (b) may be the same or different.

(9) The components (a) and (b) are supported on the fine particle carrier (c) to form a catalyst component, and the catalyst component is then contacted with the component (b) to yield a catalyst, which is fed to a polymerization reactor. In this case, the components (b) may be the same or different.

(10) The components (a) and (b) are supported on the fine particle carrier (c), and are contacted with the component (b) to form a catalyst component. The catalyst component and the component (b) are fed to a polymerization reactor. In this case, the components (b) may be the same or different.

The solid catalyst component in which the components (a) and (b) are supported on the fine particle carrier (c), may be prepolymerized with an olefin. The prepolymerized solid catalyst component generally contains the polyolefin in an amount of 0.1 to 1000 g, preferably 0.3 to 500 g, and particularly preferably 1 to 200 g, based on 1 g of the solid catalyst component.

To allow the polymerization to proceed smoothly, an antistatic agent, an antifouling agent and the like may be used, optionally in a supported form on a carrier.

In the present invention, preparation of the propylene polymer (PP-C) may be carried out by any of liquid-phase polymerization, such as solution polymerization or suspension polymerization, and gas-phase polymerization. The liquid-phase polymerization may be conducted using an inert hydrocarbon solvent. Exemplary inert hydrocarbon solvents include aliphatic hydrocarbons, such as propane, butane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures thereof. The α-olefin to be polymerized may work as a solvent itself.

The temperature in the olefin polymerization is usually in the range of −50 to 200° C., preferably 0 to 170° C. The polymerization pressure generally ranges from atmospheric pressure to 10 MPa (gauge pressure), preferably from atmospheric pressure to 5 MPa (gauge pressure). The polymerization reaction can be carried out batchwise, semi-continuously or continuously. Also, it is possible to conduct the polymerization in two or more stages under different reaction conditions. Continuous polymerization is preferable in the present invention.

Hydrogen may be used in the polymerization to control the molecular weights of polymers or the polymerization activity, and its amount may be suitably in the range of about 0.001 to 100 NL based on 1 kg of the olefin.

The propylene polymer (PP-C) of the present invention may be prepared using a magnesium-supported titanium catalyst system, a metallocene catalyst system or the both. When the two catalyst systems are used in combination, polymerization is catalyzed by the magnesium-supported titanium catalyst system to give a polymer (A1) and by the metallocene catalyst system to give a polymer (A2) in a weight ratio of 1/99 to 99/1. The propylene polymer (A1) obtained with the magnesium-supported titanium catalyst system and the propylene polymer (A2) obtained with the metallocene catalyst system may be mixed in a desirable weight ratio of 1/99 to 99/1, and preferably 5/95 to 95/5.

The metallocene-catalyzed propylene polymer (A2) has a ratio of 0.2% or less, respectively in terms of irregularly bonded propylene monomers based on 2,1-insertion or 1,3-insertion to all the propylene structural units as determined from a $^{13}$C-NMR spectrum. When the ratio of irregularly bonded propylene monomers based on 2,1-insertion or 1,3-insertion increases, mechanical strength properties of the resultant resin composition are deteriorated.

Elastomer (EL)

The elastomers (EL) of the present invention for the polyolefin resin composition include:

(EL-1) a random copolymer of propylene and ethylene that contains propylene-derived constituent units and ethylene-derived constituent units in a molar ratio of 80/20 to 20/80;

(EL-2) a random copolymer of ethylene and an α-olefin having 4 to 20 carbon atoms that contains ethylene-derived constituent units and α-olefin-derived constituent units in a molar ratio of 80/20 to 20/80;

(EL-3) a random copolymer of propylene and an α-olefin having 4 to 20 carbon atoms that contains propylene-derived constituent units and α-olefin-derived constituent units in a molar ratio of 80/20 to 20/80; and (EL-4) a random copolymer of ethylene, propylene and an α-olefin having 4 to 20 carbon atoms that contains propylene-derived constituent units and α-olefin-derived constituent units in a molar ratio of 80/20 to 20/80, and contains ethylene-derived and propylene-derived constituent units (EP), and $C_{4-20}$ α-olefin-derived constituent units (OL) in a molar ratio [(EP)/(OL)] of 99/1 to 20/80.

Exemplary α-olefins of 4 to 20 carbon atoms for the preparation of the elastomers (EL) include olefin compounds having 2 to 20 carbon atoms, such as 1-butene, 1-pentene, 1-hexene, 4-methyl-1-pentene, 1-octene, 1-decene, 1-dodecene, 1-tetradecene, 1-hexadecene, 1-octadecene, 1-eicosene, norbornene, tetracyclododecene, butadiene, pentadiene, isoprene and hexadiene.

Other employable compounds include linear polyene compounds such as methylhexadiene, octadiene, methyloctadiene, ethyloctadiene, propyloctadiene, butyloctadiene, nonadiene, methylnonadiene, ethylnonadiene, decadiene, methyldecadiene, undecadiene, methylundecadiene, octatriene, decatriene and divinylbenzene; and cyclic polyene compounds such as cyclopentadiene, cyclohexadiene, ethylcyclohexadiene, cycloheptadiene, dicyclopentadiene, dicyclohexadiene, ethylidenenorbornene, vinylnorbornene, isopropylidenenorbornene, methylhydroindene, diisopropylidenenorbornene and propenylisonorbornadiene.

These olefin compounds may be used singly or in combination of two or more kinds. Of the above compounds, 1-butene, 1-hexene and 1-octene are particularly preferable.

The elastomer (EL) has an intrinsic viscosity [η], as measured in decalin at 135° C., of 1.5 dl/g or more, preferably 2.0 dl/g or more, and more preferably 2.5 dl/g or above.

The elastomer (EL) desirably has a ratio (Mw/Mn) of 1.0 to 3.5, preferably 1.1 to 3.0 in terms of a weight-average molecular weight (Mw) to a number-average molecular weight (Mn) as measured by gel permeation chromatography (GPC).

The density of the elastomer (EL) desirably falls in the range of 0.85 to 0.92 g/cm$^3$, preferably 0.85 to 0.90 g/cm$^3$.

Importantly, the elastomer (EL-1) for the polyolefin resin composition of the present invention has a ratio of 1.0 mol % or less, preferably 0.5 mol % or less, and more preferably 0.2 mol % or less in terms of irregularly bonded propylene monomers based on 2,1-insertion to all the propylene constituent units as determined from a $^{13}$C-NMR spectrum.

Also, it is important with respect to the polyolefin resin composition of the present invention that the elastomer (EL-2) has a ratio of 1.0 mol % or less, preferably 0.5 mol % or less, and more preferably 0.2 mol % or less in terms of irregularly bonded α-olefin monomers based on 2,1-insertion to all the α-olefin constituent units as determined from a $^{13}$C-NMR spectrum.

Further, the elastomer (EL-3) of the present invention for the polyolefin resin composition should have a ratio of 1.0 mol % or less, preferably 0.5 mol % or less, and more preferably 0.2 mol % or less in terms of irregularly bonded propylene monomers based on 2,1-insertion to all the propylene constituent units as determined from a $^{13}$C-NMR spectrum.

The elastomer (EL-3) has a melting point (Tm) of not more than 150° C. or outside the measurable range according to DSC measurement.

Also importantly, the elastomer (EL-4) for the polyolefin resin composition of the present invention has a ratio of 1.0 mol % or less, preferably 0.5 mol % or less, and more preferably 0.2 mol % or less in terms of irregularly bonded propylene monomers based on 2,1-insertion to all the propylene constituent units, and has a ratio of 1.0 mol % or less, preferably 0.5 mol % or less, and more preferably 0.2 mol % or less in terms of irregularly bonded α-olefin monomers based on 2,1-insertion to all the α-olefin constituent units as determined from a $^{13}$C-NMR spectrum.

When the elastomers (EL) have higher ratios of irregularly bonded propylene and α-olefin monomers, mechanical strength properties of the resultant resin composition are deteriorated and the molded articles exhibit poorer properties. Therefore, the ratios of irregularly bonded monomer units desirably fall within the aforesaid limits.

The elastomers (EL) may be used singly or in combination of two or more kinds.

The elastomers (EL) may be prepared using the magnesium-supported titanium catalyst system or the metallocene catalyst system employed for synthesis of the propylene polymer (PP-C). Preferably, the elastomers (EL) may be produced with a metallocene catalyst system that contains the transition metal compound (1a).

In the present invention, the elastomers (EL) may be prepared by any of liquid-phase polymerization, such as solution polymerization or suspension polymerization, and gas-phase polymerization. The liquid-phase polymerization may be conducted using an inert hydrocarbon solvent. Exemplary inert hydrocarbon solvents include aliphatic hydrocarbons, such as propane, butane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures thereof. The α-olefin to be polymerized may work as a solvent itself.

The temperature in the olefin polymerization is usually −50° C. or above, preferably 40° C. or above, more preferably 50° C. or above, and even more preferably 60° C. or above. Lower polymerization temperatures result to insufficient productivity and require additional steps for heat removal.

The polymerization pressure generally ranges from atmospheric pressure to 10 MPa (gauge pressure), preferably from atmospheric pressure to 5 MPa (gauge pressure). The polymerization reaction can be carried out batchwise, semi-continuously or continuously. Also, it is possible to conduct the polymerization in two or more stages under different reaction conditions.

Hydrogen may be used in the polymerization to control the molecular weights of polymers or the polymerization activity, and its amount may be suitably in the range of about 0.001 to 100 NL based on 1 kg of the olefin.

The elastomers (EL) may be used in an amount of 10 parts by weight or more, preferably 20 parts by weight or more, and still preferably 30 parts by weight or more based on 100 parts by weight of the propylene polymer (PP-C). The polyolefin resin composition of the present invention can exhibit more superior mechanical strength properties, particularly flexural strength properties, when it contains these elastomers in higher contents.

There is no particular limitation for the production of the polyolefin resin composition of the present invention, and any suitable processes may be used. For example, the propylene polymer (PP-C) may be prepared first and consecutively the elastomers (EL) may be prepared. The polyolefin resin composition may also be obtained by preparing a propylene polymer (A2) with a metallocene catalyst and consecutively producing the elastomers (EL), and adding a propylene polymer (A1) obtained with a catalyst system based on titanium tetrachloride supported on magnesium chloride. Also, the propylene polymer (A1) and the elastomers (EL) prepared as described above may be mixed to give the polyolefin resin composition.

The polyolefin resin composition of the present invention may optionally contain an inorganic filler (C) in addition to the propylene polymer (PP-C) and the elastomers (EL).

The inorganic fillers (C) for use in the present invention include talc, clays, calcium carbonate, mica, silicates, carbonates, glass fibers and barium sulfate. Of these, talc and barium sulfate are preferred, and particularly talc is preferable. The talc desirably ranges in mean particle diameter from 1 to 5 µm, preferably from 1 to 3 µm. The inorganic fillers (C) may be used singly or in combination of two or more kinds.

The inorganic fillers (C) may be added in an amount of 1 to 50 parts by weight, preferably 2 to 40 parts by weight, and particularly preferably 5 to 35 parts by weight based on 100 parts by weight of the polyolefin resin composition.

The polyolefin resin composition of the present invention, which comprises the propylene polymer (PP-C), the elastomers (EL) and the optional inorganic filler (C) in the aforesaid weight ratios, exhibits excellent flow properties in molding and provides molded articles that have an excellent balance among properties, including flexural modules, impact resistance, hardness, gloss and brittle temperature. Therefore, the resin composition according to the present invention can be favorably used as injection molding materials, and can produce injection molded articles while preventing flow marks.

The polyolefin resin composition of the present invention may optionally contain further additives in addition to the propylene polymer (PP-C), the elastomers (EL) and the inorganic filler (C) without adversely affecting the objects of the invention. The additives include heat stabilizers, antistatic agents, weathering stabilizers, light stabilizers, anti-aging agents, antioxidants, metal salts of fatty acids, softeners, dispersants, fillers, colorants, lubricants and pigments.

Exemplary antioxidants include conventional phenol-based, sulfur-based and phosphorus-based antioxidants.

The antioxidants may be used singly or in combination of two or more kinds.

The antioxidants are desirably added in an amount of 0.01 to 1 part by weight, preferably 0.05 to 0.3 part by weight based on 100 parts by weight of the combined propylene polymer (PP-C), elastomers (EL) and optional inorganic filler (C).

Exemplary light stabilizers include hindered amine light stabilizers (HALS) and ultraviolet light absorbers.

The hindered amine light stabilizers include tetrakis(1,2,2,6,6-pentamethyl-4-piperidine)-1,2,3,4-butane tetracarboxylate (molecular weight: 847), Adekastab™ LA-52 (molecular weight: 847), tetrakis (1,2,2,6,6-pentamethyl-4-piperidine)-1,2,3,4-butane tetracarboxylate), Adekastab™ LA-62 (molecular weight: about 900), Adekastab™ LA-67 (molecular weight: about 900), Adekastab™ LA-63 (molecular weight: about 2000), Adekastab™ LA-68LD (molecular weight: about 1900) (available from ASAHI DENKA CO., LTD.), and CHIMASSORB™ 944 (molecular weight: 72,500, available from Ciba Specialty Chemicals).

The ultraviolet light absorbers include TINUVIN™ 326 (molecular weight: 316), TINUVIN™ 327 (molecular weight: 357) and TINUVIN™ 120 (molecular weight: 438) (available from Ciba Specialty Chemicals).

The light stabilizers may be used singly or in combination of two or more kinds.

The hindered amine light stabilizers or the ultraviolet light absorbers are preferably used in an amount of 0.01 to 1 part by weight, particularly preferably 0.1 to 0.5 part by weight based on 100 parts by weight of the combined propylene polymer (PP-C), elastomers (EL) and optional inorganic filler (C).

The metal salts of fatty acids neutralize the catalyst contained in the polyolefin resin composition and also work as dispersant for the fillers (including the inorganic filler (C)) and pigments in the resin composition. The metal salts of fatty acids enable the resin composition to provide molded articles that have excellent properties, such as high strength required for automobile interior trims.

Exemplary metal salts of fatty acids include calcium stearate (melting point: 158° C.) and lithium stearate (melting point: 220° C.).

The metal salts of fatty acids are preferably added in an amount of 0.01 to 1 part by weight, particularly preferably 0.05 to 0.5 part by weight based on 100 parts by weight of the combined propylene polymer (PP-C), elastomers (EL) and optional inorganic filler (C). When the metal salts of fatty acids have amounts within the above ranges, they can effectively work as neutralizing agent and dispersant and also the sublimation level from the molded articles may be reduced.

The pigments may be those know in the art, and examples thereof include inorganic pigments such as oxides, sulfides and sulfates of metals, and organic pigments such as phthalocyanine pigments, quinacridone pigments and benzidine pigments.

The pigments are preferably added in an amount of 0.01 to 10 parts by weight, particularly preferably 0.05 to 2 parts by weight based on 100 parts by weight of the combined propylene polymer (PP-C), elastomers (EL) and optional inorganic filler (C).

To produce the polyolefin resin composition of the present invention, the propylene polymer (PP-C), the elastomers (EL), the optional inorganic filer (C) and additives may be mixed or melt kneaded with a mixing equipment, such as a Banbury mixer, a single-screw extruder, a twin-screw extruder or a high-speed twin-screw extruder.

The specifically determined contents of the propylene polymer (PP-C) and the elastomers (EL) enable the polyolefin resin composition of the present invention to exhibit excellent mechanical strength properties with good balance among tensile strength, flexural modules and impact resistance. Also, the polyolefin resin composition is capable of providing molded articles (including injection molded articles) that have no or unnoticeable flow marks, high transparency and high gloss, which give them good appearance.

The injection molded articles according to the present invention may be obtained by injection molding the polyolefin resin composition, and have good appearance and excellent mechanical strength properties. They have numerous applications without limitation. Suitable uses thereof include automobile parts, such as automobile interior trims including door trims and instrument panels, and automobile exterior trims including bumpers and mud guards; parts of home electric appliances, such as bodies of hot plates, rice cookers and pot, and washing machines; containers, such as battery containers; and medical apparatus parts, such as injection syringes, ampules and Petri dishes.

The hollow vessels according to the present invention may be manufactured by blow molding, expansion molding or vacuum forming the polyolefin resin composition, and have exceptional appearance and excellent mechanical strength properties. They may be used in numerous applications without limitation, and, because of their superior transparency and mechanical strength properties, can find suitable applications as containers for solid detergents, liquid detergents, skin lotions, foods and drinking water.

The films or sheets according to the present invention may be produced by calendering, film casting or extrusion molding the polyolefin resin composition, and have superior appearance, transparency and mechanical strength properties. They may be used in various applications without limitation, and are suitably used as protective films or sheets due to their high transparency, good appearance and excellent mechanical strength properties.

The fibers according to the present invention may be obtained by the melt spinning or other spinning technique for the polyolefin resin composition, and have exceptional mechanical strength properties. They may be used in many applications without limitation, and are suitable to make ropes and nonwoven fabrics.

EXAMPLES

The present invention will be described in more detail with reference to the following examples, through the present invention should not be restricted by the examples.

Examples and Comparative Examples concerning to laminates prepared by using a propylene/1-butene random copolymer(PBR), polypropylene composition (CC-1) or (CC-2) and polypropylene composition(CC-2) are described hereinafter.

[Methods for Measuring Physical Properties]

[1-Butene Content]

The 1-butene content was determined by utilizing $^{13}$C-NMR.

[Intrinsic Viscosity [η]]

The intrinsic viscosity was measured in decalin at 135° C. and indicated by dl/g.

[Molecular weight distribution (Mw/Mn)]

The molecular weight distribution (Mw/Mn) was measured using GPC-150C manufactured by Millipore Co., Ltd in the following manner.

As a separation column, TSK GNH HT was used. The column had a diameter of 27 mm and a length of 600 mm. The column temperature was set to 140° C. For a mobile phase, o-dichlorobenzene (Wako Pure Chemical Industries, Ltd.) and 0.025 wt % of BHT (manufactured by Takeda Chemical Industries, Ltd.) as an antioxidant were used. The mobile phase was moved at a rate of 1.0 ml/min and the specimen concentration was 0.1 wt %. The amount of the injected specimen was 500 μL and a differential refractometer was used as a detector. As standard polystyrenes having a molecular weight of Mw<1000 and Mw>4×10$^6$, polystyrenes manufactured by Tosoh Co., Ltd were used, and as standard polystyrenes having a molecular weight of 1000≦Mw≦4×10$^6$, polystyrenes manufactured by Pressure Chemical Co., Ltd were used.

[B Value]

The B value was determined in such a way that about 200 mg of a copolymer was homogeneously dissolved in 1 ml of hexachlorobutadiene in a 10 mmϕ sample tube to prepare a specimen and the $^{13}$C-NMR spectrum of the specimen was usually measured under conditions of a measuring temperature of 120° C., a measuring frequency of 25.05 MHz, a spectrum width of 1500 Hz, a filter width of 1500 Hz, a pulse repeating time of 4.2 sec and an integrating time of 2000 to 5000 times, and from the spectrums, $P_1$, $P_2$ and $P_{12}$ ($P_1$ was an ethylene content fraction, $P_2$ was a 1-butene content fraction and $P_{12}$ was a proportion of ethylene-1-butene chain in all the molecular chains were calculated.

[Triad Tacticity]

The $^{13}$C-NMR spectrum was measured using a hexachlorobutadiene solution (on the bases of tetramethylsilane) and the proportion of the area of a peak appeared at 21.0 to 21.9 ppm to all the area (100%) of peaks appeared at 19.5 to 21.9 ppm was determined.

[Proportion of Irregular Bond Based on 2,1-Insertion]

The proportion was determined utilizing a $^{13}$C-NMR spectrum with the above-described method referring to Polymer, 30, 1350 (1989).

[Melting point (TM)]

About 5 mg of a specimen was charged into an aluminum pan, heated to 200° C. at a rate of 10° C./min, and maintained for 5 min at 200° C. Thereafter, the temperature was decreased to room temperature at a rate of 20° C./min and then elevated at a rate of 10° C./min. In elevating the temperature, the melting point was determined from an endothermic curve. In the measurement, DSC-7 apparatus (manufactured by Perkin Elmer Co., Ltd) was used.

[Crystallinity]

A press sheet having a thickness of 1.0 mm was molded. After 24 hr from the molding, the crystallinity thereof was determined by X ray diffraction measurement.

[Crystallization Rate]

The ½ crystallizing time at 45° C. was determined using the above DSC apparatus.

[Tensile Test]

The tensile strength at yield point in a MD direction, elongation at break and initial modulus of elasticity were measured at a tensile rate of 200 m/min in accordance with JIS K6781.

[Heat-Seal Strength]

The test was conducted using the laminate films prepared in the following examples as a specimen. The film was laid one on top the other and heat-sealed at a pressure of 2 Kg/cm$^2$ for 1 sec by a seal bar having a width of 5 mm at each temperatures, and then allowed to stand.

Subsequently, a 15 mm wide test piece was cut out from the specimen and when the heat-sealed part was peeled at a cross head speed of 200 mm/min, the peeling strength was measured and the resulting value was taken as heat-seal strength.

[Cloudiness (Haze)]

A film was formed in accordance with ASTM D1003 and aged in an air oven set at 80° C. for 1 day. Before and after the aging, the cloudiness (haze) was measured.

[Blocking Resistance]

The blocking resistance was evaluated in accordance with ASTM D1893. The specimen film for measuring the heat-seal strength (1) was cut out to test pieces having a width of 10 cm and a length of 15 cm. The test pieces were laid one on top the other in such a way that the surfaces on which a polypropylene composition was laminated were faced each other. Then, the test pieces were sandwiched between two plates of glass to prepare a sample. A load of 20 Kg was put on it and the sample was allowed to stand in an air oven at 50° C. After 3 days, the sample was taken out and the peeling strength thereof was measured by a universal testing machine and the resulting value was taken as a blocking value (N/m).

[Slip Properties]

The coefficient of static friction and the coefficient of dynamic friction were measured in accordance with ASTM D1894.

The polypropylene and propylene/1-butene copolymer used in the examples and comparative examples of the present invention are described below. In the examples and comparative examples of the present invention, the following polypropylenes prepared by polymerizing with conventional solid titanium catalyst components were used as a polypropylene.

Polypropylene-1(PP-1): propylene random copolymer
(composition; propylene 96.4 mol %, ethylene 2.1 mol %, 1-butene 1.5 mol %, MFR (230° C.); 7.0 g/10 min, DSC melting point; 142° C., Crystallinity; 56%)

Polypropylene-2(PP-2): propylene random copolymer
(composition; propylene 95.0 mol %, ethylene 3.5 mol %, 1-butene 1.5 mol %, MFR (230° C.); 1.5 g/10 min, DSC melting point; 140° C., Crystallinity; 52%)

Polypropylene-3(PP-3): propylene homopolymer
(intrinsic viscosity [η]; 2.9 dl/g, DSC melting point; 164° C., Crystallinity; 62%)

In the next place, the preparation examples (examples) of the propylene/1-butene copolymers (PBR) are described. The properties of the propylene/1-butene random copolymers (PBR) prepared in the preparation examples (examples) are shown in Table 2.

Example 1

Synthesis of PBR-1

In a 2000 ml polymerization reactor thoroughly purged with nitrogen, 900 ml of dried hexane, 60 g of 1-butene and triisobutylaluminum (1.0 mmol) were charged at room temperature, the inside temperature of the polymerization reactor was elevated to 70° C. and pressurized with propylene to 0.7 Mpa. A toluene solution obtained by allowing 0.002 mmol of dimethylmethylene(3-tert-butyl-5-methylcyclopentadienyl) fluorenyl zirconium dichloride to contact with 0.6 mmol in terms of aluminum of methyl aluminoxane (manufactured by Tosoh Fine chemical Co., Ltd) was added to the polymerization reactor. Polymerization was carried out for 30 min while keeping an internal temperature of 70° C. and a propylene pressure of 0.7 Mpa and then 20 ml of methanol was added and thereby the polymerization was ceased. After depressurization, a polymer was precipitated from the polymerization solution in 2 L of methanol, and was dried in vacuo at 130° C. for 12 hr.

The polymer was obtained in an amount of 9.2 g. The polymer had a melting point of 80.6° C. and an intrinsic viscosity [η] of 1.18 dl/g. The physical properties of the resulting polymer were measured.

The results are shown in Table 2.

Example 2

Synthesis of PBR-2

The polymerization was carried out in the same procedure as Example 1 except that 917 ml of hexane and 50 g of 1-butene were charged and dimethylmethylene(3-tert-butyl-5-methyl cyclopentadienyl)fluorenyl zirconium dichloride was changed to diphenylmethylene(3-tert-butyl-5-methyl cyclopentadienyl) 2,7-di-tert-butylfluorenyl zirconium dichloride.

The polymer was obtained in an amount of 11.5 g. The polymer had a melting point of 86.3° C. and an intrinsic viscosity [η] of 2.1 dl/g. The physical properties of the resulting polymer were measured. The results are shown in Table 2.

Example 3

Synthesis of PBR-3

The polymerization was carried out in the same procedure as Example 1 except that 800 ml of hexane and 120 g of 1-butene were charged and the internal temperature of the polymerization reactor was kept at 60° C.

The polymer was obtained in an amount of 10.8 g. The polymer had a melting point of 66.5° C. and an intrinsic viscosity [η] of 2.06 dl/g. The physical properties of the resulting polymer were measured. The results are shown in Table 2.

Comparative Example 1

Synthesis of PBR-C1

In a 2 L autoclave thoroughly purged with nitrogen, 830 ml of hexane, 100 g of 1-butene and 1 mmol of triisobutylaluminum were charged and the temperature was elevated to 70° C. and the total pressure was set to 0.7 Mpa with feeding propylene. To the autoclave, 1 mmol of triethylaluminum and 0.005 mmol in terms of Ti atom of a titanium catalyst supported on magnesium chloride were added. Polymerization was carried out for 30 min while keeping the total pressure of 0.7 Mpa by continuously feeding propylene. Except for the above, the polymerization and the post treatment were carried out in the same manner as Example 1.

The polymer was obtained in an amount of 33.7 g. The polymer had a melting point of 110.0° C. and an intrinsic viscosity [i] of 1.91 dl/g. The physical properties of the resulting polymer were measured.

The results are shown in Table 2.

Comparative Example 2

Synthesis of PBR-C2

In Comparative Example 2, 900 ml of hexane, 60 g of 1-butene and 1 mmol of triisobutylaluminum were charged and the temperature was elevated to 70° C. and the total pressure was set to 0.7 Mpa with feeding propylene. 0.30 mmol of methlaluminoxane and 0.001 mmol in terms of Zr atom of rac-dimethylsilylene-bis{1-(2-methyl-4-phenyl-1-indenyl)}zirconium dichloride were added to the autoclave. Polymerization was carried out for 30 min while keeping the total pressure of 0.7 Mpa by continuously feeding propylene. Except for the above, the polymerization and the post treatment were carried out in the same procedure as Example 1.

The polymer was obtained in an amount of 39.7 g. The polymer had a melting point of 88.4° C. and an intrinsic viscosity [η] of 1.60 dl/g.

Comparative Example 3

Synthesis of PBR-C3

The polymerization was carried out in the same manner as Comparative Example 2, except that 842 ml of hexane and 95 g of 1-butene were charged. The polymer was obtained in an amount of 15.1 g. The polymer had a melting point of 69.5° C.

and an intrinsic viscosity [η] of 1.95 dl/g. The physical properties of the resulting polymer were measured. The results are shown in Table 2.

With regard to the polymer of Example 3 and the polymer of Comparative Example 3 which have the almost same melting point, the ½ crystallization time at 45° C. was determined by DSC.

TABLE 2

|  | Ex. 1 | Ex. 2 | Ex. 3 |
|---|---|---|---|
| 1-Butene content (mol %) | 19.1 | 16.9 | 28.0 |
| Intrinsic viscosity [η] (dl/g) | 1.18 | 2.11 | 2.06 |
| Mw/Mn | 2.04 | 2.09 | 2.15 |
| B value | 1.01 | 1.05 | 1.04 |
| Triad isotacticity (%) | 96 | 96 | 95 |
| Proportion of irregular bond based on 2,1-insertion | 0.1 | 0.1 | 0.2 |
| Melting point (° C.) | 80.6 | 86.3 | 66.5 |
| 146 exp(−0.022M) | 95.9 | 100.7 | 78.9 |
| 125 exp(−0.032M) | 67.8 | 72.8 | 51.0 |
| 146 exp(−0.0265M) | 88.0 | 93.3 | 69.5 |
| ½ crystallization time (min) |  |  | 5.2 |

|  | Com. Ex. 1 | Com. Ex. 2 | Com. Ex. 3 |
|---|---|---|---|
| 1-Butene content (mol %) | 23.1 | 26.4 | 34.5 |
| Intrinsic viscosity [η] (dl/g) | 1.91 | 1.60 | 1.95 |
| Mw/Mn | 3.40 | 2.05 | 2.03 |
| B value | 0.92 | 1.00 | 1.15 |
| Triad isotacticity (%) | 99 | 99 | 99 |
| Proportion of irregular bond based on 2,1-insertion | <0.01 | 0.02 | 0.1 |
| Melting point (° C.) | 110.0 | 88.4 | 69.5 |
| 146 exp(−0.022M) | 87.8 | 81.7 | 68.3 |
| 125 exp(−0.032M) | 59.7 | 53.7 | 41.4 |
| 146 exp(−0.0265M) | 79.2 | 72.5 | 58.5 |
| ½ crystallization time (min) |  |  | 33.1 |

Example 4

In an air-knife system cast-molding machine equipped with an extruder having a screw diameter of 40 mm and a T-die having a width of 400 mm, 70 wt % of polypropylene-1 and 30 wt % of the propylene/1-butene random copolymer prepared in Example 1 were fed and a film having a thickness of 50 μm was molded in conditions that the resin temperature was 230° C. and the chilling temperature was 30° C. The mechanical properties and the heat-seal properties of the resulting film are shown in Table 3.

Examples 5 and 6

Comparative Example 4 to 6

In each example, the procedure of Example 4 was repeated except for using the propylene/1-butene random copolymer as described in Table 3, to prepare a film. The evaluation results of the resulting film are shown in Table 3.

TABLE 3

|  | Ex. 4 | Ex. 5 | Ex. 6 | Com. Ex. 4 | Com. Ex. 5 | Com. Ex. 6 |
|---|---|---|---|---|---|---|
| Resin composition |  |  |  |  |  |  |
| PP-1 % | 70 | 70 | 70 | 70 | 70 | 70 |
| PBR-1 % | 30 |  |  |  |  |  |
| PBR-2 % |  | 30 |  |  |  |  |
| PBR-3 % |  |  | 30 |  |  |  |
| PBR-C1 % |  |  |  | 30 |  |  |
| PBR-C2 % |  |  |  |  | 30 |  |
| PBR-C3 % |  |  |  |  |  | 30 |
| Tensile test |  |  |  |  |  |  |
| Yield stress MPa | 14 | 15 | 13 | 15 | 15 | 14 |
| Elongation at break % | 650 | 650 | 650 | 650 | 650 | 650 |
| Initial modulus of elasticity MPa | 490 | 530 | 430 | 590 | 570 | 490 |
| Haze % | 2.0 | 1.8 | 1.6 | 1.8 | 2.6 | 2.4 |
| Haze % (80° C. × 1 day) | 2.1 | 1.8 | 1.6 | 3.9 | 2.7 | 2.5 |
| Blocking resistance N/m | 0.2 | 0.2 | 0.2 | 0.6 | 0.2 | 0.2 |
| Slip properties |  |  |  |  |  |  |
| Static | 0.63 | 0.60 | 0.68 | 0.82 | 0.65 | 0.74 |
| Dynamic | 0.51 | 0.46 | 0.54 | 0.74 | 0.59 | 0.60 |

Example 7

In this example, a composition of 50 wt % of propylene/1-butene random copolymer (PBR-3) prepared in Example 3 and 50 wt % of polypropylene-2 (PP-2) was palletized with a single-screw extruder of 40 mm(p. The pellet was fed to a cast-molding machine equipped with a dice having a width of 300 mm and a sheet having a thickness of 250 μm was prepared at a resin temperature of 230° C. Further, the resulting sheet was cut out into squares having a size of 9 cm and the square was orientated 5 times in a MD direction using a desk stretching-machine. The shrinkage factor of the resulting orientated film was measured in the following method. The results are shown in Table 4.

[Shrinkage Factor]

A stretched film was slit to prepare a sample having a size of 15 mm×150 mm (stretching direction). The sample was immersed in a hot water at 90° C. for 10 sec and the shrinkage factor was determined from the length shrunk and the length before shrinking.

Comparative Examples 7 and 8

In each example, the procedure of Example 7 was repeated except for using a propylene/1-butene random copolymer having the composition as described in Table 4, to prepare a stretched film. The evaluation results of the resulting stretched film are shown in Table 4.

TABLE 4

|  | Ex. 7 | Com. Ex. 7 | Com. Ex. 8 |
|---|---|---|---|
| Resin composition | | | |
| PP-2 % | 50 | 50 | 50 |
| PBR-3 % | 50 | | |
| PBR-C1 % | | 50 | |
| PBR-C3 % | | | 50 |
| Shrinkage Factor (%) | 32 | 25 | 28 |

Example 1b

Using an air knife system two-kind three-layer cast molding machine equipped with an extruder (for core layer) having a screw diameter of 30 mm, an extruder (for both sealant layers) having a screw diameter of 25 mm and a T-die having a width of 200 mm, a sample of an unstretched sheet as shown in FIG. 1 was prepared. The core layer comprises polypropylene-3 (PP-3). Both of the sealant layers comprise 75 wt parts of polypropylene-1 (PP-1), 25 wt parts of PBR-2 and, based on the total amount (100 wt parts) of PP-1 and PBR-2, 0.1 wt parts of an anti-blocking agent. In this sheet, the core layer had a thickness of 600 Mm and the sealant layers both have a thickness of 80 Mm.

The resulting unstretched sheet sample was cut into a square having a size of 10 cm, and the sample was stretched in 5×8 times using a batch biaxial stretching machine to prepare a biaxially stretched film having a thickness of 22 to 24 μm. The stretching was carried out in conditions such that the preheating time was 2 min, the stretching temperature was 160° C., and the annealing time for the film after stretching was 2 min. The physical properties of the film are shown in Table 5.

Example 2b

The procedure of Example 1b was repeated except that PBR-3 was used instead of PBR-2 used in both of the sealant layers in Example 1b to prepare a biaxially stretched film having a thickness of about 22 to 24 μm. The physical properties of the film are shown in Table 5.

Example 3b

The procedure of Example 2b was repeated except that 50 wt parts of polypropylene-1 and 50 wt parts of PBR-3 were used to prepare a biaxially stretched film having a thickness of about 22 to 24 μm. The physical properties of the film are shown in Table 5.

Comparative Example 1b

The procedure of Example 1b was repeated except that PBR-C1 was used instead of PBR-2 used in both of the sealant layers to prepare a biaxially stretched film having a thickness of about 22 to 24 μm. The physical properties of the film are shown in Table 5.

Comparative Example 2b

The procedure of Example 1b was repeated except that PBR-C2 was used instead of PBR-2 used in both of the sealant layers to prepare a biaxially stretched film having a thickness of about 22 to 24 μm. The physical properties of the film are shown in Table 5.

Comparative Example 3b

The procedure of Example 1b was repeated except that PBR-C3 was used instead of PBR-2 used in both of the sealant layers to prepare a biaxially stretched film having a thickness of about 22 to 24 μm. The physical properties of the film are shown in Table 5.

Comparative Example 4b

The procedure of Comparative Example 3b was repeated except that 50 wt parts of polypropylene-1 and 50 wt parts of PBR-C3 were used to prepare a biaxially stretched film having a thickness of about 22 to 24 μm. The physical properties of the film are shown in Table 5.

In the biaxially stretched films prepared using the propylene/1-butene random copolymer (PBR-2,3) according to the present invention, the temperature at which the heat-seal strength reached 2 (N/15 mm) was not higher than 90° C. so that the films obtained had remarkably excellent low temperature heat-sealability as compared with Comparative Example 1b. The films had good blocking resistance and excellent balance between low temperature heat-sealability and blocking resistance.

Furthermore, the propylene/1-butene random copolymer (PBR-2,3) used in the present invention had a relatively higher crystallization rate as compared with the propylene/1-butene random copolymer (PBR-C2, C3) having the same melting point as PBR-2,3, used in Comparative Examples so that the biaxially stretched films prepared using PBR-2,3 had excellent hot tack properties and transparency.

TABLE 5

| | Example | | |
|---|---|---|---|
| | 1b | 2b | 3b |
| Polypropylene-1 (wt part) | 75 | 75 | 50 |
| PBR-2 (wt part) | 25 | | |
| PBR-3 (wt part) | | 25 | 50 |
| Cloudiness (Haze) (%) | 11.0 | 13.2 | 13.9 |
| Cloudiness change with time (%) | 13.3 | 14.3 | 14.0 |
| Slip properties/Static friction | 0.8 | 0.8 | 0.8 |
| Slip properties/Dynamic friction | 0.6 | 10.6 | 0.7 |
| Blocking resistance (N/m) | 0.14 | 0.14 | 0.27 |
| Heat seal strength (N/15 mm) | | | |
| 65° C. | | 0 | 0.3 |
| 70° C. | 0 | 0.3 | 3.1 |
| 80° C. | 0.1 | 2.1 | 3.3 |
| 90° C. | 2.6 | 3.5 | 3.2 |
| 100° C. | 3.7 | 3.7 | 3.4 |
| 110° C. | 3.6 | 3.6 | |
| 120° C. | 3.6 | | |
| Hot tack properties (mm) | | | |
| 80° C. | | 300 | 255 |
| 90° C. | 300 | 220 | 100 |
| 100° C. | 210 | 120 | 40 |
| 110° C. | 125 | 60 | 15 |
| 120° C. | 40 | 25 | 15 |
| 130° C. | 20 | 15 | |
| 140° C. | 15 | 15 | |

TABLE 5-continued

|  | Comparative Example | | | |
|---|---|---|---|---|
|  | 1b | 2b | 3b | 4b |
| Polypropylene-1 (wt part) | 75 | 75 | 75 | 50 |
| PBR-C1 (wt part) | 25 | | | |
| PBR-C2 (wt part) | | 25 | | |
| PBR-C3 (wt part) | | | 25 | 50 |
| Cloudiness (Haze) (%) | 13.5 | 15.4 | 23.7 | 25.9 |
| Cloudiness change with time (%) | 17.3 | 17.2 | 26.6 | 27.9 |
| Slip properties/Static friction | 0.7 | 0.8 | 0.9 | 0.9 |
| Slip properties/Dynamic friction | 0.6 | 0.6 | 0.7 | 0.7 |
| Blocking resistance (N/m) | 0.15 | 0.13 | 0.14 | 0.26 |
| Heat seal strength (N/15 mm) | | | | |
| 65° C. | | | 0 | 0.3 |
| 70° C. | | | 0.2 | 2.9 |
| 80° C. | 0 | 0 | 2.3 | 3.5 |
| 90° C. | 0.2 | 2.3 | 3.3 | 3.4 |
| 100° C. | 2.4 | 3.4 | 3.3 | 3.4 |
| 110° C. | 3.3 | 3.6 | 3.4 | |
| 120° C. | 3.5 | 3.6 | | |
| 130° C. | 3.8 | | | |
| Hot tack properties (mm) | | | | |
| 80° C. | | | | 300 |
| 90° C. | | 300 | 300 | 270 |
| 100° C. | 300 | 260 | 185 | 115 |
| 110° C. | 200 | 155 | 120 | 60 |
| 120° C. | 150 | 45 | 75 | 35 |
| 130° C. | 70 | 20 | 20 | 20 |
| 140° C. | 20 | 15 | 20 | |

The examples and comparative examples concerning to the transition metal compound of the formula (2a) and the catalysts and polymerizations using the transition metal compound are described below.

Measuring Methods of Physical Properties

[Ethylene Content in Polymer]

Using a Fourier transform infrared spectrophotometer FT/IR-610 manufactured by JASCO Inc., the area at about 1155 $cm^{-1}$ in a rocking vibration based on methyl group of propylene and the absorbance at about 4325 $cm^{-1}$ in a overtone absorption caused by C—H stretching vibration were determined and from the ratio thereof, the ethylene content in the polymer was calculated by an analysis curve (prepared using a standard specimen standardized by $^{13}C$-NMR).

[Intrinsic Viscosity [η]]

Using an automatic dynamic viscosity-measuring apparatus VMR-053PC manufactured by Rigo Co., Ltd. and an improved Ubbellohde capillary viscometer, a specific viscosity 1 sp in decalin at 135° C. was determined and the intrinsic viscosity was calculated from the following formula.

[η]=$sp/\{C(1+K \cdot \eta sp)\}$ (C: solution concentration [g/dl], K: constant)

[Weight average molecular weight (Mw), Number average molecular weight (Mn)]

Using Alliance GPC2000 manufactured by Waters Co, the measurement was carried out by moving 500 μl of a specimen solution having a concentration of 0.1 wt % at a flow rate of 1.0 ml/min. As standard polystyrene, one manufactured by Tosoh Co. was used and the molecular weight was determined as a molecular weight converted to each polymer.

Separation column: TSK gel GMH6-HT and TSK gel GMH6-HTL each having two columns of an inner diameter of 7.5 mm and a length of 300 mm Column temperature: 140° C.

Mobile phase: o-dichlorobenzene

Detector: Differential refractometer

[Melting point (Tm)]

Using Pyris 1 manufactured by Perkin Elmer Co., about 5 mg of a specimen was heated to 200° C. in a nitrogen atmosphere (20 ml/min) and maintained for 10 min. Thereafter, the specimen was cooled to 30° C. at a rate of 10° C./min and maintained at 30° C. for 5 min. Successively, when the specimen was heated to 200° C. at a rate of 10° C./min, the melting point was determined from the peak point of the crystal-melting peak.

The structures of the compounds obtained in the following synthesis examples were determined by 270 MHz $^{1}H$-NMR (JEOL GSH-270), FD-Mass spectrometry (JEOL SX-102A) and the like.

Example 1c

Synthesis of diphenylmethylene(3-tert-butyl-5-methyl-cyclopentadienyl) (fluorenyl)zirconium dichloride (1) Synthesis of 3-tert-butyl-1-methyl-6,6-diphenyl fulvene In a 200 ml three-necked flask equipped with a magnetic stirrer chip and three-way cock thoroughly purged with nitrogen, 2.73 g of 3-tert-butyl-1-methyl-cyclopentadiene (20.1 mmol) was dissolved in 30 ml of dehydrated tetrahydrofuran in a nitrogen atmosphere. To the solution, 13.5 ml of n-butyl lithium/hexane solution (1.58M: 21.3 mmol) was gradually added dropwise in an ice bath and stirred at room temperature for 3 days. To the reaction solution, 10.5 ml of hexamethyl phosphoramide (60.4 mmol) was added and stirred at room temperature for 1 hr. To the solution, a solution prepared by dissolving 3.87 g of benzophenone (21.2 mmol) in 40 ml of dehydrated tetrahydrofuran was gradually added dropwise in an ice bath and stirred at room temperature over night. To the resulting reaction mixture, 50 ml of a hydrochloric acid aqueous solution (1N) was gradually added dropwise in an ice bath and stirred at room temperature for some time. Diethyl ether was added to the mixed solution to separate an organic phase. The organic phase was washed with a saturated sodium bicarbonate aqueous solution, water and saturated brine. The organic phase was dried with anhydrous magnesium sulfate, thereafter the drying agent was filtered off and the solvent was distilled off from the filtrate under reduced pressure to give a dark-red liquid. The liquid was purified with a column chromatography using 300 g of silica gel (developing solvent: n-hexane) and the developing solvent was distilled off under reduced pressure, and thereby the aimed compound was obtained in an amount of 3.28 g (10.9 mmol) as a reddish-orange solid (yield: 54%).

(2) Synthesis of (3-tert-butyl-5-methyl-cyclopentadienyl)(fluorenyl)diphenylmethane In a 200 ml three-necked flask equipped with a magnetic stirrer chip and three-way cock thoroughly purged with nitrogen, 1.75 g of fluorene (10.5 mmol) was dissolved in 40 ml of dehydrated diethylether in a nitrogen atmosphere. To the solution, 7.0 ml of an n-butyl lithium/hexane solution (1.58M: 1.1 mmol) was gradually added dropwise in an ice bath and stirred at room temperature over night. The solvent was distilled off under reduced pressure and thereby a reddish orange solid was obtained. In a glove box, to the reddish-orange solid, 3.17 g of 3-tert-butyl-1-methyl-6,6-diphenyl-fulvene (10.6 mmol) was added and dissolved in 50 ml of dehydrated diethyl ether. The solution was stirred for 120 hr while intermittent refluxing in a 50° C. oil bath and stirred at room temperature for 496 hr. To the resulting reaction mixture, 50 ml of a distilled water was gradually added dropwise in an ice bath and diethyl ether was added to the mixed solution to separate an organic phase. The organic phase was washed with distilled waster and saturated brine. The organic phase was dried with anhydrous magnesium sulfate, thereafter the drying agent was filtered off and the solvent was distilled off from the filtrate under reduced pressure to give red oil. The red oil was re-crystallized from ethanol and dried under reduced pressure, and thereby the aimed compound was obtained in an amount of 0.648 g (1.39 mmol) as a pale yellow solid (yield: 13%).

(3) Synthesis of diphenylmethylene(3-tert-butyl-5-methyl-cyclopentadienyl)(fluorenyl)zirconium dichloride In a 200 ml three-necked flask equipped with a magnetic stirrer chip and three-way cock thoroughly purged with nitrogen, 0.642 g of (3-tert-butyl-5-methyl-cyclopentadienyl)(fluorenyl) diphenyl methane (1.38 mmol) was dissolved in 40 ml of dehydrated diethylether in a nitrogen atmosphere. To the solution, 1.85 ml of a n-butyl lithium/hexane solution (1.58M: 2.92 mmol) was gradually added dropwise at room temperature. The solution was stirred with refluxing for 6 hr and thereafter stirred at room temperature over night. The solvent was distilled off under reduced pressure to give a reddish-orange solid. In a glove box, 0.325 g of zirconium tetrachloride (1.39 mmol) was added to the solid and cooled in a dry ice/methanol bath. To the reaction mixture, 50 ml of dehydrated diethyl ether sufficiently cooled in a dry ice/methanol bath was transported through a cannular tube and stirred for 4 days while gradually returning the temperature to room temperature. The reaction mixture was introduced into the glove box and the solvent was distilled off under reduced pressure. The residual product was re-slurried with 50 ml of dehydrated hexane and filtered off using a glass filter filled with diatomaceous earth. The filtrate was concentrated to prepare a solid and the solid was washed with dehydrated diethyl ether and dried under reduced pressure, and thereby the aimed compound was obtained in an amount of 35 mg (0.056 mmol) as a reddish-pink solid.

Furthermore, the reddish-orange solid remained on the filter was washed with a small amount of dichloromethane and the solvent was distilled off under reduced pressure from the filtrate. The resulting reddish-brown solid was washed with a small amount of diethyl ether and dried under reduced pressure, and thereby the aimed compound was obtained in an amount of 11 mg (0.018 mmol) as a reddish-pink solid (yield: 5%). The identification was carried out by $^1$H-NMR spectrum and FD-mass spectrometry spectrum. The measurement results are shown below.

$^1$H-NMR spectrum (CDCl$_3$, TMS standard): /ppm 1.10 (s, 9H), 1.90 (s, 3H), 5.68 (d, 1H), 6.19 (d, 1H), 6.18-6.31 (m, 1H), 6.87-6.93 (m, 1H), 6.98-7.09 (m, 2H), 7.20-7.55 (m, 8H), 7.77-7.81 (m, 1H), 7.90-7.95 (m, 3H), 8.11-8.15 (m, 2H)

FD-mass spectrometry spectrum: M/z=626 (M$^+$)

Example 2c

Synthesis of diphenylmethylene(3-tert-butyl-5-methyl-cyclopentadienyl) (3,6-di-tert-butyl-fluorenyl) zirconium dichloride (1) Synthesis of (3-tert-butyl-5-methyl-cyclopentadienyl)(3,6-di-tert-butyl-fluorenyl)diphenylmethane In a 200 ml three-necked flask equipped with a magnetic stirrer chip and three-way cock thoroughly purged with nitrogen, 3.01 g of 3,6-di-tert-butyl-fluorene (10.8 mmol) was dissolved in 80 ml of dehydrated diethyl ether in a nitrogen atmosphere. To the solution, 7.6 ml of a n-butyl lithium/hexane solution (1.56M: 11.9 mmol) was gradually added dropwise in an ice bath and stirred at room temperature over night. To the reaction solution, 50 ml of a solution prepared by dissolving 4.86 g of 3-tert-butyl-1-methyl-6,6-diphenyl fulvene (16.2 mmol) in 50 ml of dehydrated diethyl ether was added and stirred with refluxing for 13 days. To the reaction mixture, 30 ml of distilled water was gradually added dropwise in an ice bath, and thereafter diethyl ether was added to separate an organic phase. The organic phase was washed with distilled water and saturated brine. The organic phase was dried with anhydrous magnesium sulfate, thereafter the drying agent was filtered off and the solvent was distilled off from the filtrate under reduced pressure to give red solid. The red solid was re-crystallized using ethanol and dried under reduced pressure, and thereby the aimed compound was obtained in an amount of 4.42 g (7.63 mmol) as a pale yellow solid (yield: 71%).

(2) Synthesis of diphenylmethylene(3-tert-butyl-5-methyl-cyclopentadienyl)(3,6-di-tert-butyl-fluorenyl) zirconium dichloride In a 50 ml Schlenk flask equipped with a magnetic stirrer chip and three-way cock thoroughly purged with nitrogen, 1.42 g of (3-tert-butyl-5-methyl-cyclopentadienyl)(3,6-di-tert-butyl-fluorenyl) diphenyl methane (2.45 mmol) was dissolved in 30 ml of dehydrated diethyl ether in a nitrogen atmosphere. To the solution, 5.0 ml of a n-butyl lithium/hexane solution (1.56M: 7.80 mmol) was gradually added dropwise in an ice bath and thereafter stirred at room temperature for two days. The solvent was distilled off under reduced pressure to give a pale orange solid. The pale orange solid was washed with dehydrated pentane and dried under reduced pressure to prepare a pale orange solid. To the solid, 30 ml of dehydrated diethyl ether was added and sufficiently cooled by a dry ice/methanol bath, and then 0.515 g of zirconium tetrachloride (2.21 mmol) was added. The mixture was stirred for 3 days while gradually returning the temperature to room temperature and thereafter the solvent was distilled off. The reaction mixture was introduced into a glove box and was re-slurried with dehydrated pentane and filtered using a glass filter filled with diatomaceous earth. The filtrate was concentrated to prepare a solid and the solid was washed with a small amount of dehydrated toluene and dried under reduced pressure, and thereby the aimed compound was obtained in an amount of 894 mg (1.21 mmol) as a reddish-pink solid (yield: 49%).

The identification was carried out by $^1$H-NMR spectrum and FD-mass spectrometry spectrum. The measurement results are shown below.

$^1$H-NMR spectrum (CDCl$_3$, TMS standard): /ppm 1.11 (s, 9H), 1.41 (s, 9H), 1.42 (s, 9H), 1.88 (s, 3H), 5.62 (d, 1H), 6.12

(d, 1H), 6.17-6.21 (m, 1H), 6.95-7.02 (m, 2H), 7.10-7.45 (m, 7H), 7.79-7.82 (m, 2H), 7.91-7.97 (m, 3H), 8.04-8.07 (m, 2H)

FD-mass spectrometry spectrum: M/z=738 (M$^+$)

Example 3c

Synthesis of diphenylmethylene(3-tert-butyl-5-methyl-cyclopentadienyl)(2,7-di-tert-butyl-fluorenyl) zirconium dichloride (1) Synthesis of (3-tert-butyl-5-methyl-cyclopentadienyl)(2,7-di-tert-butyl-fluorenyl)diphenylmethane In a 200 ml three-necked flask equipped with a magnetic stirrer chip and three-way cock thoroughly purged with nitrogen, 2.53 g of 2,7-di-tert-butyl-fluorene (9.10 mmol) was dissolved in 70 ml of dehydrated diethyl ether in a nitrogen atmosphere. To the solution, 6.4 ml of a n-butyl lithium/hexane solution (1.56M: 9.98 mmol) was gradually added dropwise in an ice bath and stirred at room temperature over night. To the reaction solution, a solution prepared by dissolving 3.01 g of 3-tert-butyl-1-methyl-6,6-diphenyl fulvene (10.0 mmol) in 40 ml of dehydrated diethyl ether was added and stirred with refluxing for 7 days. The reaction mixture was added to 100 ml of a hydrochloric acid aqueous solution (1N) and thereafter diethyl ether was added to separate an organic phase. The organic phase was washed with a saturated sodium bicarbonate aqueous solution and saturated brine. The organic phase was dried with anhydrous magnesium sulfate, thereafter the drying agent was filtered off and the solvent was distilled off from the filtrate under reduced pressure to give a reddish-brown liquid. The liquid was purified by a column chromatography using 180 g of silica gel (developing solvent: n-hexane) and the developing solvent was distilled off under reduced pressure. The remainder was re-crystallized using methanol and dried under reduced pressure, and thereby the aimed compound was obtained in an amount of 1.65 g (2.85 mmol) as a pale yellow solid (yield: 31%).

(2) Synthesis of diphenylmethylene(3-tert-butyl-5-methyl-cyclopentadienyl)(2,7-di-tert-butyl-fluorenyl) zirconium dichloride In a 50 ml Schlenk flask equipped with a magnetic stirrer chip and three-way cock thoroughly purged with nitrogen, 0.502 g of (3-tert-butyl-5-methyl-cyclopentadienyl)(2,7-di-tert-butyl-fluorenyl) diphenyl methane (0.868 mmol) was dissolved in 30 ml of dehydrated diethylether in a nitrogen atmosphere. To the solution, 1.40 ml of a n-butyl lithium/hexane solution (1.56M: 2.18 mmol) was gradually added dropwise in an ice bath and thereafter stirred at room temperature over night. The solvent was distilled off under reduced pressure to give an orange solid. The orange solid was washed with dehydrated pentane and dried under reduced pressure to prepare an orange solid. To the solid, 30 ml of dehydrated diethyl ether was added and sufficiently cooled by a dry ice/methanol bath, and then 0.206 g of zirconium tetrachloride (0.882 mmol) was added. The mixture was stirred for 2 days while gradually returning the temperature to room temperature and thereafter the solvent was distilled off under reduced pressure. The reaction mixture was introduced into a glove box and was re-slurried with dehydrated hexane and filtered using a glass filter filled with diatomaceous earth. The filtrate was concentrated to prepare a solid and the solid was washed with a small amount of dehydrated toluene and dried under reduced pressure, and thereby the aimed compound was obtained in an amount of 140 mg (0.189 mmol) as a pink solid (yield: 22%).

The identification was carried out by $^1$H-NMR spectrum and FD-mass spectrometry spectrum. The measurement results are shown below.

$^1$H-NMR spectrum (CDCl$_3$, TMS standard): /ppm 0.99 (s, 9H), 1.09 (s, 9H), 1.12 (s, 9H), 1.91 (s, 3H), 5.65 (d, 1H), 6.14 (d, 1H), 6.23 (m, 1H), 7.03 (m, 1H), 7.18-7.46 (m, 6H), 7.54-7.69 (m, 2H), 7.80-7.83 (m, 1H), 7.95-8.02 (m, 5H)

FD-mass spectrometry spectrum: M/z=738 (M$^+$)

Example 4c

Synthesis of di(p-tolyl)methylene(3-tert-butyl-5-methyl-cyclopentadienyl)(fluorenyl)zirconium dichloride (1) Synthesis of 3-tert-butyl-1-methyl-6,6-di-(p-tolyl)fulvene In a 200 ml three-necked flask equipped with a magnetic stirrer chip and three-way cock thoroughly purged with nitrogen, 1.56 g of powdery potassium hydroxide (27.8 mmol) and 100 ml of dehydrated dimethoxy ethane were added in a nitrogen atmosphere. To the suspension, 2.46 g of 3-tert-butyl-1-methyl-cyclopentadiene (18.0 mmol) was gradually added dropwise at room temperature and stirred under reflux for 2 hr. To the reaction solution, a solution prepared by dissolving 3.99 g of 4,4'-dimethylbenzophenone (19.0 mmol) in 40 ml of dehydrated dimethoxy ethane was gradually added and stirred under reflux for 3 days. To the reaction mixture, 50 ml of a hydrochloric acid aqueous solution (1N) was gradually added dropwise in an ice bath, and stirred at room temperature for some time. The organic phase was separated by adding diethyl ether and washed with a saturated sodium bicarbonate aqueous solution, water and saturated brine. The organic phase was dried with anhydrous magnesium sulfate, and thereafter the drying agent was filtered off and the solvent was distilled off from the filtrate under reduced pressure to give a dark red liquid. The liquid was purified by a column chromatography using 170 g of silica gel (developing solvent: n-hexane) and the developing solvent was distilled off under reduced pressure, and thereby the aimed compound was obtained in an amount of 2.55 g (7.76 mmol) as a red solid (yield: 43%).

(2) Synthesis of (3-tert-butyl-5-methyl-cyclopentadienyl)(fluorenyl)di(p-tolyl)methane In a 200 ml three-necked flask equipped with a magnetic stirrer chip and three-way cock thoroughly purged with nitrogen, 0.373 g of fluorene (2.25 mmol) was dissolved in 60 ml of dehydrated diethylether in a nitrogen atmosphere. To the reaction solution, 1.6 ml of a n-butyl lithium/hexane solution (1.56M: 2.50 mmol) was gradually added dropwise in an ice bath and thereafter stirred at room temperature over night. To the reaction solution, a solution prepared by dissolving 1.10 g of 3-tert-butyl-1-methyl-6,6-di(p-tolyl)fulvene (3.36 mmol) in 60 ml of dehydrated diethyl ether was added and stirred under reflux for 10 days. To the reaction mixture, 30 ml of distilled water was gradually added dropwise in an ice bath, and thereafter the organic layer was separated by adding diethyl ether and washed with distilled water and saturated brine. The organic phase was dried with anhydrous magnesium sulfate and then the drying agent was filtered off. The solvent was distilled off from the filtrate under reduced pressure to give a red brown liquid. The red brown liquid was purified by a column chromatography using 80 g of silica gel (developing solvent: n-hexane) and the developing solvent was distilled off under reduced pressure. The residue product was re-crystallized using hexane and dried under reduced pressure, and thereby the aimed compound was obtained in an amount of 0.140 g (0.282 mmol) as a pale yellow solid (yield: 13%).

(3) Synthesis of di(p-tolyl)methylene(3-tert-butyl-5-methyl-cyclopentadienyl)(fluorenyl)zirconium dichloride In a 100 ml Schlenk flask equipped with a magnetic stirrer chip and three-way cock thoroughly purged with nitrogen, 0.496 g of (3-tert-butyl-5-methyl-cyclopentadienyl)(fluorenyl) di(p-tolyl) methane (1.00 mmol) was dissolved in 20 ml of dehydrated diethylether in a nitrogen atmosphere. To the solution, 1.35 ml of a n-butyl lithium/hexane solution (1.58M: 2.13 mmol) was gradually added dropwise in an ice bath, and thereafter stirred at room temperature over night. The reaction solution was sufficiently cooled in a dry ice/methanol bath and then 0.231 g of zirconium tetrachloride (0.990 mmol) was added. The solution was stirred for 4 days while gradually returning the temperature to room temperature, and thereafter the solvent was distilled off under reduced pressure. The reaction mixture was introduced into a glove box and re-slurried with dehydrated pentane and then filtered with a glass filter filled with diatomaceous earth. The filtrate was concentrated to prepare a solid, and the solid was washed with a small amount of dehydrated diethyl ether and dried under reduced pressure and thereby the aimed compound was obtained as a reddish-pink solid.

Furthermore, the pink solid remained on the filter was washed with a small amount of dichloromethane and the solvent was distilled off under reduced pressure from the filtrate. The resulting reddish-pink solid was washed with a small amount of diethyl ether and dried under reduced pressure, and thereby the aimed compound was obtained as a reddish-pink solid. The aimed compound was obtained in a total amount of 222 mg (0.340 mmol) (yield: 34%). The identification was carried out by $^1$H-NMR spectrum and FD-mass spectrometry spectrum. The measurement results are shown below.

$^1$H-NMR spectrum (CDCl$_3$, TMS standard): /ppm 1.09 (s, 9H), 1.90 (s, 3H), 2.32 (s, 6H), 5.67 (d, 1H), 6.17 (d, 1H), 6.34-6.37 (m, 1H), 6.88-6.93 (m, 1H), 6.98-7.24 (m, 6H), 7.46-7.53 (m, 2H), 7.62-7.66 (m, 1H), 7.76-7.80 (m, 3H), 8.10-8.14 (m, 2H)

FD-mass spectrometry spectrum: M/z=654 (M$^+$)

Comparative Example 1C

Synthesis of diphenylmethylene(3-tert-butyl-cyclopentadienyl)(fluorenyl)zirconium dichloride (1) Synthesis of 2-tert-butyl-6,6-diphenyl fulvene In a 300 ml three-necked flask equipped with a magnetic stirrer and three-way cock was thoroughly purged with nitrogen, 4.75 g of 3-tert-butyl-cyclopentadiene (38.9 mmol) was dissolved in 100 ml of dehydrated tetrahydrofuran in a nitrogen atmosphere. To the solution, 26 ml of n-butyl lithium/hexane solution (1.58M: 41.1 mmol) was gradually added dropwise in an ice bath and stirred at room temperature over night. To the reaction solution, 21 ml of hexamethyl phosphoramide (121 mmol) dried with molecular sieves 4A was added in the ice bath and further stirred at room temperature for 1 hr. To the solution, a solution prepared by dissolving 10.2 g of benzophenone (56.0 mmol) to 30 ml of dehydrated tetrahydrofuran was gradually added dropwise in an ice bath and stirred at room temperature 1 day. To the resulting reaction mixture, 100 ml of a hydrochloric acid aqueous solution (5%) was added. Thereafter, hexane was added to the mixed solution to separate an organic phase. The organic phase was washed with water and saturated brine. The organic phase was dried with anhydrous magnesium sulfate, thereafter the drying agent was filtered off and the solvent was distilled off from the filtrate under reduced pressure to give dark-brown oil. The oil was purified with a column chromatography using 400 g of silica gel (developing solvent: n-hexane) and the developing solvent was distilled off under reduced pressure, and thereby the aimed compound was obtained in an amount of 4.42 g (15.4 mmol) as an orange solid (yield: 40%).

(2) Synthesis of (3-tert-butyl-cyclopentadienyl)(fluorenyl)diphenylmethane

In a 200 ml three-necked flask equipped with a magnetic stirrer chip and three-way cock thoroughly purged with nitrogen, 0.76 g of fluorene (4.57 mmol) was dissolved in 40 ml of dehydrated diethyl ether in a nitrogen atmosphere. To the solution, 3.1 ml of a n-butyl lithium/hexane solution (1.57M: 4.87 mmol) was gradually added dropwise in an ice bath and stirred at room temperature for over night. The solvent was distilled off under reduced pressure and thereby a reddish-orange solid was obtained. To the solid, a solution prepared by dissolving 2.40 g of 2-tert-butyl-6,6-diphenyl fulvene (8.38 mmol) in 150 ml of dehydrated diethyl ether was added and stirred under reflux for 7 days. The reaction mixture was added to 150 ml of a hydrochloric acid aqueous solution (2%) and then diethyl ether was added therein to separate an organic phase. The organic phase was washed with water and saturated brine. The organic phase was dried with anhydrous magnesium sulfate and the drying agent was filtered off. The solvent was distilled off under reduced pressure from the filtrate and thereby orange brown oil was obtained. The oil was re-crystallized using hexane and thereby the aimed compound was obtained in an amount of 1.03 g (2.28 mmol) as a pale yellow solid. The solid further was purified with a chromatography using 100 g of silica gel (developing solvent: n-hexane) and the developing solvent was distilled off under reduced pressure and thereby the aimed compound was obtained in an amount of 0.370 g (0.817 mmol) as a yellow solid (yield: 67%).

(3) Synthesis of diphenylmethylene(3-tert-butyl-cyclopentadienyl)(fluorenyl)zirconium dichloride In a 50 ml Schlenk flask equipped with a magnetic stirrer chip and three-way cock thoroughly purged with nitrogen, 0.571 g of (3-tert-butyl-cyclopentadienyl)(fluorenyl)diphenyl methane (1.26 mmol) was dissolved in 20 ml of dehydrated diethyl ether in a nitrogen atmosphere. To the solution, 1.85 ml of a n-butyl lithium/hexane solution (1.57 M: 2.90 mmol) was gradually added dropwise in an ice bath and stirred at room temperature over night. The reaction solution was sufficiently cooled in a dry ice/methanol bath, and then 0.528 g of a complex of zirconium tetrachloride and tetrahydrofuran (1:2)(1.40 mmol) was added to the solution. The mixed solution was stirred for 2 days while gradually returning the temperature to room temperature and thereafter the solvent was distilled off under reduced pressure. The reaction mixture was introduced into a glove box, and thereafter re-slurried with dehydrated diethyl ether and filtered with a glass filter filled with diatomaceous earth. The orange solid present on the filter was washed with a small amount of dehydrated dichloromethane and the solvent was distilled off from the filtrate under reduced pressure, and thereby the aimed compound was obtained in an amount of 565 mg (0.922 mmol) as a red solid (yield: 73%).

The identification was carried out by $^1$H-NMR spectrum and FD-mass spectrometry spectrum. The measurement results are shown below.

$^1$H-NMR spectrum (CDCl$_3$, TMS standard): /ppm 1.19 (s, 9H), 5.59 (t, 1H), 5.76 (t, 1H), 6.22 (t, 1H), 6.35-6.42 (m, 2H), 6.94-7.03 (m, 2H), 7.24-7.36 (m, 4H), 7.39-7.49 (m, 2H), 7.52-7.60 (m, 2H), 7.82-7.99 (m, 4H), 8.15-8.20 (m, 2H)

FD-mass spectrometry spectrum: M/z=612 (M$^+$)

Example 5c

Ethylene Polymerization

Into a 500 ml internal volume glass autoclave thoroughly purged with nitrogen, 250 ml of toluene was fed and ethylene was passed through at a rate of 100 L/hr and then the autoclave was kept at 50° C. for 20 min or more. Meanwhile, in a 30 ml side-arm flask thoroughly purged with nitrogen, a magnetic stirrer chip was put and then 0.5 µmol of a toluene solution of diphenyl methylene(3-tert-butyl-5-methyl-cyclopentadienyl)(fluorenyl)zirconium dichloride synthesized in Example 1c as a transition metal compound, and 0.5 mmol of a toluene solution of methyl aluminoxane (Al=1.53 M) were added and stirred for 30 min. Into a glass autoclave in which ethylene was passed through, 1.0 mmol of a toluene solution of triisobutyl aluminum (Al=1.0 M) was added and then the above solution was added, and polymerization was started. The polymerization was carried out at 50° C. at atmospheric pressure for 3 min while ethylene was continuously passed through at a rate of 100 L/hr, and a small amount of isopropanol was added to stop the polymerization. The resulting polymer solution was added into excess amounts of methanol mixed with hydrochloric acid and the polymer precipitated was separated with filtration. Thereafter, the polymer was dried under reduced pressure at 80° C. for 10 hr. The polymer was obtained in an amount of 0.58 g and had a polymerization activity of 23.3 Kg-PE/mmol-Zr·hr. In the analysis results, the polymer had a [η] value of 10.5 dl/g, a Mw of 695,000 and a Mw/Mn ratio of 3.6.

Example 6c

Ethylene Polymerization

Polymerization was carried out in the same conditions as Example 5c except for adding diphenylmethylene(3-tert-butyl-5-methyl-cyclopentadienyl)(3,6-di-tert-butyl-fluorenyl) zirconium dichloride synthesized in Example 2c as a transition metal compound. The polymer was obtained in an amount of 1.02 g and had a polymerization activity of 41.0 Kg-PE/mmol-Zr·hr. In the analysis results, the polymer had a [η] value of 15.1 dl/g, a Mw of 1,066,000 and a Mw/Mn ratio of 4.4.

Example 7c

Ethylene Polymerization

Polymerization was carried out in the same conditions as Example 5c except for adding diphenylmethylene(3-tert-butyl-5-methyl-cyclopentadienyl)(2,7-di-tert-butyl-fluorenyl) zirconium dichloride synthesized in Example 3c as a transition metal compound. The polymer was obtained in an amount of 0.50 g and had a polymerization activity of 20.0 Kg-PE/mmol-Zr·hr. In the analysis results, the polymer had a [η] value of 13.8 dl/g, a Mw of 1,068,000 and a Mw/Mn ratio of 4.2.

Example 8c

Ethylene Polymerization

Polymerization was carried out in the same conditions as Example 5c except that di(p-tolyl)methylene(3-tert-butyl-5-methyl-cyclopentadienyl)(fluorenyl)zirconium dichloride synthesized in Example 4c was used as a transition metal compound and the polymerization time was 2 min. The polymer was obtained in an amount of 0.62 g and had a polymerization activity of 37.3 Kg-PE/mmol-Zr·hr. In the analysis results, the polymer had a [η] value of 10.4 dl/g, a Mw of 672,000 and a Mw/Mn ratio of 3.3.

Comparative Example 2c

Ethylene Polymerization

Polymerization was carried out in the same conditions as Example 5c except for adding dimethylmethylene(3-tert-butyl-5-methyl-cyclopentadienyl)(fluorenyl)zirconium dichloride synthesized by the method as described in the pamphlet of WO01/27124, as a transition metal compound. The polymer was obtained in an amount of 1.97 g and had a polymerization activity of 79.7 Kg-PE/mmol-Zr·hr. In the analysis results, the polymer had a [η] value of 8.86 dl/g, a Mw of 635,000 and a Mw/Mn ratio of 3.4.

Comparative Example 3c

Ethylene Polymerization

Polymerization was carried out in the same conditions as Example 5c except for adding dimethylmethylene(3-tert-butyl-5-methyl-cyclopentadienyl)(3,6-di-tert-butyl-fluorenyl) zirconium dichloride synthesized by the method as described in WO01/27124, as a transition metal compound. The polymer was obtained in an amount of 1.69 g and had a polymerization activity of 67.0 Kg-PE/mmol-Zr·hr. In the analysis results, the polymer had a [η] value of 6.44 dl/g, a Mw of 759,000 and a Mw/Mn ratio of 4.0.

Comparative Example 4c

Ethylene Polymerization

Polymerization was carried out in the same conditions as Example 5c except for adding diphenylmethylene(3-tert-butyl-1-cyclopentadienyl)(fluorenyl)zirconium dichloride synthesized in Comparative Example 1c, as a transition metal compound. The polymer was obtained in an amount of 1.77 g and had a polymerization activity of 70.4 Kg-PE/mmol-Zr·hr. In the analysis results, the polymer had a [η] value of 10.6 dl/g, a Mw of 994,000 and a Mw/Mn ratio of 4.5.

Example 9c

Propylene Polymerization

Into a 500 ml internal volume glass autoclave thoroughly purged with nitrogen, 250 ml of toluene was fed and propylene was passed through at a rate of 150 L/hr and then the autoclave was kept at 50° C. for 20 min or more. Meanwhile, in a 30 ml side-arm flask autoclave thoroughly purged with nitrogen, a magnetic stirrer chip was put and then 5.0 μmol of a toluene solution of diphenyl methylene(3-tert-butyl-5-methyl-cyclopentadienyl)(fluorenyl)zirconium dichloride synthesized in Example 1c as a transition metal compound, and 5.0 mmol of a toluene solution of methyl aluminoxane (Al=1.53M) were added and stirred for 30 min. Into a glass autoclave in which propylene was passed through, 1.0 mmol of a toluene solution of triisobutyl aluminum (Al=1.0 M) was added and then the above solution was added, and polymerization was started. The polymerization was carried out at 50° C. at atmospheric pressure for 30 min while propylene was continuously passed through at a rate of 150 L/hr, and a small amount of isopropanol was added to stop the polymerization. The resulting polymer solution was added into excess amounts of methanol mixed with hydrochloric acid and the polymer precipitated was separated with filtration. Thereafter, the polymer was dried under reduced pressure at 80° C. for 10 hr. The polymer obtained was 9.46 g of isotactic polypropylene and had a polymerization activity of 3.78 Kg-PP/mmol-Zr·hr. In the analysis results, the polymer had a Tm of 128.2° C., a [η] value of 1.05 dl/g, a Mw of 108,000 and a Mw/Mn ratio of 1.8.

Example 10c

Propylene Polymerization

Polymerization was carried out in the same conditions as Example 9c except for adding diphenylmethylene(3-tert-butyl-5-methyl-cyclopentadienyl)(3,6-di-tert-butyl-fluorenyl)zirconium dichloride synthesized in Example 2c as a transition metal compound. The polymer obtained was 1.30 g of isotactic polypropylene and had a polymerization activity of 0.52 Kg-PP/mmol-Zr·hr. In the analysis results, the polymer had a Tm of 136.7° C., a [η] value of 0.89 dl/g, a Mw of 88,000 and a Mw/Mn ratio of 1.7.

Example 11c

Propylene Polymerization

Polymerization was carried out in the same conditions as Example 9c except for adding 4.1 μmol of a toluene solution of diphenylmethylene(3-tert-butyl-5-methyl-cyclopentadienyl)(2,7-di-tert-butyl-fluorenyl)zirconium dichloride synthesized in Example 3c as a transition metal compound. The polymer obtained was 3.58 g of isotactic polypropylene and had a polymerization activity of 1.73 Kg-PP/mmol-Zr·hr. In the analysis results, the polymer had a Tm of 133.8° C., a [η] value of 1.87 dl/g, a Mw of 218,000 and a Mw/Mn ratio of 1.9.

Example 12c

Propylene Polymerization

Polymerization was carried out in the same conditions as Example 9c except for adding di(p-tolyl)methylene(3-tert-butyl-5-methyl-cyclopentadienyl)(fluorenyl) zirconium dichloride synthesized in Example 4c as a transition metal compound. The polymer obtained was 10.1 g of isotactic polypropylene and had a polymerization activity of 3.99 Kg-PP/mmol-Zr·hr. In the analysis results, the polymer had a Tm of 128.0° C., a [η] value of 1.02 dl/g, a Mw of 94,000 and a Mw/Mn ratio of 1.8.

Comparative Example 5c

Propylene Polymerization

Polymerization was carried out in the same conditions as Example 9c except for adding dimethylmethylene(3-tert-butyl-5-methyl-cyclopentadienyl)(fluorenyl)zirconium dichloride synthesized by the method as described in WO01/27124, as a transition metal compound. The polymer obtained was 0.72 g of isotactic polypropylene and had a polymerization activity of 0.28 Kg-PP/mmol-Zr·hr. In the analysis results, the polymer had a Tm of 133.6° C., a [η] value of 1.14 dl/g, a Mw of 77,000 and a Mw/Mn ratio of 2.0.

Comparative Example 6c

Propylene Polymerization

Polymerization was carried out in the same conditions as Example 9c except for adding dimethylmethylene(3-tert-butyl-5-methyl-cyclopentadienyl)(3,6-di-tert-butyl-fluorenyl)zirconium dichloride synthesized by the method as described in WO01/27124, as a transition metal compound. The polymer obtained was 0.91 g of isotactic polypropylene and had a polymerization activity of 0.37 Kg-PP/mmol-Zr·hr. In the analysis results, the polymer had a Tm of 142.4° C., a [η] value of 0.95 dl/g, a Mw of 95,000 and a Mw/Mn ratio of 1.7.

Comparative Example 7c

Propylene Polymerization

Polymerization was carried out in the same conditions as Example 9c except for adding diphenylmethylene(3-tert-butyl-cyclopentadienyl)(fluorenyl)zirconium dichloride synthesized in Comparative Example 1, as a transition metal compound. The polymer obtained was 6.35 g of isotactic polypropylene and had a polymerization activity of 2.55 Kg-PP/mmol-Zr·hr. In the analysis results, the polymer had a Tm of 126.5° C., a [η] value of 0.33 dl/g, a Mw of 26,000 and a Mw/Mn ratio of 1.6.

Example 13c

Ethylene/Propylene Copolymerization

Into a 500 ml internal volume glass autoclave thoroughly purged with nitrogen, 250 ml of toluene was fed and ethylene and propylene were passed through at a rate of 25 L/hr and 125 L/hr, respectively and then the autoclave was kept at 50° C. for 20 min or more. Meanwhile, in a 30 ml side-arm flask autoclave thoroughly purged with nitrogen, a magnetic stirrer chip was put and then 2.5 μmol of a toluene solution of diphenyl methylene(3-tert-butyl-5-methyl-cyclopentadienyl)(fluorenyl)zirconium dichloride synthesized in Example 1c as a transition metal compound, and 2.5 mmol of a toluene solution of methyl aluminoxane (Al=1.53M) were added and stirred for 30 min. Into a glass autoclave in which ethylene and propylene were passed through, 1.0 mmol of a toluene solution of triisobutyl aluminum (Al=1.0 M) was added and then the above solution was added, and polymerization was started. The polymerization was carried out at 50° C. at atmospheric pressure for 20 min while ethylene and propylene were continuously passed through at a rate of 25 L/hr and 125 L/hr respectively, and a small amount of isopropanol was added to stop the polymerization. The resulting polymer solution was added into excess amounts of methanol mixed with hydrochloric acid and the polymer precipitated was separated with filtration. Thereafter, the polymer was dried under reduced pressure at 80° C. for 10 hr. The polymer was obtained in an amount of 16.4 g and had a polymerization activity of 19.8 Kg-Polymer/mmol-Zr·hr. In the analysis results, the polymer had an ethylene content of 18 mol % and a [η] value of 1.20 dl/g.

Example 14c

Ethylene/Propylene Copolymerization

Polymerization was carried out in the same conditions as Example 13c except for passing through ethylene at a rate of 50 L/hr and propylene at a rate of 100 L/hr. The polymer was obtained in an amount of 19.9 g and had a polymerization activity of 23.6 Kg-Polymer/mmol-Zr·hr. In the analysis results, the polymer had an ethylene content of 30 mol % and a [η] value of 1.23 dl/g.

Example 15c

Ethylene/Propylene Copolymerization

Polymerization was carried out in the same conditions as Example 13c except that ethylene and propylene were passed through at a rate of 75 L/hr and 75 L/hr, respectively and the polymerization time was 10 min. The polymer was obtained in an amount of 11.9 g and had a polymerization activity of 28.6 Kg-Polymer/mmol-Zr·hr. In the analysis results, the polymer had an ethylene content of 46 mol % and a [η] value of 1.47 dl/g.

Example 16c

Ethylene/Propylene Copolymerization

Into a 500 ml internal volume glass autoclave thoroughly purged with nitrogen, 250 ml of toluene was fed and ethylene and propylene were passed through at a rate of 25 L/hr and 125 L/hr, respectively and then the autoclave was kept at 50° C. for 20 min or more. Meanwhile, in a 30 ml side-arm flask autoclave thoroughly purged with nitrogen, a magnetic stirrer chip was put and then 2.5 μmol of a toluene solution of diphenyl methylene(3-tert-butyl-5-methyl-cyclopentadienyl)(3,6-di-tert-butyl-fluorenyl)zirconium dichloride synthesized in Example 2c, as a transition metal compound, and 2.5 mmol of a toluene solution of methyl aluminoxane (Al=1.53M) were added and stirred for 30 min. Into a glass autoclave in which ethylene and propylene were passed through, 1.0 mmol of a toluene solution of triisobutyl aluminum (Al=1.0 M) was added and then the above solution was added, and polymerization was started. The polymerization was carried out at 50° C. at atmospheric pressure for 20 min while ethylene and propylene were continuously passed through at a rate of 25 L/hr and 125 L/hr respectively, and a small amount of isopropanol was added to stop the polymerization. The resulting polymer solution was added into excess amounts of methanol mixed with hydrochloric acid and the polymer precipitated was separated with filtration. Thereafter, the polymer was dried under reduced pressure at 80° C. for 10 hr. The polymer was obtained in an amount of 4.49 g and had a polymerization activity of 5.40 Kg-Polymer/mmol-Zr·hr. In the analysis results, the polymer had an ethylene content of 19 mol % and a [η] value of 0.88 dl/g.

Example 17c

Ethylene/Propylene Copolymerization

Polymerization was carried out in the same conditions as Example 16c except for passing through ethylene at a rate of 50 L/hr and propylene at a rate of 100 L/hr. The polymer was obtained in an amount of 6.98 g and had a polymerization activity of 8.39 Kg-Polymer/mmol-Zr·hr. In the analysis results, the polymer had an ethylene content of 37 mol % and a [η] value of 0.94 dl/g.

Example 18c

Ethylene/Propylene Copolymerization

Polymerization was carried out in the same conditions as Example 16c except that ethylene and propylene were passed through at a rate of 75 L/hr and 75 L/hr, respectively. The polymer was obtained in an amount of 8.89 g and had a polymerization activity of 10.7 Kg-Polymer/mmol-Zr·hr. In the analysis results, the polymer had an ethylene content of 46 mol % and a [η] value of 1.30 dl/g.

Example 19c

Ethylene/Propylene Copolymerization

Into a 500 ml internal volume glass autoclave thoroughly purged with nitrogen, 250 ml of toluene was fed and ethylene and propylene were passed through at a rate of 25 L/hr and 125 L/hr, respectively and then the autoclave was kept at 50° C. for more than 20 min. Meanwhile, in a 30 ml side-arm flask thoroughly purged with nitrogen, a magnetic stirrer chip was put and then 2.5 μmol of a toluene solution of diphenyl methylene (3-tert-butyl-5-methyl-cyclopentadienyl)(2,7-di-tert-butyl-fluorenyl)zirconium dichloride synthesized in Example 3c as a transition metal compound, and 2.5 mmol of a toluene solution of methyl aluminoxane (Al=1.53M) were added and stirred for 30 min. Into a glass autoclave in which ethylene and propylene were passed through, 1.0 mmol of a toluene solution of triisobutyl aluminum (Al=1.0 M) was added and then the above solution was added, and polymerization was started. The polymerization was carried out at 50° C. at atmospheric pressure for 10 min while ethylene and propylene were continuously passed through at a rate of 25 L/hr and 125 L/hr respectively, and a small amount of isopropanol was added to stop the polymerization. The resulting polymer solution was added into excess amounts of methanol mixed with hydrochloric acid and the polymer precipitated was separated with filtration. Thereafter, the polymer was dried under reduced pressure at 80° C. for 10 hr. The polymer was obtained in an amount of 7.60 g and had a polymerization activity of 18.3 Kg-Polymer/mmol-Zr·hr. In the analysis results, the polymer had an ethylene content of 14 mol % and a [η] value of 1.59 dl/g.

Example 20c

Ethylene/Propylene Copolymerization

Polymerization was carried out in the same conditions as Example 19c except for passing through ethylene at a rate of 50 L/hr and propylene at a rate of 100 L/hr. The polymer was obtained in an amount of 9.53 g and had a polymerization activity of 22.9 Kg-Polymer/mmol-Zr·hr. In the analysis results, the polymer had an ethylene content of 30 mol % and a [η] value of 1.55 dl/g.

Example 21c

Ethylene/Propylene Copolymerization

Polymerization was carried out in the same conditions as Example 19c except that ethylene and propylene were passed through at a rate of 75 L/hr and 75 L/hr, respectively, and the polymerization time was 8 min. The polymer was obtained in an amount of 7.94 g and had a polymerization activity of 23.8 Kg-Polymer/mmol-Zr·hr. In the analysis results, the polymer had an ethylene content of 39 mol % and a [η] value of 1.65 dl/g.

Example 22c

Ethylene/Propylene Copolymerization

Into a 500 ml internal volume glass autoclave thoroughly purged with nitrogen, 250 ml of toluene was fed and ethylene and propylene were passed through at a rate of 25 L/hr and 125 L/hr, respectively and then the autoclave was kept at 50° C. for 20 min or more. Meanwhile, in a 30 ml side-arm flask thoroughly purged with nitrogen, a magnetic stirrer chip was put and then 2.5 μmol of a toluene solution of di(p-tolyl)methylene (3-tert-butyl-5-methyl-cyclopentadienyl)(fluorenyl)zirconium dichloride synthesized in Example 4c as a transition metal compound, and 2.5 mmol of a toluene solution of methyl aluminoxane (Al=1.53M) were added and stirred for 30 min. Into a glass autoclave in which ethylene and propylene were passed through, 1.0 mmol of a toluene solution of triisobutyl aluminum (Al=1.0 M) was added and then the above solution was added, and polymerization was started. The polymerization was carried out at 50° C. at atmospheric pressure for 10 min while ethylene and propylene were continuously passed through at a rate of 25 L/hr and 125 L/hr respectively, and a small amount of isopropanol was added to stop the polymerization. The resulting polymer solution was added into excess amounts of methanol mixed with hydrochloric acid and the polymer precipitated was separated with filtration. Thereafter, the polymer was dried under reduced pressure at 80° C. for 10 hr. The polymer was obtained in an amount of 9.52 g and had a polymerization activity of 22.9 Kg-Polymer/mmol-Zr·hr. In the analysis results, the polymer had an ethylene content of 19 mol % and a [η] value of 0.97 dl/g.

Example 23c

Ethylene/Propylene Copolymerization

Polymerization was carried out in the same conditions as Example 22c except for passing through ethylene at a rate of 50 L/hr and propylene at a rate of 100 L/hr. The polymer was obtained in an amount of 12.0 g and had a polymerization activity of 28.8 Kg-Polymer/mmol-Zr·hr. In the analysis results, the polymer had an ethylene content of 32 mol % and a [η] value of 1.17 dl/g.

Example 24c

Ethylene/Propylene Copolymerization

Polymerization was carried out in the same conditions as Example 22c except that ethylene and propylene were passed through at a rate of 75 L/hr and 75 L/hr, respectively, and the polymerization time was 5 min. The polymer was obtained in an amount of 8.82 g and had a polymerization activity of 42.4 Kg-Polymer/mmol-Zr·hr. In the analysis results, the polymer had an ethylene content of 43 mol % and a [η] value of 1.29 dl/g.

Comparative Example 8c

Ethylene/Propylene Copolymerization

Into a 500 ml internal volume glass autoclave thoroughly purged with nitrogen, 250 ml of toluene was fed and ethylene and propylene were passed through at a rate of 25 L/hr and 125 L/hr, respectively and then the autoclave was kept at 50° C. for 20 min or more. Meanwhile, in a 30 ml side-arm flask thoroughly purged with nitrogen, a magnetic stirrer chip was put and then 2.5 μmol of a toluene solution of dimethyl methylene (3-tert-butyl-5-methyl-cyclopentadienyl)(fluorenyl)zirconium dichloride synthesized by the method disclosed in WO01/27124, as a transition metal compound, and 2.5 mmol of a toluene solution of methyl aluminoxane (Al=1.53M) were added and stirred for 30 min. Into a glass autoclave in which ethylene and propylene were passed through, 1.0 mmol of a toluene solution of triisobutyl aluminum (Al=1.0 M) was added and then the above solution was added, and polymerization was started. The polymerization was carried out at 50° C. at atmospheric pressure for 20 min while ethylene and propylene were continuously passed through at a rate of 25 L/hr and 125 L/hr respectively, and a small amount of isopropanol was added to stop the polymerization. The resulting polymer solution was added into excess amounts of methanol mixed with hydrochloric acid and the polymer precipitated was separated with filtration. Thereafter, the polymer was dried under reduced pressure at 80° C. for 10 hr. The polymer was obtained in an amount of 1.97 g and had a polymerization activity of 2.35 Kg-Polymer/mmol-Zr·hr. In the analysis results, the polymer had an ethylene content of 31 mol % and a [η] value of 0.83 dl/g.

Comparative Example 9c

Ethylene/Propylene Copolymerization

Polymerization was carried out in the same conditions as Comparative Example 8c except for passing through ethylene at a rate of 50 L/hr and propylene at a rate of 100 L/hr. The polymer was obtained in an amount of 2.52 g and had a polymerization activity of 3.03 Kg-Polymer/mmol-Zr·hr. In the analysis results, the polymer had an ethylene content of 44 mol % and a [η] value of 1.00 dl/g.

Comparative Example 10c

Ethylene/Propylene Copolymerization

Polymerization was carried out in the same conditions as Comparative Example 8c except for passing through ethylene at a rate of 75 L/hr and propylene at a rate of 75 L/hr. The polymer was obtained in an amount of 3.29 g and had a polymerization activity of 3.95 Kg-Polymer/mmol-Zr·hr. In the analysis results, the polymer had an ethylene content of 59 mol % and a [η] value of 1.30 dl/g.

Comparative Example 11c

Ethylene/Propylene Copolymerization

Into a 500 ml internal volume glass autoclave thoroughly purged with nitrogen, 250 ml of toluene was fed and ethylene and propylene were passed through at a rate of 25 L/hr and 125 L/hr, respectively and then the autoclave was kept at 50° C. for 20 min or more. Meanwhile, in a 30 ml side-arm flask thoroughly purged with nitrogen, a magnetic stirrer chip was put and then 2.5 μmol of a toluene solution of dimethyl methylene (3-tert-butyl-5-methyl-cyclopentadienyl)(3,6-di-tert-butyl-fluorenyl)zirconium dichloride synthesized by the method disclosed in the pamphlet of WO01/27124, as a transition metal compound, and 2.5 mmol of a toluene solution of methyl aluminoxane (Al=1.53M) were added and stirred for 30 min. Into a glass autoclave in which ethylene and propylene were passed through, 1.0 mmol of a toluene solution of triisobutyl aluminum (Al=1.0 M) was added and then the above solution was added, and polymerization was started. The polymerization was carried out at 50° C. at atmospheric pressure for 20 min while ethylene and propylene were continuously passed through at a rate of 25 L/hr and 125 L/hr respectively, and a small amount of isopropanol was added to stop the polymerization. The resulting polymer solution was added into excess amounts of methanol mixed with hydrochloric acid and the polymer precipitated was separated with filtration. Thereafter, the polymer was dried under reduced pressure at 80° C. for 10 hr. The polymer was obtained in an amount of 0.34 g and had a polymerization activity of 0.40 Kg-Polymer/mmol-Zr·hr. In the analysis results, the polymer had an ethylene content of 29 mol % and a [η] value of 0.58 dl/g.

Comparative Example 12c

Ethylene/Propylene Copolymerization

Polymerization was carried out in the same conditions as Comparative Example 11c except for passing through ethylene at a rate of 50 L/hr and propylene at a rate of 100 L/hr. The polymer was obtained in an amount of 1.22 g and had a polymerization activity of 1.49 Kg-Polymer/mmol-Zr hr. In the analysis results, the polymer had an ethylene content of 45 mol % and a [η] value of 0.78 dl/g.

Comparative Example 13c

Ethylene/Propylene Copolymerization

Polymerization was carried out in the same conditions as Comparative Example 11c except for passing through ethylene at a rate of 75 L/hr and propylene at a rate of 75 L/hr. The polymer was obtained in an amount of 2.19 g and had a polymerization activity of 2.63 Kg-Polymer/mmol-Zr hr. In the analysis results, the polymer had an ethylene content of 63 mol % and a [η] value of 1.18 dl/g.

Comparative Example 14c

Ethylene/Propylene Copolymerization

Into a 500 ml internal volume glass autoclave thoroughly purged with nitrogen, 250 ml of toluene was fed and ethylene and propylene were passed through at a rate of 25 L/hr and 125 L/hr, respectively and then the autoclave was kept at 50° C. for 20 min or more. Meanwhile, in a 30 ml side-arm flask thoroughly purged with nitrogen, a magnetic stirrer chip was put and then 2.5 μmol of a toluene solution of diphenyl methylene (3-tert-butyl-cyclopentadienyl)(fluorenyl)zirconium dichloride synthesized in Comparative Example 1c as a transition metal compound, and 2.5 mmol of a toluene solution of methyl aluminoxane (Al=1.53M) were added and stirred for 30 min. Into a glass autoclave in which ethylene and propylene were passed through, 1.0 mmol of a toluene solution of triisobutyl aluminum (Al=1.0 M) was added and then the above solution was added, and polymerization was started. The polymerization was carried out at 50° C. at atmospheric pressure for 10 min while ethylene and propylene were continuously passed through at a rate of 25 L/hr and 125 L/hr respectively, and a small amount of isopropanol was added to stop the polymerization. The resulting polymer solution was added into excess amounts of methanol mixed with hydrochloric acid and the polymer precipitated was separated with filtration. Thereafter, the polymer was dried under reduced pressure at 80° C. for 10 hr. The polymer was obtained in an amount of 12.4 g and had a polymerization activity of 29.7 Kg-Polymer/mmol-Zr hr. In the analysis results, the polymer had an ethylene content of 21 mol % and a [η] value of 0.46 dl/g.

Comparative Example 15c

Ethylene/Propylene Copolymerization

Polymerization was carried out in the same conditions as Comparative Example 14c except for passing through ethylene at a rate of 50 L/hr and propylene at a rate of 100 L/hr. The polymer was obtained in an amount of 13.5 g and had a polymerization activity of 32.4 Kg-Polymer/mmol-Zr hr. In the analysis results, the polymer had an ethylene content of 35 mol % and a [η] value of 0.78 dl/g.

Comparative Example 16c

Ethylene/Propylene Copolymerization

Polymerization was carried out in the same conditions as Comparative Example 14c except for passing ethylene at a rate of 75 L/hr and propylene at a rate of 75 L/hr. The polymer was obtained in an amount of 15.9 g and had a polymerization activity of 38.2 Kg-Polymer/mmol-Zr·hr. In the analysis results, the polymer had an ethylene content of 48 mol % and a [η] value of 0.72 dl/g.

The polymerization results are inclusively shown in Tables 1c and 2c.

TABLE 1c

| Ex. | Transition metal compound | | MAO | Polymerization | | Polymerization activity |
|---|---|---|---|---|---|---|
| | Kind | Zr concentration [μmol] | Al concenTration [mmol] | time [min] | Yield [g] | [Kg/mmol-Zr · h] |
| 9c | A | 5 | 5 | 30 | 9.46 | 3.78 |
| 13c | A | 2.5 | 2.5 | 20 | 16.4 | 19.8 |

TABLE 1c-continued

| | | | | | | |
|---|---|---|---|---|---|---|
| 14c | A | 2.5 | 2.5 | 20 | 19.9 | 23.6 |
| 15c | A | 2.5 | 2.5 | 10 | 11.9 | 28.6 |
| 5c | A | 0.5 | 0.5 | 3 | 0.58 | 23.3 |
| 10c | B | 5 | 5 | 30 | 1.3 | 0.52 |
| 16c | B | 2.5 | 2.5 | 20 | 4.49 | 5.4 |
| 17c | B | 2.5 | 2.5 | 20 | 6.98 | 8.39 |
| 18c | B | 2.5 | 2.5 | 20 | 8.89 | 10.7 |
| 6c | B | 0.5 | 0.5 | 3 | 1.02 | 41 |
| 11c | C | 4.1 | 5 | 30 | 3.58 | 1.73 |
| 19c | C | 2.5 | 2.5 | 10 | 7.6 | 18.3 |
| 20c | C | 2.5 | 2.5 | 10 | 9.53 | 22.9 |
| 21c | C | 2.5 | 2.5 | 8 | 7.94 | 23.8 |
| 7c | C | 0.5 | 0.5 | 3 | 0.5 | 20 |
| 12c | D | 5 | 5 | 30 | 10.1 | 3.99 |
| 22c | D | 2.5 | 2.5 | 10 | 9.52 | 22.9 |
| 23c | D | 2.5 | 2.5 | 10 | 12 | 28.8 |
| 24c | D | 2.5 | 2.5 | 5 | 8.82 | 42.4 |
| 8c | D | 0.5 | 0.5 | 2 | 0.62 | 37.3 |

| Ex. | Ethylene content in polymer [mol %] | $[\eta]$ [dl/g] | Mw [×10$^3$] | Mw/Mn [—] | Tm [° C.] |
|---|---|---|---|---|---|
| 9c | 0 | 1.05 | 108 | 1.8 | 128.2 |
| 13c | 18 | 1.2 | — | — | — |
| 14c | 30 | 1.23 | — | — | — |
| 15c | 46 | 1.47 | — | — | — |
| 5c | 100 | 10.5 | 696 | 3.6 | — |
| 10c | 0 | 0.89 | 88 | 1.7 | 136.7 |
| 16c | 19 | 0.88 | — | — | — |
| 17c | 37 | 0.94 | — | — | — |
| 18c | 46 | 1.3 | — | — | — |
| 6c | 100 | 15.1 | 1066 | 4.4 | — |
| 11c | 0 | 1.87 | 218 | 1.9 | 133.8 |
| 19c | 14 | 1.59 | — | — | — |
| 20c | 30 | 1.55 | — | — | — |
| 21c | 39 | 1.65 | — | — | — |
| 7c | 100 | 13.8 | 1068 | 4.2 | — |
| 12c | 0 | 1.02 | 94 | 1.8 | 128 |
| 22c | 19 | 0.97 | — | — | — |
| 23c | 32 | 1.17 | — | — | — |
| 24c | 43 | 1.29 | — | — | — |
| 8c | 100 | 10.4 | 672 | 3.3 | — |

Polymerization conditions: Toluene; 250 ml, Temperature; 50° C., Triisobutyl aluminum; 1.0 mmol, Amount of Monomer fed; refer to each example.
Transition metal compound A: Diphenylmethylene(3-tert-butyl-5-methyl-cyclopentadienyl)(fluorenyl)zirconium dichloride
Transition metal compound B: Diphenylmethylene(3-tert-butyl-5-methyl-cyclopentadienyl)(3,6-di-tert-butyl-fluorenyl)zirconium dichloride
Transition metal compound C: Diphenylmethylene(3-tert-butyl-5-methyl-cyclopentadienyl)(2,7-di-tert-butyl-fluorenyl)zirconium dichloride
Transition metal compound D: Di(p-tolyl)methylene(3-tert-butyl-5-methyl-cyclopentadienyl)(fluorenyl)zirconium dichloride TABLE 2c

| Comparative Example | Transition metal compound Kind | Transition metal compound Zr concentration [μmol] | MAO Al concentration [mmol] | Polymerization time [min] | Yield [g] | Polymerization activity [Kg/mmol-Zr · h] |
|---|---|---|---|---|---|---|
| 5c | E | 5 | 5 | 30 | 0.72 | 0.28 |
| 8c | E | 2.5 | 2.5 | 20 | 1.97 | 2.35 |
| 9c | E | 2.5 | 2.5 | 20 | 2.52 | 3.03 |
| 10c | E | 2.5 | 2.5 | 20 | 3.29 | 3.95 |
| 2c | E | 0.5 | 0.5 | 3 | 1.97 | 79.7 |
| 6c | F | 5 | 5 | 30 | 0.91 | 0.37 |
| 11c | F | 2.5 | 2.5 | 20 | 0.34 | 0.4 |
| 12c | F | 2.5 | 2.5 | 20 | 1.22 | 1.49 |
| 13c | F | 2.5 | 2.5 | 20 | 2.19 | 2.63 |
| 3c | F | 0.5 | 0.5 | 3 | 1.69 | 67 |
| 7c | G | 5 | 5 | 30 | 6.35 | 2.55 |
| 14c | G | 2.5 | 2.5 | 10 | 12.4 | 29.7 |
| 15c | G | 2.5 | 2.5 | 10 | 13.5 | 32.4 |
| 16c | G | 2.5 | 2.5 | 10 | 15.9 | 38.2 |
| 4c | G | 0.5 | 0.5 | 3 | 1.77 | 70.4 |

TABLE 2c-continued

| Comparative Example | Ethylene content in polymer [mol %] | [η] [dl/g] | Mw [×10³] | Mw/Mn [—] | Tm [° C.] |
|---|---|---|---|---|---|
| 5c | 0 | 1.14 | 77 | 2 | 133.6 |
| 8c | 31 | 0.83 | — | — | — |
| 9c | 44 | 1.00 | — | — | — |
| 10c | 59 | 1.30 | — | — | — |
| 2c | 100 | 8.86 | 635 | 3.4 | — |
| 6c | 0 | 0.95 | 95 | 1.7 | 142.4 |
| 11c | 29 | 0.58 | — | — | — |
| 12c | 45 | 0.78 | — | — | — |
| 13c | 63 | 1.18 | — | — | — |
| 3c | 100 | 6.44 | 759 | 4.0 | — |
| 7c | 0 | 0.33 | 26 | 1.6 | 126.5 |
| 14c | 21 | 0.46 | — | — | — |
| 15c | 35 | 0.78 | — | — | — |
| 16c | 48 | 0.72 | — | — | — |
| 4c | 100 | 10.6 | 994 | 4.5 | — |

Polymerization conditions: Toluene 250 ml, Temperature 50° C., Triisobutyl aluminum 1.0 mmol, Amount of Monomer fed shown in each example.
Transition metal compound E: Dimethylmethylene(3-tert-butyl-5-methyl-cyclopentadienyl)(fluorenyl)zirconium dichloride
Transition metal compound F: Dimethylmethylene(3-tert-butyl-5-methyl-cyclopentadienyl)(3,6-di-tert-butyl-fluorenyl)zirconium dichloride
Transition metal compound G: Diphenylmethylene(3-tert-butyl-cyclopentadienyl)(fluorenyl)zirconium dichloride Example 25c Ethylene/Propylene Pressure Solution Copolymerization Into a 1000 ml internal volume SUS-made autoclave thoroughly purged with nitrogen, 425 ml of heptane was fed, and then 27.5 ml of propylene was fed while sufficiently stirring. The mixture was heated to 60° C. and the internal pressure of the autoclave was set to 5.7 Kg/cm² G, and then set to 8.0 Kg/cm² G by pressurization with ethylene gas. Successively, to a 20 ml internal volume catalyst feed pot mounted on the autoclave, which pot was thoroughly purged with nitrogen, a mixed solution of 2.0 ml of dehydrated toluene and 0.5 mmol of a toluene solution of triisobutyl aluminum (Al=1.0 M) was added and fed into the autoclave by pressurization with nitrogen. Next, to the catalyst feed pot, 2.0 ml of dehydrated toluene, 0.2 mmol of a toluene solution of methyl aluminoxane (Al=1.53 M) and 0.2 μmol of a toluene solution of diphenyl methylene(3-tert-butyl-5-methyl-cyclopentadienyl)(fluorenyl)zirconium dichloride synthesized in Example 1c, as a transition metal compound were added, and fed by pressurization with nitrogen, and then polymerization was started. The polymerization was carried out at 60° C. for 15 min while the internal pressure of the autoclave was kept to 8.0 Kg/cm² G, and then a small amount of methanol was added to stop the polymerization. The resulting polymer solution was added into excess amounts of methanol mixed with hydrochloric acid and the polymer precipitated was separated with filtration. Thereafter, the polymer was dried under reduced pressure at 80° C. for 10 hr. The polymer was obtained in an amount of 10.6 g and had a polymerization activity of 212 Kg-Polymer/mmol-Zr·hr. In the analysis results, the polymer had an ethylene content of 37 mol %, a [η] value of 2.44 dl/g, a Mw of 382,000 and a Mw/Mn ratio of 2.0.

Example 26c

Ethylene/Propylene Pressure Solution Copolymerization

Polymerization was carried out in the same conditions as Example 25c except for adding 0.5 mmol of a toluene solution of methyl aluminoxane (Al=1.53 M) and 0.5 μmol of a toluene solution of diphenylmethylene(3-tert-butyl-5-methyl-cyclopentadienyl)(3,6-di-tert-butyl-fluorenyl)zirconium dichloride synthesized in Example 2c, as a transition metal compound. The polymer was obtained in an amount of 11.4 g and had a polymerization activity of 91.1 Kg-Polymer/mmol-Zr·hr. In the analysis results, the polymer had an ethylene content of 39 mol % and a [η] value of 1.78 dl/g, a Mw of 228,000 and a Mw/Mn ratio of 1.9.

Comparative Example 17c

Ethylene/Propylene Pressure Solution Copolymerization

Polymerization was carried out in the same conditions as Example 25c except for adding 0.5 mmol of a toluene solution of methyl aluminoxane (Al=1.53 M) and 0.5 μmol of a toluene solution of dimethylmethylene(3-tert-butyl-5-methyl-cyclopentadienyl)(fluorenyl)zirconium dichloride synthesized by the method disclosed in the pamphlet of WO01/27124, as a transition metal compound. The polymer was obtained in an amount of 8.74 g and had a polymerization activity of 69.9 Kg-Polymer/mmol-Zr·hr. In the analysis results, the polymer had an ethylene content of 45 mol % and a [η] value of 1.24 dl/g, a Mw of 149,000 and a Mw/Mn ratio of 1.8.

Comparative Example 18c

Ethylene/Propylene Pressure Solution Copolymerization

Polymerization was carried out in the same conditions as Example 25c except for adding 0.5 mmol of a toluene solution of methyl aluminoxane (Al=1.53 M) and 0.5 μmol of a toluene solution of dimethylmethylene(3-tert-butyl-5-methyl-cyclopentadienyl)(3,6-di-tert-butyl-fluorenyl)zirconium dichloride synthesized by the method disclosed in the pamphlet of WO01/27124, as a transition metal compound. The polymer was obtained in an amount of 10.8 g and had a polymerization activity of 86.6 Kg-Polymer/mmol-Zr·hr. In the analysis results, the polymer had an ethylene content of 43 mol % and a [η] value of 1.06 dl/g, a Mw of 124,000 and a Mw/Mn ratio of 1.8.

The polymerization results are inclusively shown in Table 3c.

TABLE 3c

| | Transition metal compound | | MAO Al concentration [mmol] | Polymerization time [min] | Polymerization | |
|---|---|---|---|---|---|---|
| | Kind | Zr concentration [μmol] | | | Yield [g] | activity [Kg/mmol-Zr·h] |
| Example | | | | | | |
| 25c | A | 0.2 | 0.2 | 15 | 10.6 | 212 |
| 26c | B | 0.5 | 0.5 | 15 | 11.4 | 91.1 |
| Comparative Example | | | | | | |
| 17c | E | 0.5 | 0.5 | 15 | 8.74 | 69.9 |
| 18c | F | 0.5 | 0.5 | 15 | 10.8 | 86.6 |

| | Ethylene content in polymer [mol %] | [η] [dl/g] | Mw [×10³] | Mw/Mn [—] |
|---|---|---|---|---|
| Example | | | | |
| 25c | 37 | 2.44 | 382 | 2.0 |
| 26c | 39 | 1.78 | 228 | 1.9 |
| Comparative Example | | | | |
| 17c | 45 | 1.24 | 149 | 1.8 |
| 18c | 43 | 1.06 | 124 | 1.8 |

Polymerization conditions: Heptane 425 ml, Propylene 27.5 ml, Temperature 60° C., Pressure 8.0 Kg/cm²G, Triisobutyl aluminum 0.5 mmol.
Transition metal compound A: Diphenylmethylene(3-tert-butyl-5-methyl-cyclopentadienyl)(fluorenyl)zirconium dichloride
Transition metal compound B: Diphenylmethylene(3-tert-butyl-5-methyl-cyclopentadienyl)(3,6-di-tert-butyl-fluorenyl)zirconium dichloride
Transition metal compound E: Dimethylmethylene(3-tert-butyl-5-methyl-cyclopentadienyl)(fluorenyl)zirconium dichloride
Transition metal compound F: Dimethylmethylene(3-tert-butyl-5-methyl-cyclopentadienyl)(3,6-di-tert-butyl-fluorenyl)zirconium dichloride

Example 27c

Propylene Bulk Polymerization

Into a 50 ml side-arm flask thoroughly purged with nitrogen, a magnetic stirrer chip was put and then 0.24 mmol in terms of aluminum of a mineral oil suspension of silica-supported methyl aluminoxane (Al=7.10 mmol/g) and 1.08 μmol of a toluene solution of diphenyl methylene(3-tert-butyl-5-methyl-cyclopentadienyl)(fluorenyl)zirconium dichloride synthesized in Example 1c as a transition metal compound were added and stirred for 30 min. To the mixed solution, 1.0 mmol of a hexane solution of triisobutyl aluminum (Al=1.0 M) and 5.0 ml of dehydrated hexane were added and then introduced into a 2000 ml internal volume SUS-made autoclave thoroughly purged with nitrogen. Thereafter, 500 g of liquid propylene was fed and polymerization was carried out at 70° C. for 40 min, and then the autoclave was cooled and propylene was purged to stop the polymerization. The resulting polymer was dried under reduced pressure at 80° C. for 10 hr. The polymer obtained was 16.0 g of isotactic polypropylene and had a polymerization activity of 22.1 Kg-PP/mmol-Zr·hr. In the analysis results, the polymer had a [η] value of 3.55 dl/g, a Mw of 622,000 and a Mw/Mn ratio of 3.9 and a Tm of 137.4° C.

Example 28c

Propylene Bulk Polymerization

Polymerization was carried out in the same conditions as Example 27c except that 0.30 Nl of hydrogen was added after 500 g of the liquid propylene was fed. The polymer obtained was 67.4 g of isotactic polypropylene and had a polymerization activity of 93.2 Kg-PP/mmol-Zr·hr. In the analysis results, the polymer had a [η] value of 1.61 dl/g, a Mw of 198,000 and a Mw/Mn ratio of 2.4 and a Tm of 142.7° C.

Example 29c

Propylene Bulk Polymerization

Into a 50 ml side-arm flask thoroughly purged with nitrogen, a magnetic stirrer chip was put and then 0.54 mmol in terms of aluminum of a mineral oil suspension of silica-supported methyl aluminoxane (Al=7.92 mmol/g) and 0.92 μmol of a toluene solution of diphenyl methylene (3-tert-butyl-5-methyl-cyclopentadienyl)(3,6-di-tert-butyl-fluorenyl)zirconium dichloride synthesized in Example 2c as a transition metal compound were added and stirred for 30 min. To the mixed solution, 1.0 mmol of a hexane solution of triisobutyl aluminum (Al=1.0 M) and 5.0 ml of dehydrated hexane were added and then introduced into a 2000 ml internal volume SUS-made autoclave thoroughly purged with nitrogen. Thereafter, 500 g of liquid propylene was fed and polymerization was carried out at 70° C. for 40 min, and then the autoclave was cooled and propylene was purged to stop the polymerization. The resulting polymer was dried under reduced pressure at 80° C. for 10 hr. The polymer obtained was 6.30 g of isotactic polypropylene and had a polymerization activity of 10.3 Kg-PP/mmol-Zr·hr. In the analysis results, the polymer had a [η] value of 2.58 dl/g, a Mw of 442,000 and a Mw/Mn ratio of 2.5 and a Tm of 144.8° C.

Example 30c

Propylene Bulk Polymerization

Polymerization was carried out in the same conditions as Example 29c except that 0.30 N1 of hydrogen was added after 500 g of the liquid propylene was fed. The polymer obtained was 99.8 g of isotactic polypropylene and had a polymerization activity of 163 Kg-PP/mmol-Zr·hr. In the analysis results, the polymer had a [η] value of 1.02 dl/g, a Mw of 107,000 and a Mw/Mn ratio of 2.2 and a Tm of 155.1° C.

Comparative Example 19c

Propylene Bulk Polymerization

Into a 50 ml side-arm flask thoroughly purged with nitrogen, a magnetic stirrer chip was put and then 0.24 mmol in terms of aluminum of a mineral oil suspension of silica-supported methyl aluminoxane (Al=7.10 mmol/g) and 1.35 μmol of a toluene solution of dimethyl methylene(3-tert-butyl-5-methyl-cyclopentadienyl)(fluorenyl)zirconium dichloride synthesized by the method disclosed in the pamphlet of WO01/27124 as a transition metal compound were added and stirred for 30 min. To the mixed solution, 1.0 mmol of a hexane solution of triisobutyl aluminum (Al=1.0 M) and 5.0 ml of dehydrated hexane were added and then introduced into a 2000 ml internal volume SUS-made autoclave thoroughly purged with nitrogen. Thereafter, 500 g of liquid propylene was fed and polymerization was carried out at 70° C. for 40 min, and then the autoclave was cooled and propylene was purged to stop the polymerization. The resulting polymer was dried under reduced pressure at 80° C. for 10 hr. The polymer obtained was 39.9 g of isotactic polypropylene and had a polymerization activity of 44.2 Kg-PP/mmol-Zr·hr. In the analysis results, the polymer had a [η] value of 3.19 dl/g, a Mw of 489,000 and a Mw/Mn ratio of 2.6 and a Tm of 140.9° C.

Comparative Example 20c

Propylene Bulk Polymerization

Polymerization was carried out in the same conditions as Comparative Example 19c except that 0.30 N1 of hydrogen was added after 500 g of the liquid propylene was fed. The polymer obtained was 101 g of isotactic polypropylene and had a polymerization activity of 112 Kg-PP/mmol-Zr·hr. In the analysis results, the polymer had a [η] value of 1.85 dl/g, a Mw of 229,000 and a Mw/Mn ratio of 2.4 and a Tm of 143.6° C.

Comparative Example 21c

Propylene Bulk Polymerization

Into a 50 ml side-arm flask thoroughly purged with nitrogen, a magnetic stirrer chip was put and then 0.54 mmol in terms of aluminum of a mineral oil suspension of silica-supported methyl aluminoxane (Al=7.9 mmol/g) and 1.11 μmol of a toluene solution of dimethyl methylene (3-tert-butyl-5-methyl-cyclopentadienyl)(3,6-di-tert-butyl-fluorenyl)zirconium dichloride synthesized by the method disclosed in the pamphlet of WO01/27124, as a transition metal compound were added and stirred for 30 min. To the mixed solution, 1.0 mmol of a hexane solution of triisobutyl aluminum (Al=1.0 M) and 5.0 ml of dehydrated hexane were added and then introduced into a 2000 ml internal volume SUS-made autoclave thoroughly purged with nitrogen. Thereafter, 500 g of liquid propylene was fed and polymerization was carried out at 70° C. for 40 min, and then the autoclave was cooled and propylene was purged to stop the polymerization. The resulting polymer was dried under reduced pressure at 80° C. for 10 hr. The polymer obtained was 8.23 g of isotactic polypropylene and had a polymerization activity of 11.2 Kg-PP/mmol-Zr·hr. In the analysis results, the polymer had a [η] value of 3.35 dl/g, a Mw of 437,000 and a Mw/Mn ratio of 2.4 and a Tm of 149.4° C.

Comparative Example 22c

Propylene Bulk Polymerization

Polymerization was carried out in the same conditions as Comparative Example 21c except that 0.30 N1 of hydrogen was added after 500 g of the liquid propylene was fed. The polymer obtained was 108 g of isotactic polypropylene and had a polymerization activity of 146 Kg-PP/mmol-Zr·hr. In the analysis results, the polymer had a [η] value of 1.60 dl/g, a Mw of 178,000 and a Mw/Mn ratio of 2.2 and a Tm of 158.2° C.

Comparative Example 23c

Propylene Bulk Polymerization

Into a 50 ml side-arm flask thoroughly purged with nitrogen, a magnetic stirrer chip was put and then 0.24 mmol in terms of aluminum of a mineral oil suspension of silica-supported methyl aluminoxane (Al=7.10 mmol/g) and 1.11 μmol of a toluene solution of diphenylmethylene(3-tert-butyl-cyclopentadienyl)(fluorenyl)zirconium dichloride synthesized in Comparative Example 1C, as a transition metal compound were added and stirred for 30 min. To the mixed solution, 1.0 mmol of a hexane solution of triisobutyl aluminum (Al=1.0 M) and 5.0 ml of dehydrated hexane were added and then introduced into a 2000 ml internal volume SUS-made autoclave thoroughly purged with nitrogen. Thereafter, 500 g of liquid propylene was fed and polymerization was carried out at 70° C. for 40 min, and then the autoclave was cooled and propylene was purged to stop the polymerization. The resulting polymer was dried under reduced pressure at 80° C. for 10 hr. The polymer obtained was 39.5 g of isotactic polypropylene and had a polymerization activity of 53.4

Kg-PP/mmol-Zr·hr. In the analysis results, the polymer had a [η] value of 1.02 dl/g, a Mw of 103,000 and a Mw/Mn ratio of 1.9 and a Tm of 130.6° C.

Comparative Example 24c

Propylene Bulk Polymerization

Polymerization was carried out in the same conditions as Comparative Example 23c except that 0.30 Nl of hydrogen was added after 500 g of the liquid propylene was fed. The polymer obtained was 143 g of isotactic polypropylene and had a polymerization activity of 193 Kg-PP/mmol-Zr·hr. In the analysis results, the polymer had a [η] value of 0.53 dl/g, a Mw of 41,000 and a Mw/Mn ratio of 1.7 and a Tm of 133.8° C.

The polymerization results are inclusively shown in Table 4c.

Example 31c

Ethylene/Propylene Bulk Copolymerization

Into a 200 ml four-necked flask thoroughly purged with nitrogen, a magnetic stirrer chip was put and then 9.94 mmol in terms of aluminum of a toluene suspension of silica-supported methyl aluminoxane (Al=7.10 mmol/g) and 22.3 μmol of a toluene solution of diphenyl methylene(3-tert-butyl-5-methyl-cyclopentadienyl)(fluorenyl)zirconium dichloride synthesized in Example 1c as a transition metal compound were added and stirred for 30 min. Thereafter, 99% of the solvent was replaced with normal heptane by decantation to prepare 40 ml of a suspension finally.

To a 50 ml side-arm flask thoroughly purged with nitrogen, a magnetic stirrer chip was put, and 5.0 ml of the suspension and 0.84 mmol of a normal heptane solution of triethyl aluminum (Al=1.25 M) were added and stirred for 15 min. Subsequently, to a 5000 ml internal volume SUS-made auto- TABLE 4c

| | Kind | Transition metal compound Zr concentration [μmol] | MAO Al concentration [mmol] | Hydrogen [Nl] | Polymerization time [min] | Yield [g] |
|---|---|---|---|---|---|---|
| Example | | | | | | |
| 27c | A | 1.08 | 0.24 | — | 40 | 16 |
| 28c | A | 1.08 | 0.24 | 0.3 | 40 | 67.4 |
| 29c | B | 0.92 | 0.54 | — | 40 | 6.3 |
| 30c | B | 0.92 | 0.54 | 0.3 | 40 | 99.8 |
| Comparative Example | | | | | | |
| 19c | E | 1.35 | 0.24 | — | 40 | 39.9 |
| 20c | E | 1.35 | 0.24 | 0.3 | 40 | 101 |
| 21c | F | 1.11 | 0.54 | — | 40 | 8.23 |
| 22c | F | 1.11 | 0.54 | 0.3 | 40 | 108 |
| 23c | G | 1.11 | 0.24 | — | 40 | 39.5 |
| 24c | G | 1.11 | 0.24 | 0.3 | 40 | 143 |

| | Polymerization activity [Kg/mmol-Zr·h] | [η] [dl/g] | Mw [×10³] | Mw/Mn [—] | Tm [° C.] |
|---|---|---|---|---|---|
| Example | | | | | |
| 27c | 22.1 | 3.55 | 622 | 3.9 | 137.4 |
| 28c | 93.2 | 1.61 | 198 | 2.4 | 142.7 |
| 29c | 10.3 | 2.58 | 442 | 2.5 | 144.8 |
| 30c | 163 | 1.02 | 107 | 2.2 | 155.1 |
| Comparative Example | | | | | |
| 19c | 44.2 | 3.19 | 489 | 2.6 | 140.9 |
| 20c | 112 | 1.85 | 229 | 2.4 | 143.6 |
| 21c | 11.2 | 3.35 | 437 | 2.4 | 149.4 |
| 22c | 146 | 1.6 | 178 | 2.2 | 158.2 |
| 23c | 53.4 | 1.02 | 103 | 1.9 | 130.6 |
| 24c | 193 | 0.53 | 41 | 1.7 | 133.8 |

Polymerization conditions: Liquid propylene 500 g, Temperature 70° C., Triisobutyl aluminum 1.0 mmol.
Transition metal compound A: Diphenylmethylene(3-tert-butyl-5-methyl-cyclopentadienyl)(fluorenyl)zirconium dichloride
Transition metal compound B: Diphenylmethylene(3-tert-butyl-5-methyl-cyclopentadienyl)(3,6-di-tert-butyl-fluorenyl)zirconium dichloride
Transition metal compound E: Dimethylmethylene(3-tert-butyl-5-methyl-cyclopentadienyl)(fluorenyl)zirconium dichloride
Transition metal compound F: Dimethylmethylene(3-tert-butyl-5-methyl-cyclopentadienyl)(3,6-di-tert-butyl-fluorenyl)zirconium dichloride
Transition metal compound G: Diphenylmethylene(3-tert-butyl-5-methyl-cyclopentadienyl)(fluorenyl)zirconium dichloride clave thoroughly purged with nitrogen, 1.92 μmol in terms of transition metal compound of the suspension (0.85 mmol in terms of aluminum of methyl aluminoxane) and 6.35 ml of a heptane solution of EPAN720 (EPAN720=1.91 mg/ml) as an antifouling agent were introduced. Thereafter, 1500 g of liquid propylene and 5.0 Nl of ethylene were fed and polymerization was carried out at 60° C. for 60 min, and then the autoclave was cooled and propylene was purged to stop the polymerization. The resulting polymer was dried under reduced pressure at 80° C. for 6 hr. The polymer was obtained in an amount of 133 g and had a polymerization activity of 69.5 Kg-Polymer/mmol-Zr hr. In the analysis results, the polymer had an ethylene content of 2.6 mol %, a [η] value of 2.72 dl/g and a Tm of 129.7° C.

Example 32c

Ethylene/Propylene Bulk Copolymerization

Polymerization was carried out in the same conditions as Example 31c except that 10 Nl of ethylene was added. The polymer was obtained in an amount of 288 g and had a polymerization activity of 150 Kg-Polymer/mmol-Zr·hr. In the analysis results, the polymer had an ethylene content of 4.4 mol %, a [η] value of 2.63 dl/g and a Tm of 120.7° C.

Comparative Example 25c

Ethylene/Propylene Bulk Copolymerization

Into a 200 ml four-necked flask thoroughly purged with nitrogen, a magnetic stirrer chip was put and then 9.94 mmol in terms of aluminum of a toluene suspension of silica-supported methyl aluminoxane (Al=7.10 mmol/g) and 27.9 μmol of a toluene solution of dimethyl methylene(3-tert-butyl-5-methyl-cyclopentadienyl)(fluorenyl)zirconium dichloride synthesized by the method disclosed in the pamphlet of WO01/27124 as a transition metal compound were added and stirred for 30 min. Thereafter, 99% of the solvent was replaced with normal heptane by decantation to prepare 40 ml of a suspension finally.

To a 50 ml side-arm flask thoroughly purged with nitrogen, a magnetic stirrer chip was put, and 5.0 ml of the suspension and 1.04 mmol of a normal heptane solution of triethyl aluminum (Al=1.25 M) were added and stirred for 15 min. Subsequently, to a 5000 ml internal volume SUS-made autoclave thoroughly purged with nitrogen, 1.79 μmol in terms of transition metal compound of the suspension (0.64 mmol in terms of aluminum of methyl aluminoxane) and 4.76 ml of a heptane solution of EPAN720 (EPAN720=1.91 mg/ml) as an antifouling agent were introduced. Thereafter, 1500 g of liquid propylene and 10 Nl of ethylene were fed and polymerization was carried out at 60° C. for 60 min, and then the autoclave was cooled and propylene was purged to stop the polymerization. The resulting polymer was dried under reduced pressure at 80° C. for 6 hr. The polymer was obtained in an amount of 568 g and had a polymerization activity of 317 Kg-PP/mmol-Zr·hr. In the analysis results, the polymer had an ethylene content of 3.3 mol % and a [η] value of 1.88 dl/g.

Comparative Example 26c

Ethylene/Propylene Bulk Copolymerization

Polymerization was carried out in the same conditions as Comparative Example 25c except that 1.29 μmol in terms of transition metal compound of the suspension (0.46 mmol in terms of aluminum of methyl aluminoxane) and 3.44 ml of a heptane solution of EPAN720 (EPAN720=1.91 mg/ml) as an antifouling agent were introduced. The polymer was obtained in an amount of 472 g and had a polymerization activity of 365 Kg-Polymer/mmol-Zr·hr. In the analysis results, the polymer had an ethylene content of 4.3 mol %, a [η] value of 1.76 dl/g and a Tm of 127.7° C. The polymerization results are inclusively shown in Table 5c.

TABLE 5c

| | Transition metal compound | | MAO Al | Polymerization | | |
|---|---|---|---|---|---|---|
| | Kind | Zr concentration [μmol] | concentration [mmol] | Ethylene [Nl] | time [min] | Yield [g] |
| | | | Example | | | |
| 31c | A | 1.91 | 0.85 | 5 | 60 | 133 |
| 32c | A | 1.91 | 0.85 | 10 | 60 | 288 |
| | | | Comparative Example | | | |
| 25c | E | 1.79 | 0.64 | 10 | 60 | 568 |
| 26c | E | 1.29 | 0.46 | 10 | 60 | 472 |

| | Polymerization activity [Kg/mmol-Zr · h] | Ethylene content in Polymer [mol %] | [η] [dl/g] | Tm [° C.] |
|---|---|---|---|---|
| | | Example | | |
| 31c | 69.5 | 2.6 | 2.72 | 129.7 |
| 32c | 150 | 4.4 | 2.63 | 120.7 |
| | | Comparative Example | | |
| 25c | 317 | 3.3 | 1.88 | — |
| 26c | 365 | 4.3 | 1.76 | 127.7 |

Polymerization conditions: Liquid propylene 1,500 g, Temperature 60° C.,
Transition metal compound A: Diphenylmethylene(3-tert-butyl-5-methyl-cyclopentadienyl)(fluorenyl)zirconium dichloride
Transition metal compound E: Dimethylmethylene(3-tert-butyl-5-methyl-cyclopentadienyl)(fluorenyl)zirconium dichloride

Example 33c

Synthesis of di(4-tert-butyl-phenyl)methylene(3-tert-butyl-5-methyl-cyclopentadienyl)(fluorenyl)zirconium dichloride

(1) Synthesis of 3-tert-butyl-1-methyl-6,6-di(4-tert-butyl-phenyl)fulvene

In a 200 ml three-necked flask equipped with a magnetic stirrer chip and three-way cock thoroughly purged with nitrogen, 1.58 g of powdery potassium hydroxide (28.2 mmol) and 100 ml of dehydrated dimethoxy ethane were added in a nitrogen atmosphere. To the suspension, 2.31 g of 3-tert-butyl-1-methyl-cyclopentadiene (17.0 mmol) was gradually added dropwise at room temperature and stirred under reflux for 1 hr. Thereafter, a solution prepared by dissolving 5.25 g of 4,4'-di-tert-butyl-benzophenone (17.8 mmol) to 40 ml of dehydrated dimethoxyethane was gradually added dropwise and stirred under reflux for 2 days. To the resulting reaction mixture, 50 ml of a hydrochloric acid aqueous solution (1N) was gradually added dropwise in an ice bath and stirred at room temperature for some time. Diethyl ether was added to the mixed solution to separate an organic phase. The organic phase was washed with a saturated sodium bicarbonate aqueous solution, water and saturated brine. The organic phase was dried with anhydrous magnesium sulfate, thereafter the drying agent was filtered off and the solvent was distilled off from the filtrate under reduced pressure to give a reddish-brown solid. The solid was purified with a column chromatography using 240 g of silica gel (developing solvent: n-hexane) and the developing solvent was distilled off under reduced pressure, and thereby the aimed compound was obtained in an amount of 2.10 g (5.09 mmol) as a reddish-orange solid (yield: 30%).

(2) Synthesis of (3-tert-butyl-5-methyl-cyclopentadienyl)(fluorenyl)di(4-tert-butyl-phenyl)methane In a 200 ml three-necked flask equipped with a magnetic stirrer chip and three-way cock thoroughly purged with nitrogen, 0.653 g of fluorene (3.93 mmol) was dissolved in 50 ml of dehydrated diethylether in a nitrogen atmosphere. To the solution, 2.7 ml of n-butyl lithium/hexane solution (1.58M: 4.27 mmol) was gradually added dropwise in an ice bath and stirred at room temperature over night. To the solution, a solution prepared by dissolving 2.09 g of 3-tert-butyl-1-methyl-6,6-di(4-tert-butyl-phenyl)fulvene (5.06 mmol) in 100 ml of dehydrated diethyl ether was added and stirred under reflux for 10 days and then stirred at room temperature for 11 days. To the reaction mixture, 30 ml of distilled water was gradually added dropwise in an ice bath, and then diethyl ether was added to separate an organic phase. The organic phase was washed with distilled water and saturated brine. The organic phase was dried with anhydrous magnesium sulfate, thereafter the drying agent was filtered off and the solvent was distilled off from the filtrate under reduced pressure to give a reddish-brown solid. The solid was purified with a column chromatography using 150 g of silica gel (developing solvent: n-hexane) and the developing solvent was distilled off under reduced pressure. The remaining product was re-crystallized using hexane and dried under reduced pressure, and thereby the aimed compound was obtained in an amount of 0.439 g (0.758 mmol) as a pale yellow solid (yield: 19%).

(3) Synthesis of di(4-tert-butylphenyl)methylene(3-tert-butyl-5-methyl-cyclopentadienyl)(fluorenyl)zirconium dichloride In a 100 ml Schlenk flask equipped with a magnetic stirrer chip and three-way cock thoroughly purged with nitrogen, 0.450 g of (3-tert-butyl-5-methyl-cyclopentadienyl)(fluorenyl)di(4-tert-butyl-phenyl) methane (0.777 mmol) was dissolved in 10 ml of dehydrated diethylether in a nitrogen atmosphere. To the solution, 1.05 ml of n-butyl lithium/hexane solution (1.58M: 1.66 mmol) was gradually added dropwise in an ice bath and stirred at room temperature over night. The reaction solution was cooled sufficiently in an dry ice/methanol bath and 0.224 g of zirconium tetrachloride (0.961 mmol) was added. The solution was stirred for 2 days while returning the temperature to room temperature. Thereafter, the solvent was distilled off under reduced pressure. The reaction mixture was introduced into a glove box and re-slurried with dehydrated hexane and filtered off using a glass filter filled with diatomaceous earth. The solvent in the filtrate was distilled off to prepare a solid. The solid was washed with a small amount of dehydrated pentane. The solvent of the washing liquid was distilled off and the remaining product was dried under reduced pressure, and thereby the aimed compound was obtained in an amount of 216 mg (0.292 mmol) as a reddish-orange solid (yield: 38%).

The identification was carried out by $^1$H-NMR spectrum and FD-mass spectrometry spectrum. The measurement results are shown below.

$^1$H-NMR spectrum (CDCl$_3$, TMS standard): /ppm 1.07 (s, 9H), 1.27 (s+s, 18H), 1.83 (s, 3H), 5.63 (d, 1H), 6.12-6.17 (m, 2H), 6.80-6.86 (m, 1H), 6.93-7.03 (m, 2H), 7.20-7.38 (m, 4H), 7.41-7.48 (m, 2H), 7.60-7.64 (m, 1H), 7.71-7.80 (m, 3H), 8.06-8.09 (m, 2H)

FD-mass spectrometry spectrum: M/z=738 (M$^+$)

Example 34c

Synthesis of di(4-chloro-phenyl)methylene(3-tert-butyl-5-methyl-cyclopentadienyl)(fluorenyl)zirconium dichloride

(1) Synthesis of 3-tert-butyl-1-methyl-6,6-di(4-chloro-phenyl)fulvene

In a 200 ml three-necked flask equipped with a magnetic stirrer chip and three-way cock thoroughly purged with nitrogen, 0.65 g of powdery potassium hydroxide (13.0 mmol) and 70 ml of dehydrated dimethoxy ethane were added in a nitrogen atmosphere. To the suspension, 1.24 g of 3-tert-butyl-1-methyl-cyclopentadiene (9.11 mmol) was added dropwise at room temperature and then 2.40 g of 4,4'-dichloro-benzophenone (9.58 mmol) was added and stirred under reflux for 3 days. To a 30 ml of a hydrochloric acid aqueous solution (1N) set in an ice bath, the reaction mixture was gradually added dropwise and stirred for some time. Diethyl ether was added to the mixed solution to separate an organic phase. The organic phase was washed with a saturated sodium bicarbonate aqueous solution, water and saturated brine. The organic phase was dried with anhydrous magnesium sulfate, thereafter the drying agent was filtered off and the solvent was distilled off from the filtrate under reduced pressure to give a reddish-orange solid. The solid was purified with a column chromatography using 110 g of silica gel (developing solvent: n-hexane) and the developing solvent was distilled off under reduced pressure, and thereby the aimed compound was obtained in an amount of 2.79 g (7.56 mmol) as a red solid (yield: 83%).

(2) Synthesis of (3-tert-butyl-5-methyl-cyclopentadienyl)(fluorenyl)di(4-chloro-phenyl)methane In a 200 ml three-necked flask equipped with a magnetic stirrer chip and three-way cock thoroughly purged with nitrogen, 1.42 g of fluorene (8.52 mmol) was dissolved in 60 ml of dehydrated diethyl ether in a nitrogen atmosphere. To the solution, 5.6 ml of n-butyl lithium/hexane solution (1.58M: 8.85 mmol) was gradually added dropwise in an ice bath and stirred at room temperature over night. To the reaction solution, 2.99 g of 3-tert-butyl-1-methyl-6,6-di(4-chloro-phenyl) fulvene (8.08 mmol) was added and stirred under reflux for several days. The reaction mixture was gradually added dropwise to 30 ml of a hydrochloric acid aqueous solution (1N) set in an ice bath, and stirred briefly. Therein, diethyl ether was added to separate an organic phase. The organic phase was washed with a saturated sodium bicarbonate aqueous solution, water and saturated brine. The organic phase was dried with anhydrous magnesium sulfate, thereafter the drying agent was filtered off and the solvent was distilled off from the filtrate under reduced pressure to give a red solid. The solid was purified with a column chromatography using 180 g of silica gel (developing solvent: n-hexane) and the developing solvent was distilled off under reduced pressure. Thereafter, the remaining product was re-crystallized using hexane and dried under reduced pressure, and thereby the aimed compound was obtained in an amount of 1.69 g (3.16 mmol) as a pale yellow solid (yield: 39%).

(3) Synthesis of di(4-chloro-phenyl)methylene(3-tert-butyl-5-methyl-cyclopentadienyl)(fluorenyl) zirconium dichloride In a 30 ml Schlenk flask equipped with a magnetic stirrer chip and three-way cock thoroughly purged with nitrogen, 1.12 g of (3-tert-butyl-5-methyl-cyclopentadienyl)(fluorenyl) di(4-chloro-phenyl) methane (2.09 mmol) was dissolved in 20 ml of dehydrated diethylether in a nitrogen atmosphere. To the solution, 2.7 ml of n-butyl lithium/hexane solution (1.58M: 4.27 mmol) was gradually added dropwise in an ice bath and stirred at room temperature over night. The solvent was distilled off under reduced pressure to prepare a red solid. The solid was washed with dehydrated hexane and dried under reduced pressure to prepare a reddish-orange solid. To the solid, 20 ml of dehydrated diethyl ether was added and the reaction solution was cooled sufficiently in a dry ice/methanol bath and 0.306 g of zirconium tetrachloride (1.31 mmol) was added. The solution was stirred for 3 days while gradually returning the temperature to room temperature. Thereafter, the solvent was distilled off under reduced pressure. The reaction mixture was introduced into a glove box and re-slurried with dehydrated hexane and filtered off using a glass filter filled with diatomaceous earth. The filtrate was concentrated to prepare a solid. The solid was separated with centrifugal separator and washed with a small amount of dehydrated diethyl ether, and thereby the aimed compound was obtained in an amount of 33.9 mg (0.049 mmol) as a reddish-orange solid (yield: 4%).

The identification was carried out by $^1$H-NMR spectrum and FD-mass spectrometry spectrum. The measurement results are shown below.

$^1$H-NMR spectrum (CDCl$_3$, TMS standard): /ppm 1.10 (s, 9H), 1.92 (s, 3H), 5.62 (d, 1H), 6.20 (d, 1H), 6.33-6.36 (s+s, 1H), 6.95-7.08 (m, 3H), 7.28-7.46 (m, 3H), 7.50-7.56 (m, 2H), 7.68-7.72 (m, 1H), 7.83-7.88 (m, 3H), 8.13-8.18 (m, 2H)

FD-mass spectrometry spectrum: M/z=694 (M$^+$)

Example 35c

Synthesis of di(3-trifluoromethyl-phenyl)methylene (3-tert-butyl-5-methyl-cyclopentadienyl)(fluorenyl) zirconium dichloride (1) Synthesis of 3-tert-butyl-1-methyl-6,6-di(3-trifluoromethyl-phenyl)fulvene In a 200 ml three-necked flask equipped with a magnetic stirrer chip and three-way cock thoroughly purged with nitrogen, 40 ml of dehydrated tetrahydrofuran and 1.41 g of 3-tert-butyl-1-methyl-cyclopentadiene (10.4 mmol) were added in a nitrogen atmosphere. To the solution, 7.0 ml of n-butyl lithium/hexane solution (1.58M: 11.1 mmol) was gradually added dropwise in an ice bath and stirred at room temperature for 2 days. To the reaction solution, 5.4 ml of hexamethyl phosphoramide dried with molecular sieves 4A was added dropwise in an ice bath, and stirred at room temperature for 1 hr. Further, to the solution, 3.49 g of 3,3'-di-trifluoromethyl-benzophenone (11.0 mmol) was added and stirred at room temperature for 3 days. To a 30 ml of a hydrochloric acid aqueous solution (EN) set in an ice bath, the reaction mixture was gradually added dropwise and stirred at room temperature for some time. Diethyl ether was added to the mixed solution to separate an organic phase. The organic phase was washed with a saturated sodium bicarbonate aqueous solution, water and saturated brine. The organic phase was dried with anhydrous magnesium sulfate, thereafter the drying agent was filtered off and the solvent was distilled off from the filtrate under reduced pressure to give a dark red solid. The solid was purified with a column chromatography using 140 g of silica gel (developing solvent: n-hexane) and the developing solvent was distilled off under reduced pressure, and thereby the aimed compound was obtained in an amount of 3.88 g (8.89 mmol) as a red solid (yield: 86%).

(2) Synthesis of (3-tert-butyl-5-methyl-cyclopentadienyl)(fluorenyl)di(3-trifluoromethyl-phenyl)methane In a 200 ml three-necked flask equipped with a magnetic stirrer chip and three-way cock thoroughly purged with nitrogen, 1.44 g of fluorene (8.69 mmol) was dissolved in 60 ml of dehydrated diethylether in a nitrogen atmosphere. To the solution, 5.8 ml of n-butyl lithium/hexane solution (1.58M: 9.16 mmol) was gradually added dropwise in an ice bath and stirred at room temperature over night. To the reaction solution, 4.15 g of 3-tert-butyl-1-methyl-6,6-di(3-trifluoromethyl-phenyl)fulvene (9.50 mmol) was added and stirred under reflux for several days. The reaction mixture was gradually added dropwise to 30 ml of a hydrochloric acid aqueous solution set (IN) in an ice bath, and stirred at room temperature briefly. Therein, diethyl ether was added to separate an organic phase. The organic phase was washed with distilled water and saturated brine. The organic phase was dried with anhydrous magnesium sulfate, thereafter the drying agent was filtered off and the solvent was distilled off from the filtrate under reduced pressure to give a dark red solid. The solid was purified with a column chromatography using 220 g of silica gel (developing solvent: n-hexane) and the developing solvent was distilled off under reduced pressure. Thereafter, the remaining product was re-crystallized using hexane and dried under reduced pressure, and thereby the aimed compound was obtained in an amount of 1.69 g (2.72 mmol) as a white solid (yield: 31%).

(3) Synthesis of di(3-trifluoromethyl-phenyl)methylene(3-tert-butyl-5-methyl-cyclopentadienyl)(fluorenyl)zirconium dichloride In a 30 ml Schlenk flask equipped with a magnetic stirrer chip and three-way cock thoroughly purged with nitrogen, 0.622 g of (3-tert-butyl-5-methyl-cyclopentadienyl)(fluorenyl)di(3-trifluoromethyl-phenyl) methane (1.03 mmol) was dissolved in 20 ml of dehydrated diethyl ether in a nitrogen atmosphere. To the solution, 1.4 ml of n-butyl lithium/hexane solution (1.58M: 2.21 mmol) was gradually added dropwise in an ice bath and stirred at room temperature over night. The reaction solution was sufficiently cooled by an ice bath and 0.208 g of zirconium tetrachloride (0.893 mmol) was added. The solution was stirred for 3 days while gradually returning the temperature to room temperature. Thereafter, the solvent was distilled off under reduced pressure. The reaction mixture was introduced into a glove box and re-slurried with dehydrated hexane and filtered off using a glass filter filled with diatomaceous earth. The filtrate was concentrated to prepare a solid. The solid was separated with centrifugal separator, washed with a small amount of dehydrated diethyl ether and dried under reduced pressure, and thereby the aimed compound was obtained in an amount of 97.2 mg (0.127 mmol) as a reddish-pink solid (yield: 14%).

The identification was carried out by $^1$H-NMR spectrum and FD-mass spectrometry spectrum. The measurement results are shown below.

$^1$H-NMR spectrum (CDCl$_3$, TMS standard): /ppm 1.10-1.12 (s+s, 9H), 1.90 (s, 3H), 5.62 (d, 1H), 6.17-6.25 (m, 2H), 6.84-6.87 (m, 1H), 6.95-7.09 (m, 2H), 7.42-7.60 (m, 6H), 7.99-8.02 (m, 1H), 8.14-8.20 (m, 5H), FD-mass spectrometry spectrum: M/z=762 (M$^+$)

Example 36c

Preparation of Supported Catalyst

In a 100 ml three-necked flask thoroughly purged with nitrogen, a stirring rod was mounted, and 1.0 g of silica supported methyl aluminoxane (Al=7.04 mmol/g) was added. Therein, 10 ml of dehydrated toluene was added at room temperature and then 20 ml of a toluene solution of 28.1 µmol of diphenylmethylene(3-tert-butyl-5-methyl-cyclopentadienyl)(fluorenyl)zirconium dichloride synthesized in Example 1c as a transition metal compound was added with stirring and stirred for 1 hr. The resulting slurry was filtered with a filter, and a powder present on the filter was washed with 10 ml of dehydrated toluene once and then washed with 10 ml of dehydrated hexane three times. The powder obtained after washing was dried under reduced pressure for 1.5 hr and 0.70 g of the powder was obtained. The powder was mixed with 6.40 g of mineral oil to prepare a 9.9 wt % slurry.

Example 37c

Propylene/Ethylene Copolymerization

Into a 2000 ml internal volume SUS-made autoclave thoroughly purged with nitrogen, 0.60 L of liquid propylene was fed and heated to 55° C. while sufficiently stirring. The internal pressure of the autoclave was set to 30 Kg/cm$^2$ G by pressurization with ethylene gas. Subsequently, to a 30 ml internal volume catalyst feed pot mounted on the autoclave, which pot was thoroughly purged with nitrogen, a mixed solution of 4 ml of dehydrated hexane and 1 mmol of a hexane solution of triisobutyl aluminum (Al=1.0 mol/l) was added and fed into the autoclave by pressurization with nitrogen. Next to the catalyst feed pot, a mixture of 340 mg of the supported catalyst slurry prepared in Example 36c and 1.0 mmol of a hexane solution of triisobutyl aluminum (Al=1.0 M) was added and fed to the autoclave by pressurization with nitrogen, and then polymerization was started. The polymerization was carried out for 10 min, and then a small amount of methanol was added to stop the polymerization. The resulting polymer solution was added into excess amounts of methanol mixed with hydrochloric acid and deashed, and then the polymer precipitated was separated with filtration. Thereafter, the polymer was dried under reduced pressure at 80° C. for 10 hr. The polymer was obtained in an amount of 22.8 g and had a polymerization activity of 151 Kg-Polymer/mmol-Zr hr. In the analysis results, the polymer had an ethylene content of 31 mol %, a [η] value of 2.08 dl/g, a Mw of 255,000 and a Mw/Mn ratio of 2.4.

Example 38c

Propylene/Ethylene Copolymerization

Polymerization was carried out in the same manner as Example 37c except that the internal pressure of the autoclave was set to 35 Kg/cm$^2$ G by pressurization with ethylene gas and the polymerization time was 6 min. The polymer was obtained in an amount of 38.5 g and had a polymerization activity of 427 Kg-Polymer/mmol-Zr·hr. In the analysis results, the polymer had an ethylene content of 42 mol % and a [η] value of 2.57 dl/g, a Mw of 264,000 and a Mw/Mn ratio of 2.4.

Example 39c

Propylene/Ethylene Copolymerization

Polymerization was carried out in the same manner as Example 37c except that the internal pressure of the autoclave was set to 40 Kg/cm$^2$ G by pressurization with ethylene gas and 170 mg of the supported catalyst slurry prepared in Example 36c was used. The polymer was obtained in an amount of 22.9 g and had a polymerization activity of 304 Kg-Polymer/mmol-Zr·hr. In the analysis results, the polymer had an ethylene content of 56 mol % and a [η] value of 3.19 dl/g, a Mw of 339,000 and a Mw/Mn ratio of 2.3.

Example 40c

Preparation of Supported Catalyst

The procedure of Example 36c was repeated except that 0.8 g of silica supported methylaluminoxane (Al=7.04 mmol/g) and 4.8 ml of a toluene solution of 22.1 µmol of diphenylmethylene(3-tert-butyl-5-methyl-cyclopentadienyl)(3,6-di-tert-butyl-fluorenyl)zirconium dichloride were used, and 0.91 g of a powder was obtained. The powder was mixed with 8.08 g of mineral oil to prepare a 10.1 wt % slurry.

Example 41c

Propylene/Ethylene Copolymerization

Polymerization was carried out in the same manner as Example 37c except that 340 mg of the supported catalyst slurry prepared in Example 40c was used a supported catalyst. The polymer was obtained in an amount of 4.8 g and had a polymerization activity of 31 Kg-Polymer/mmol-Zr hr. In the analysis results, the polymer had an ethylene content of 27 mol %, a [η] value of 1.64 dl/g, a Mw of 153,000 and a Mw/Mn ratio of 2.2.

Example 42c

Propylene/Ethylene Copolymerization

Polymerization was carried out in the same manner as Example 37c except that the internal pressure of the autoclave was set to 35 Kg/cm$^2$ G by pressurization with ethylene gas and 340 mg of the supported catalyst slurry prepared in Example 40c was used. The polymer was obtained in an amount of 16.4 g and had a polymerization activity of 106 Kg-Polymer/mmol-Zr·hr. In the analysis results, the polymer had an ethylene content of 40 mol % and a [η] value of 1.68 dl/g, a Mw of 137,000 and a Mw/Mn ratio of 2.4.

Example 43c

Propylene/Ethylene Copolymerization

Polymerization was carried out in the same manner as Example 37c except that the internal pressure of the autoclave was set to 40 Kg/cm$^2$ G by pressurization with ethylene gas and 170 mg of the supported catalyst slurry prepared in Example 40c was used. The polymer was obtained in an amount of 10.8 g and had a polymerization activity of 139 Kg-Polymer/mmol-Zr·hr. In the analysis results, the polymer had an ethylene content of 57 mol % and a [η] value of 2.27 dl/g, a Mw of 195,000 and a Mw/Mn ratio of 2.1.

Example 44c

Preparation of Supported Catalyst

The procedure of Example 36c was repeated except that 1.1 g of silica supported methyl aluminoxane (Al=7.04 mmol/g) and 7.0 ml of a toluene solution of 29.2 μmol of diphenyl methylene(3-tert-butyl-5-methyl-cyclopentadienyl (2,7-di-tert-butyl-fluorenyl)zirconium dichloride were used, and 0.95 g of a powder was obtained. The powder was mixed with 8.51 g of mineral oil to prepare a 10.0 wt % slurry.

Example 45c

Propylene/Ethylene Copolymerization

Polymerization was carried out in the same manner as Example 37c except that 340 mg of the supported catalyst slurry prepared in Example 44c was used as a supported catalyst and the polymerization time was 8 min. The polymer was obtained in an amount of 16.7 g and had a polymerization activity of 136 Kg-Polymer/mmol-Zr·hr. In the analysis results, the polymer had an ethylene content of 34 mol %, a [η] value of 3.49 dl/g, a Mw of 425,000 and a Mw/Mn ratio of 2.2.

Example 46c

Propylene/Ethylene Copolymerization

Polymerization was carried out in the same manner as Example 37c except that the internal pressure of the autoclave was set to 35 Kg/cm$^2$ G by pressurization with ethylene gas and 340 mg of the supported catalyst slurry prepared in Example 44c was used. The polymer was obtained in an amount of 41.7 g and had a polymerization activity of 272 Kg-Polymer/mmol-Zr·hr. In the analysis results, the polymer had an ethylene content of 44 mol % and a [η] value of 3.77 dl/g, a Mw of 466,000 and a Mw/Mn ratio of 2.3.

Example 47c

Propylene/Ethylene Copolymerization

Polymerization was carried out in the same manner as Example 37c except that the internal pressure of the autoclave was set to 40 Kg/cm$^2$ G by pressurization with ethylene gas and 170 mg of the supported catalyst slurry prepared in Example 44c was used. The polymer was obtained in an amount of 12.8 g and had a polymerization activity of 167 Kg-Polymer/mmol-Zr·hr. In the analysis results, the polymer had an ethylene content of 56 mol % and a [η] value of 4.51 dl/g, a Mw of 598,000 and a Mw/Mn ratio of 2.5.

Example 48c

Preparation of Supported Catalyst

The procedure of Example 36c was repeated except that 1.0 g of silica supported methyl aluminoxane (Al=7.04 mmol/g) and 7.7 ml of a toluene solution of 32.7 μmol of di(p-tolyl) methylene(3-tert-butyl-5-methyl-cyclopentadienyl)(fluorenyl)zirconium dichloride were used, and 0.96 g of a powder was obtained. The powder was mixed with 8.53 g of mineral oil to prepare a 10.1 wt % slurry.

Example 49c

Propylene/Ethylene Copolymerization

Polymerization was carried out in the same manner as Example 37c except that 340 mg of the supported catalyst slurry prepared in Example 48c was used as a supported catalyst. The polymer was obtained in an amount of 21.3 g and had a polymerization activity of 122 Kg-Polymer/mmol-Zr·hr. In the analysis results, the polymer had an ethylene content of 37 mol %, a [η] value of 2.68 dl/g, a Mw of 324,000 and a Mw/Mn ratio of 2.3.

Example 50c

Propylene/Ethylene Copolymerization

Polymerization was carried out in the same manner as Example 37c except that the internal pressure of the autoclave was set to 35 Kg/cm$^2$ G by pressurization with ethylene gas and 340 mg of the supported catalyst slurry prepared in Example 48c was used. The polymer was obtained in an amount of 23.9 g and had a polymerization activity of 137 Kg-Polymer/mmol-Zr·hr. In the analysis results, the polymer had an ethylene content of 47 mol % and a [η] value of 2.87 dl/g, a Mw of 318,000 and a Mw/Mn ratio of 2.3.

Example 51c

Propylene/Ethylene Copolymerization

Polymerization was carried out in the same manner as Example 37c except that the internal pressure of the autoclave was set to 40 Kg/cm² G by pressurization with ethylene gas and 170 mg of the supported catalyst slurry prepared in Example 48c was used. The polymer was obtained in an amount of 14.7 g and had a polymerization activity of 169 Kg-Polymer/mmol-Zr hr. In the analysis results, the polymer had an ethylene content of 56 mol % and a [η] value of 3.40 dl/g, a Mw of 373,000 and a Mw/Mn ratio of 2.6.

Example 52c

Preparation of Supported Catalyst

The procedure of Example 36c was repeated except that 1.1 g of silica supported methyl aluminoxane (Al=7.04 mmol/g) and 20 ml of a toluene solution of 21.1 μmol of di(4-tert-butyl-phenyl)methylene(3-tert-butyl-5-methyl-cyclopentadienyl)(fluorenyl)zirconium dichloride synthesized in Example 33C were used, and 0.94 g of a powder was obtained. The powder was mixed with 8.29 g of mineral oil to prepare a 10.1 wt % slurry.

Example 53c

Propylene/Ethylene Copolymerization

Polymerization was carried out in the same manner as Example 37c except that 340 mg of the supported catalyst slurry prepared in Example 52c was used as a supported catalyst. The polymer was obtained in an amount of 32.2 g and had a polymerization activity of 227 Kg-Polymer/mmol-Zr hr. In the analysis results, the polymer had an ethylene content of 25 mol %, a [η] value of 2.05 dl/g, a Mw of 321,000 and a Mw/Mn ratio of 2.3.

Example 54c

Propylene/Ethylene Copolymerization

Polymerization was carried out in the same manner as Example 37c except that the internal pressure of the autoclave was set to 35 Kg/cm² G by pressurization with ethylene gas and 170 mg of the supported catalyst slurry prepared in Example 52c was used. The polymer was obtained in an amount of 17.3 g and had a polymerization activity of 243 Kg-Polymer/mmol-Zr hr. In the analysis results, the polymer had an ethylene content of 39 mol % and a [η] value of 2.90 dl/g, a Mw of 317,000 and a Mw/Mn ratio of 2.2.

Example 55c

Propylene/Ethylene Copolymerization

Polymerization was carried out in the same manner as Example 37c except that the internal pressure of the autoclave was set to 40 Kg/cm² G by pressurization with ethylene gas and 170 mg of the supported catalyst slurry prepared in Example 52c was used. The polymer was obtained in an amount of 27.1 g and had a polymerization activity of 381 Kg-Polymer/mmol-Zr hr. In the analysis results, the polymer had an ethylene content of 56 mol % and a [η] value of 3.03 dl/g, a Mw of 374,000 and a Mw/Mn ratio of 2.4.

Example 56c

Preparation of Supported Catalyst

The procedure of Example 36c was repeated except that 1.0 g of silica supported methyl aluminoxane (Al=7.04 mmol/g) and 20 ml of a toluene solution of 29.2 μmol of di(4-chloro-phenyl) methylene(3-tert-butyl-5-methyl-cyclopentadienyl)(fluorenyl)zirconium dichloride were used, and 0.99 g of a powder was obtained. The powder was mixed with 9.87 g of mineral oil to prepare a 10.0 wt % slurry.

Example 57c

Propylene/Ethylene Copolymerization

Polymerization was carried out in the same manner as Example 37c except that 340 mg of the supported catalyst slurry prepared in Example 56c was used a supported catalyst and the polymerization time was 15 min. The polymer was obtained in an amount of 6.6 g and had a polymerization activity of 26 Kg-Polymer/mmol-Zr·hr. In the analysis results, the polymer had an ethylene content of 28 mol %, a [η] value of 1.71 dl/g, a Mw of 205,000 and a Mw/Mn ratio of 2.6.

Example 58c

Propylene/Ethylene Copolymerization

Polymerization was carried out in the same manner as Example 37c except that the internal pressure of the autoclave was set to 35 Kg/cm² G by pressurization with ethylene gas and 340 mg of the supported catalyst slurry prepared in Example 56c was used. The polymer was obtained in an amount of 8.2 g and had a polymerization activity of 49 Kg-Polymer/mmol-Zr·hr. In the analysis results, the polymer had an ethylene content of 45 mol % and a [η] value of 2.03 dl/g, a Mw of 201,000 and a Mw/Mn ratio of 2.6.

Example 59c

Propylene/Ethylene Copolymerization

Polymerization was carried out in the same manner as Example 37c except that the internal pressure of the autoclave was set to 40 Kg/cm² G by pressurization with ethylene gas and 340 mg of the supported catalyst slurry prepared in Example 56c was used. The polymer was obtained in an amount of 14.7 g and had a polymerization activity of 88 Kg-Polymer/mmol-Zr·hr. In the analysis results, the polymer had an ethylene content of 59 mol % and a [η] value of 2.78 dl/g, a Mw of 234,000 and a Mw/Mn ratio of 2.5.

Example 60c

Preparation of Supported Catalyst

The procedure of Example 36c was repeated except that 1.1 g of silica supported methyl aluminoxane (Al=7.04 mmol/g) and 20 ml of a toluene solution of 29.4 μmol of di(3-trifluoromethyl-phenyl)methylene(3-tert-butyl-5-methyl-cyclopentadienyl)(fluorenyl)zirconium dichloride as a transition metal compound were used, and 0.96 g of a powder was obtained. The powder was mixed with 10.1 g of mineral oil to prepare a 9.6 wt % slurry.

Example 61c

Propylene/Ethylene Copolymerization

Polymerization was carried out in the same manner as Example 37c except that 354 mg of the supported catalyst slurry prepared in Example 60c was used as a supported catalyst. The polymer was obtained in an amount of 6.0 g and had a polymerization activity of 40 Kg-Polymer/mmol-Zr hr. In the analysis results, the polymer had an ethylene content of 31 mol %, a [η] value of 2.05 dl/g, a Mw of 246,000 and a Mw/Mn ratio of 2.9.

Example 62c

Propylene/Ethylene Copolymerization

Polymerization was carried out in the same manner as Example 37c except that the internal pressure of the autoclave was set to 35 Kg/cm$^2$ G by pressurization with ethylene gas and 354 mg of the supported catalyst slurry prepared in Example 60c was used. The polymer was obtained in an amount of 8.1 g and had a polymerization activity of 54 Kg-Polymer/mmol-Zr·hr. In the analysis results, the polymer had an ethylene content of 50 mol % and a [η] value of 3.53 dl/g, a Mw of 322,000 and a Mw/Mn ratio of 2.7.

Example 63c

Propylene/Ethylene Copolymerization

Polymerization was carried out in the same manner as Example 37c except that the internal pressure of the autoclave was set to 40 Kg/cm$^2$ G by pressurization with ethylene gas and 354 mg of the supported catalyst slurry prepared in Example 60c was used. The polymer was obtained in an amount of 5.8 g and had a polymerization activity of 38 Kg-Polymer/mmol-Zr·hr. In the analysis results, the polymer had an ethylene content of 61 mol % and a [η] value of 3.39 dl/g, a Mw of 389,000 and a Mw/Mn ratio of 3.1.

Comparative Example 27c

Preparation of Supported Catalyst

In a 100 ml three-necked flask thoroughly purged with nitrogen, a stirring rod was mounted, and 1.0 g of silica supported methyl aluminoxane (Al=7.04 mmol/g) was added. Therein, 10 ml of dehydrated toluene was added at room temperature and then 20 ml of a toluene solution of 41.0 µmol of dimethylmethylene(3-tert-butyl-5-methyl-cyclopentadienyl)(fluorenyl)zirconium dichloride synthesized in the method disclosed in the pamphlet of WO01/27124 as a transition metal compound was added with stirring and stirred for 1 hr. The resulting slurry was filtered, and a powder present on the filter was washed with 10 ml of dehydrated toluene once and then washed with 10 ml of dehydrated hexane three times. The powder obtained after washing was dried under reduced pressure for 1 hr and 0.91 g of the powder was obtained. The powder was mixed with 8.14 g of mineral oil to prepare a 10.0 wt % slurry.

Comparative Example 28c

Propylene/Ethylene Copolymerization

Into a 2000 ml internal volume SUS-made autoclave thoroughly purged with nitrogen, 0.60 L of liquid propylene was fed and heated to 55° C. while sufficiently stirring. The internal pressure of the autoclave was set to 30 Kg/cm$^2$ G by pressurization with ethylene gas. Successively, to a 30 ml internal volume catalyst feed pot mounted on the autoclave, which pot was thoroughly purged with nitrogen, a mixed solution of 4 ml of dehydrated hexane and 1 ml of a hexane solution of triisobutyl aluminum (Al=1.0 mol/l) was added and fed into the autoclave by pressurization with nitrogen. Next, to the catalyst feed pot, a mixture of 340 mg of the supported catalyst slurry prepared in Comparative Example 27c and 1.0 mmol of a hexane solution of triisobutyl aluminum (Al=1.0 M) was added and fed by pressurization with nitrogen, and then polymerization was started. The polymerization was carried out for 4 min, and then a small amount of methanol was added to stop the polymerization. The resulting polymer was added into excess amounts of methanol mixed with hydrochloric acid and deashed, and then the polymer was separated with filtration. Thereafter, the polymer was dried under reduced pressure at 80° C. for 10 hr. The polymer was obtained in an amount of 18.1 g and had a polymerization activity of 201 Kg-Polymer/mmol-Zr·hr. In the analysis results, the polymer had an ethylene content of 31 mol %, a [η] value of 0.85 dl/g, a Mw of 85,000 and a Mw/Mn ratio of 1.9.

Comparative Example 29c

Propylene/Ethylene Copolymerization

Polymerization was carried out in the same manner as Comparative Example 28c except that the internal pressure of the autoclave was set to 35 Kg/cm$^2$ G by pressurization with ethylene gas, 170 mg of the supported catalyst slurry prepared in Comparative Example 27c was used and the polymerization time was 10 min. The polymer was obtained in an amount of 19.6 g and had a polymerization activity of 174 Kg-Polymer/mmol-Zr hr. In the analysis results, the polymer had an ethylene content of 39 mol % and a [η] value of 1.00 dl/g, a Mw of 74,000 and a Mw/Mn ratio of 2.0.

Comparative Example 30c

Propylene/Ethylene Copolymerization

Polymerization was carried out in the same manner as Comparative Example 28c except that the internal pressure of the autoclave was set to 40 Kg/cm$^2$ G by pressurization with ethylene gas, 170 mg of the supported catalyst slurry prepared in Comparative Example 27c was used and the polymerization time was 10 min. The polymer was obtained in an amount of 29.0 g and had a polymerization activity of 257 Kg-Polymer/mmol-Zr hr. In the analysis results, the polymer had an ethylene content of 49 mol % and a [η] value of 1.00 dl/g, a Mw of 80,000 and a Mw/Mn ratio of 2.1.

Comparative Example 31c

Preparation of Supported Catalyst

The procedure of Comparative Example 27c was repeated except that 1.1 g of silica supported methyl aluminoxane (Al=7.04 mmol/g) and 20 ml of a toluene solution of 32.5 µmol of dimethylmethylene(3-tert-butyl-5-methyl-cyclopentadienyl)(3,6-di-tert-butyl-fluorenyl)zirconium dichloride synthesized in the method disclosed in the pamphlet of WO01/27124, as a transition metal compound were used, and 0.81 g of a powder was obtained. The powder was mixed with 7.30 g of mineral oil to prepare a 10.0 wt % slurry.

Comparative Example 32c

Propylene/Ethylene Copolymerization

Polymerization was carried out in the same manner as Comparative Example 28c except that 340 mg of the supported catalyst slurry prepared in Comparative Example 31c was used as a supported catalyst and the polymerization time was 10 min. The polymer was obtained in an amount of 23.9 g and had a polymerization activity of 141 Kg-Polymer/mmol-Zr·hr. In the analysis results, the polymer had an ethylene content of 30 mol %, a [η] value of 0.61 dl/g, a Mw of 36,000 and a Mw/Mn ratio of 1.8.

Comparative Example 33c

Propylene/Ethylene Copolymerization

Polymerization was carried out in the same manner as Comparative Example 28c except that the internal pressure of the autoclave was set to 35 Kg/cm$^2$ G by pressurization with ethylene gas, 170 mg of the supported catalyst slurry prepared in Comparative Example 31c was used and the polymerization time was 10 min. The polymer was obtained in an amount of 31.0 g and had a polymerization activity of 367 Kg-Polymer/mmol-Zr·hr. In the analysis results, the polymer had an ethylene content of 39 mol % and a [η] value of 0.64 dl/g, a Mw of 41,000 and a Mw/Mn ratio of 1.9.

Comparative Example 34c

Propylene/Ethylene Copolymerization

Polymerization was carried out in the same manner as Comparative Example 28c except that the internal pressure of the autoclave was set to 40 Kg/cm$^2$ G by pressurization with ethylene gas, 170 mg of the supported catalyst slurry prepared in Comparative Example 31c was used and the polymerization time was 0 min. The polymer was obtained in an amount of 9.9 g and had a polymerization activity of 117 Kg-Polymer/mmol-Zr·hr. In the analysis results, the polymer had an ethylene content of 60 mol % and a [η] value of 0.73 dl/g, a Mw of 52,000 and a Mw/Mn ratio of 2.1.

The polymerization results are inclusively shown in Table 6c.

TABLE 6c

| | Transition metal compound | | MAO | Polymerization | Polymerization | |
|---|---|---|---|---|---|---|
| | Kind | Zr concentration [μmol] | Al concentration [mmol] | pressure [Kg/cm$^2$G] | time [min] | Yield [g] |
| *Example* | | | | | | |
| 37c | A | 0.90 | 0.24 | 30 | 10 | 22.8 |
| 38c | A | 0.90 | 0.12 | 35 | 6 | 38.5 |
| 39c | A | 0.45 | 0.12 | 40 | 10 | 22.9 |
| 41c | B | 0.93 | 0.24 | 30 | 10 | 4.8 |
| 42c | B | 0.93 | 0.12 | 35 | 10 | 16.4 |
| 43c | B | 0.47 | 0.12 | 40 | 10 | 10.8 |
| 45c | C | 0.92 | 0.24 | 30 | 8 | 16.7 |
| 46c | C | 0.92 | 0.24 | 35 | 10 | 41.7 |
| 47c | C | 0.46 | 0.12 | 40 | 10 | 12.8 |
| 49c | D | 1.05 | 0.24 | 30 | 10 | 21.3 |
| 50c | D | 1.05 | 0.24 | 35 | 10 | 23.9 |
| 51c | D | 0.52 | 0.12 | 40 | 10 | 14.7 |
| 53c | H | 0.85 | 0.24 | 30 | 10 | 32.2 |
| 54c | H | 0.43 | 0.12 | 35 | 10 | 17.3 |
| 55c | H | 0.43 | 0.12 | 40 | 10 | 27.1 |
| 57c | I | 1.0 | 0.24 | 30 | 15 | 6.6 |
| 58c | I | 1.0 | 0.24 | 35 | 10 | 8.2 |
| 59c | I | 1.0 | 0.24 | 40 | 10 | 14.7 |
| 61c | J | 0.91 | 0.24 | 30 | 10 | 6.0 |
| 62c | J | 0.91 | 0.24 | 35 | 10 | 8.1 |
| 63c | J | 0.91 | 0.24 | 40 | 10 | 5.8 |
| *Comparative Example* | | | | | | |
| 28c | E | 1.35 | 0.24 | 30 | 4 | 18.1 |
| 29c | E | 0.68 | 0.12 | 35 | 10 | 19.6 |
| 30c | E | 0.68 | 0.12 | 40 | 10 | 29.0 |
| 32c | F | 1.01 | 0.24 | 30 | 10 | 23.9 |
| 33c | F | 0.51 | 0.12 | 35 | 10 | 31.0 |
| 34c | F | 0.51 | 0.12 | 40 | 10 | 9.9 |

| | Polymerization activity [kg/mmol-Zr · h] | Ethylene Content in polymer [mol] | [η] [dl/g] | Mw [×10$^3$] | Mw/Mn [—] |
|---|---|---|---|---|---|
| *Example* | | | | | |
| 37c | 151 | 31 | 2.08 | 255 | 2.4 |
| 38c | 427 | 42 | 2.57 | 264 | 2.4 |
| 39c | 304 | 56 | 3.19 | 339 | 2.3 |

TABLE 6c-continued

| | | | | | |
|---|---|---|---|---|---|
| 41c | 31 | 27 | 1.64 | 153 | 2.2 |
| 42c | 106 | 40 | 1.68 | 137 | 2.4 |
| 43c | 139 | 57 | 2.27 | 195 | 2.1 |
| 45c | 136 | 34 | 3.49 | 425 | 2.2 |
| 46c | 272 | 44 | 3.77 | 466 | 2.3 |
| 47c | 167 | 56 | 4.51 | 598 | 2.5 |
| 49c | 122 | 37 | 2.68 | 324 | 2.3 |
| 50c | 137 | 47 | 2.87 | 318 | 2.3 |
| 51c | 169 | 56 | 3.40 | 373 | 2.6 |
| 53c | 227 | 25 | 2.05 | 321 | 2.3 |
| 54c | 243 | 39 | 2.90 | 317 | 2.2 |
| 55c | 381 | 56 | 3.03 | 374 | 2.4 |
| | | Example Ex | | | |
| 57c | 26 | 28 | 1.71 | 205 | 2.6 |
| 58c | 49 | 45 | 2.03 | 201 | 2.6 |
| 59c | 88 | 59 | 2.78 | 234 | 2.5 |
| | | Example | | | |
| 61c | 40 | 31 | 2.05 | 246 | 2.9 |
| 62c | 54 | 50 | 3.53 | 322 | 2.7 |
| 63c | 38 | 61 | 3.39 | 389 | 3.1 |
| | | Comparative Example Com | | | |
| 28c | 201 | 31 | 0.85 | 85 | 1.9 |
| 29c | 174 | 39 | 1.00 | 74 | 2.0 |
| 30c | 257 | 49 | 1.00 | 80 | 2.1 |
| | | Comparative Example | | | |
| 32c | 141 | 30 | 0.61 | 36 | 1.8 |
| 33c | 367 | 39 | 0.64 | 41 | 1.9 |
| 34c | 117 | 60 | 0.73 | 52 | 2.1 |

Polymerization conditions: Liquid propylene 300 g, Temperature 55° C. or higher, Triisobutyl aluminum 1.0 × 2 mmol.
Transition metal compound A: Diphenylmethylene(3-tert-butyl-5-methyl-cyclopentadienyl)(fluorenyl)zirconium dichloride
Transition metal compound B: Diphenylmethylene(3-tert-butyl-5-methyl-cyclopentadienyl)(3,6-di-tert-butyl-fluorenyl)zirconium dichloride
Transition metal compound C: Diphenylmethylene(3-tert-butyl-5-methyl-cyclopentadienyl)(2,7-di-tert-butyl-fluorenyl)zirconium dichloride
Transition metal compound D: Di(p-tolyl)methylene(3-tert-butyl-5-methyl-cyclopentadienyl)(fluorenyl)zirconium dichloride
Transition metal compound E: Dimethylmethylene(3-tert-butyl-5-methyl-cyclopentadienyl)(fluorenyl)zirconium dichloride
Transition metal compound F: Dimethylmethylene(3-tert-butyl-5-methyl-cyclopentadienyl)(3,6-di-tert-butyl-fluorenyl)zirconium dichloride
Transition metal compound H: Di(4-tert-butyl-phenyl)methylene(3-tert-butyl-5-methyl-cyclopentadienyl)(fluorenyl)zirconium dichloride
Transition metal compound I: Di(4-chloro-phenyl)methylene(3-tert-butyl-5-methyl-cyclopentadienyl)(fluorenyl)zirconium dichloride
Transition metal compound J: Di(3-trifluoromethyl-phenyl)methylene(3-tert-butyl-5-methyl-cyclopentadienyl)(fluorenyl)zirconium dichloride Example 64c Propylene Bulk Polymerization Polymerization was carried out in the same conditions as Example 27c except that 680 mg of the supported catalyst slurry prepared in Example 44c was used. The polymer obtained was 62 g of isotactic polypropylene and had a polymerization activity of 51 Kg-PP/mmol-Zr·hr. In the analysis results, the polymer had a [η] value of 3.28 dl/g, a Mw of 566,000 and a Mw/Mn ratio of 2.8 and a Tm of 144.8° C.

Example 65c

Propylene Bulk Polymerization

Polymerization was carried out in the same conditions as Example 28c except that 340 mg of the supported catalyst slurry prepared in Example 44c was used. The polymer obtained was 124 g of isotactic polypropylene and had a polymerization activity of 203 Kg-PP/mmol-Zr·hr. In the analysis results, the polymer had a [η] value of 1.03 dl/g, a Mw of 94,000 and a Mw/Mn ratio of 2.3 and a Tm of 146.2° C.

Example 66c

Propylene Bulk Polymerization

Polymerization was carried out in the same conditions as Example 27c except that 1020 mg of the supported catalyst slurry prepared in Example 48c was used. The polymer obtained was 78 g of isotactic polypropylene and had a polymerization activity of 37 Kg-PP/mmol-Zr·hr. In the analysis results, the polymer had a [η] value of 3.03 dl/g, a Mw of 553,000 and a Mw/Mn ratio of 3.2 and a Tm of 139.5° C.

Example 67c

Propylene Bulk Polymerization

Polymerization was carried out in the same conditions as Example 28c except that 340 mg of the supported catalyst slurry prepared in Example 48c was used. The polymer obtained was 52 g of isotactic polypropylene and had a polymerization activity of 75 Kg-PP/mmol-Zr·hr. In the analysis results, the polymer had a [η] value of 1.05 dl/g, a Mw of 97,000 and a Mw/Mn ratio of 2.3 and a Tm of 142.1° C.

Example 68c

Propylene Bulk Polymerization

Polymerization was carried out in the same conditions as Example 27c except that 1020 mg of the supported catalyst slurry prepared in Example 52c was used. The polymer obtained was 125 g of isotactic polypropylene and had a polymerization activity of 73 Kg-PP/mmol-Zr·hr. In the analysis results, the polymer had a [η] value of 2.93 dl/g, a Mw of 366,000 and a Mw/Mn ratio of 2.7 and a Tm of 141.0° C.

Example 69c

Propylene Bulk Polymerization

Polymerization was carried out in the same conditions as Example 28c except that 340 mg of the supported catalyst slurry prepared in Example 52c was used. The polymer obtained was 137 g of isotactic polypropylene and had a polymerization activity of 241 Kg-PP/mmol-Zr·hr. In the analysis results, the polymer had a [η] value of 1.09 dl/g, a Mw of 85,000 and a Mw/Mn ratio of 2.3 and a Tm of 142.6° C.

Example 70c

Propylene Bulk Polymerization

Polymerization was carried out in the same conditions as Example 27c except that 1020 mg of the supported catalyst slurry prepared in Example 56c was used. The polymer obtained was 34 g of isotactic polypropylene and had a polymerization activity of 17 Kg-PP/mmol-Zr·hr. In the analysis results, the polymer had a [η] value of 3.46 dl/g, a Mw of 547,000 and a Mw/Mn ratio of 2.7 and a Tm of 137.2° C.

Example 71c

Propylene Bulk Polymerization

Polymerization was carried out in the same conditions as Example 28c except that 340 mg of the supported catalyst slurry prepared in Example 56c was used. The polymer obtained was 15 g of isotactic polypropylene and had a polymerization activity of 23 Kg-PP/mmol-Zr·hr. In the analysis results, the polymer had a [η] value of 1.10 dl/g, a Mw of 113,000 and a Mw/Mn ratio of 2.3 and a Tm of 140.3° C.

Example 72c

Propylene Bulk Polymerization

Polymerization was carried out in the same conditions as Example 27c except that 980 mg of the supported catalyst slurry prepared in Example 60c was used. The polymer obtained was 29 g of isotactic polypropylene and had a polymerization activity of 18 Kg-PP/mmol-Zr·hr. In the analysis results, the polymer had a [η] value of 3.60 dl/g, a Mw of 613,000 and a Mw/Mn ratio of 3.2 and a Tm of 141.7° C.

Example 73c

Propylene Bulk Polymerization

Polymerization was carried out in the same conditions as Example 28c except that 355 mg of the supported catalyst slurry prepared in Example 60c was used. The polymer obtained was 41 g of isotactic polypropylene and had a polymerization activity of 68 Kg-PP/mmol-Zr hr. In the analysis results, the polymer had a [η] value of 1.04 dl/g, a Mw of 107,000 and a Mw/Mn ratio of 2.4 and a Tm of 146.7° C. The polymerization results are inclusively shown in Table 7c.

TABLE 7c

| | Transition metal compound | | MAO | Polymerization | | |
|---|---|---|---|---|---|---|
| | Kind | Zr concentration [μmol] | Al concentration [mmol] | Hydrogen [Nl] | time [min] | Yield [g] |
| Exa | | | | | | |
| 64c | C | 1.84 | 0.48 | — | 40 | 62 |
| 65c | C | 0.92 | 0.24 | 0.3 | 40 | 124 |
| 66c | D | 3.14 | 0.72 | — | 40 | 78 |
| 67c | D | 1.05 | 0.24 | 0.3 | 40 | 52 |
| Ex | | | | | | |
| 68c | H | 2.55 | 0.72 | — | 40 | 125 |
| 69c | H | 0.85 | 0.24 | 0.3 | 40 | 137 |
| 70c | I | 3.01 | 0.72 | — | 40 | 34 |
| 71c | I | 1.00 | 0.24 | 0.3 | 40 | 15 |
| 72c | J | 2.50 | 0.66 | — | 40 | 29 |
| 73c | J | 0.91 | 0.24 | 0.3 | 40 | 41 |

TABLE 7c-continued

|  | Polymerization activity [kg/mmol-Zr · h] | [η] [dl/g] | Mw [×10³] | Mw/Mn [—] | Tm [° C.] |
|---|---|---|---|---|---|
| | | Example | | | |
| 64c | 51 | 3.28 | 566 | 2.8 | 144.8 |
| 65c | 203 | 1.03 | 94 | 2.3 | 146.2 |
| 66c | 37 | 3.03 | 553 | 3.2 | 139.5 |
| 67c | 75 | 1.05 | 97 | 2.3 | 142.1 |
| 68c | 73 | 2.93 | 366 | 2.7 | 141.0 |
| 69c | 241 | 1.09 | 85 | 2.3 | 142.6 |
| 70c | 17 | 3.46 | 547 | 2.7 | 137.2 |
| 71c | 23 | 1.10 | 113 | 2.3 | 140.3 |
| 72c | 18 | 3.60 | 613 | 3.2 | 141.7 |
| 73c | 68 | 1.04 | 107 | 2.4 | 146.7 |

Polymerization conditions: Liquid propylene 500 g, Temperature 70° C., Triisobutyl aluminum 1.0 mmol.
Transition metal compound C: Diphenylmethylene(3-tert-butyl-5-methyl-cyclopentadienyl)(2,7-di-tert-butyl-fluorenyl)zirconium dichloride
Transition metal compound D: Di(p-tolyl)methylene(3-tert-butyl-5-methyl-cyclopentadienyl)(fluorenyl)zirconium dichloride
Transition metal compound H: Di(4-tert-butyl-phenyl)methylene(3-tert-butyl-5-methyl-cyclopentadienyl)(fluorenyl)zirconium dichloride
Transition metal compound I: Di(4-chloro-phenyl)methylene(3-tert-butyl-5-methyl-cyclopentadienyl)(fluorenyl)zirconium dichloride
Transition metal compound J: Di(3-trifluoromethyl-phenyl)methylene(3-tert-butyl-5-methyl-cyclopentadienyl)(fluorenyl)zirconium dichloride Examples and Comparative Examples of the polyolefin resin composition (CC-3) are described blow.

Example 1d

Synthesis of Metallocene Compound

Synthesis of dimethylmethylene(3-tert-butyl-5-methylcyclopentadienyl)(3,6-di-tert-butylfluorenyl)zirconium dichloride In accordance with the examples disclosed in the pamphlet of WO01/27124, dimethylmethylene(3-tert-butyl-5-methyl-cyclopentadienyl)(3,6-di-tert-butylfluorenyl)zirconium dichloride was prepared.

Synthesis of dimethylsilylene bis(2-methyl-4-phenylindenyl) zirconium dichloride In accordance with the method disclosed in Organometallics, 13, 954 (1994), dimethylsilylene bis(2-methyl-4-phenylindenyl) zirconium dichloride was synthesized.

Preparation of Silica Supported Methyl Aluminoxane

To a 500 ml volume reactor thoroughly purged with nitrogen, 20 g of silica (Asahi glass Co., Ltd. Trade Name H-121 dried at 150° C. under nitrogen for 4 hr) and 200 ml of toluene were fed and then 60 ml of methyl aluminoxane (Albemar Co., Ltd. 10 wt % toluene solution) was added dropwise in a nitrogen atmosphere with stirring. After the reaction of this mixture at 110° C. for 4 hr, the reaction system was allowed to stand for cool to precipitate a solid component. The supernatant liquid was removed by decantation. Successively, the solid component was washed with toluene three times and with hexane three times to prepare a silica supported methyl aluminoxane.

Production of Polyolefin Resin Composition (CC-3)

To a 20 L volume autoclave thoroughly purged with nitrogen, 20 mmol in terms of aluminum of silica supported methyl aluminoxane was fed and suspended in 500 ml of heptane. Subsequently, to the suspension, a toluene solution of 54 mg (0.088 mmol) of dimethylmethylene(3-tert-butyl-5-methyl cyclopentadienyl)(3,6-di-tert-butylfluorenyl)zirconium dichloride was added, and then triisobutyl aluminum (80 mmol) was added and stirred for 30 min to prepare a catalyst suspension.

To a 20 L internal volume autoclave thoroughly purged with nitrogen, 5 Kg of propylene and 3 L of hydrogen were fed and the above catalyst suspension was added, and bulk homopolymerization was carried out at 70° C. under a pressure of from 3.0 to 3.5 Mpa for 40 min. After completion of the homopolymerization, the vent valve was opened and the unreacted propylene was vented until the pressure inside the polymerization reactor was to atmospheric pressure. The yield of the propylene polymer part (PP-C-i) thus prepared was 2.05 Kg. The polymer part (PP-C-i) had a MFR (ASTM D1238, 230° C., 2.16 Kg load) of 36 g/10 min, a melting point (Tm) of 158° C., a weight average molecular weight (Mw) of 1400,000, a number average molecular weight (Mn) of 70,000 and a Mw/Mn ratio of 2.0. Further, concerning to stereo-regularity, the polymer part had a mmmm fraction of 95.8%, and 2,1-insertion and 1,3-insertion were not detected.

To a 20 L internal volume autoclave thoroughly purged with nitrogen, the catalyst suspension was added and copolymerization of ethylene and propylene was carried out. That is, an ethylene/propylene mixed gas (ethylene 25 mol %, propylene 75 mol %) was continuously fed and polymerization was carried out at 70° C. for 120 min, while the opening of the vent valve of the polymerization reactor was regulated so that the pressure of the polymerization reactor was 1 Mpa. Adding a small amount of methanol, the polymerization was stopped and unreacted gas in the polymerizer was purged. The yield of the elastomer (EL-i) thus prepared was 0.65 Kg. The elastomer (EL-i) had an intrinsic viscosity [η], as measured in decalin at 135° C., of 2.2 dl/g, and an ethylene content of 75 mol %. The elastomer (EL-i) had a weight average molecular weight (Mw) of 195,000, an number average molecular weight (Mn) of 90,000 and a Mw/Mn ratio of 2.2. Further, 2,1-insertion based on propylene monomer was not detected.

Production of Polyolefin Resin Composition

The propylene polymer part (PP-C-i) thus prepared, the elastomer (EL-i), an inorganic filler (C-i) [talc, manufactured by Hayashi Chemical Co., Ltd, K-1 (Trade Mark), average particle diameter 2 µm], Irganox 1010™ [antioxidant manufactured by Ciba Geigy], Irgafos 168™ [antioxidant manufactured by Ciba Geigy], ADK-STAB LA-52™ [hindered amine stabilizer, molecular weight=847 manufactured by Asahi Denka Co., Ltd] and calcium stearate were mixed in the proportion as shown in Table 1d by a tumbler mixer, and thereafter melt-kneaded by a twi-screw extruder and pelletized.

The polyolefin resin composition (I) thus prepared was injection molded using a injection molding machine [manufactured by Niigata Iron Works Co., Ltd, AN100] into a flat plate (100 mm×300 mm×3 mm thick) and flow marks were observed. Further, using a injection molding machine (manufactured by Toshiba Machine Co., Ltd, IS100), an ASTM specimen was injection molded and the various physical properties thereof were measured. The results are shown in Table 1d.

The methods for measuring the physical properties are as follows.

Tensile Properties

With regard to tensile properties, a tensile test was carried out in accordance with ASTM D638-84 and the tensile elongation was measured in the following conditions.

| <Test conditions> | |
|---|---|
| Test specimen: | ASTM D 638-84 No. 1 dumbbell |
| Chuck distance: | 114 mm |
| Temperature: | 23° C. |
| Tensile rate: | 10 mm/min |

Flexural Properties

With regard to flexural properties, a flexural test was carried out in the following conditions in accordance with ASTM D-790 to determine the flexural modulus.

| <Test conditions> | |
|---|---|
| Test specimen: | 6.4 mm (thickness) × 12.7 mm (width) × 127 mm (length) |
| Spun distance: | 100 mm |
| Bending rate: | 2 mm/min |
| Measuring temperature: | 23° C. |

Izod Impact Strength

With respect to Izod impact strength, an impact test was carried out in the following conditions in accordance with ASTM D-256.

| <Test conditions> | |
|---|---|
| Test specimen: | 12.7 mm (width) × 6.4 mm (thickness) × 64 mm (length) |

| -continued | |
|---|---|
| <Test conditions> | |
| Notch: | machining |
| Measuring temperature: | 23° C. |

Gloss

The gloss was determined at an angel of incidence of 60° and angle of detection of 60° in accordance with ASTM D523

The specimen for the flow mark observation and ASTM test was injection molded in the following conditions.

| <Injection molding conditions> | |
|---|---|
| Resin temperature: | 230° C. |
| Mold temperature: | 40° C. |
| Injection time: | 5 sec |
| Pressure holding time: | 5 sec |
| Cooling time: | 25 sec |

Example 2d

To a 20 L internal volume autoclave thoroughly purged with nitrogen, 5 Kg of propylene and 3 L of hydrogen were fed and the catalyst suspension used in Example 1d was added, and bulk homopolymerization was carried out at 70° C. under a pressure of from 3.0 to 3.5 Mpa for 40 min. After completion of the homopolymerization, the vent valve was opened and the unreacted propylene was vented until the pressure inside the polymerization reactor was to atmospheric pressure. After completion of the pressure release, in succession, copolymerization of ethylene and propylene was carried out. That is, an ethylene/propylene mixed gas (ethylene 25 mol %, propylene 75 mol %) was continuously fed and polymerization was carried out at 70° C. for 60 min, while the opening of the vent valve of the polymerization reactor was regulated so that the pressure of the polymerization reactor was 1 Mpa. Adding a small amount of methanol, the polymerization was stopped and unreacted gas in the polymerization reactor was purged. The yield of the polyolefin resin composition (ii) thus prepared was 2.9 Kg. The propylene polymer part (PP-C-ii) in the composition was in an amount of 2.10 Kg, and had a MFR (ASTM D 1238, 230° C., 2.16 Kg load) of 42 g/10 min, a melting point (Tm) of 158° C., a weight average molecular weight (Mw) of 140,000, an number average molecular weight (Mn) of 70,000 and a Mw/Mn ratio of 2.0. Further, concerning to stereo-regularity of the propylene homopolymer part(PP-C-ii), the polymer part had a mmmm fraction of 95.7%, and 2,1-insertion and 1,3-insertion were not detected. The elastomer (EL-ii) in the composition was in an amount of 0.70 Kg, and had an intrinsic viscosity [η], as measured in decalin at 135° C., of 2.3 dl/g, and an ethylene content of 78 mol %. The elastomer (EL-ii) had a weight average molecular weight (Mw) of 200,000, an number average molecular weight (Mn) of 90,000 and a Mw/Mn ratio of 2.2. Further, 2,1-insertion based on propylene monomer was not detected.

The determinations of the amount, composition, molecular weight and stereo-regularity of the polymers prepared in each steps were carried out in the following manner. Firstly, the polyolefin resin composition (ii) was heat-treated with n-decane at 150° C. for 2 hr, and cooled to room temperature. Thereafter, the solid component precipitated was filtered. The resulting solid component was taken as the propylene polymer part (PP-C-ii). Further, the filtrate was concentrated and dried under reduced pressure to prepare a solid component. The solid component was taken as the elastomer (EL-ii). With regard to each of the components, various analyses were carried out according to conventional methods.

Production of Polyolefin Resin Composition (II)

The polyolefin resin composition (ii) thus prepared, an inorganic filler (C-ii) [talc, manufactured by Hayashi Chemical Co., Ltd, K-1™, average particle diameter 2 μm], Irganox 1010™ [antioxidant manufactured by Ciba Geigy], Irgafos 168™ [antioxidant manufactured by Ciba Geigy], ADK-STAB LA-52™ [hindered amine type light stabilizer, molecular weight=847 manufactured by Asahi Denka Co., Ltd] and calcium stearate were mixed in the proportion as shown in Table 1d by a tumbler mixer, and thereafter melt-kneaded by a twin-screw extruder and thereby pelletized.

The polyolefin resin composition (II) thus prepared was injection molded using a injection molding machine [manufactured by Niigata Iron Works Co., Ltd, AN100] into a flat plate (100 mm×300 mm×3 mm thick) and flow marks were observed. Further, using a injection molding machine (manufactured by Toshiba Machine Co., Ltd, IS100), an ASTM specimen was injection molded and the various physical properties thereof were measured. The results are shown in Table 1d.

Comparative Example 1d

The procedure of Example 1d was repeated except that as a metallocene compound, 70 mg of dimethylsilylene bis(2-methyl-4-phenylindenyl)zirconium dichloride was used, and thereby 1.99 Kg of a propylene polymer part (PP-C-iii) and 0.66 Kg of an elastomer (EL-iii) were obtained.

The propylene polymer part (PP-C-iii) thus prepared had, a MFR(ASTM D 1238, 230° C., 2.16 Kg load) of 40 g/10 min, a melting point (Tm) of 150° C., a weight average molecular weight (Mw) of 141,000, an number average molecular weight (Mn) of 60,000 and a Mw/Mn ratio of 2.3. Further, concerning to stereo-regularity of the propylene homopolymer part, the polymer part had a mmmm fraction of 95.9%, and the proportion of 2,1-insertion was 0.80% and the proportion of 1,3-insertion was 0.05%.

The elastomer (EL-iii) thus prepared had an intrinsic viscosity [η], as measured in decalin at 135° C., of 2.3 dl/g, and an ethylene content of 55 mol %. The elastomer (EL-iii) had a weight average molecular weight (Mw) of 203,000, an number average molecular weight (Mn) of 97,000 and a Mw/Mn ratio of 2.1. Further, the proportion of 2,1-insertion based on propylene monomer was 1.1%.

Production of Polyolefin Resin Composition (III)

The procedure of Example 1d was repeated except for using the propylele polymer part (PP-C-iii) and the elastomer (EL-iii), to prepare a polyolefin resin composition (III).

The physical properties of the polyolefin resin composition (III) thus prepared were evaluated. The results are shown in Table 1d.

Comparative Example 2d

A commercially available propylene/ethylene block copolymer prepared by using a magnesium chloride supported titanium catalyst (Ziegler-Natta catalyst) [Trade Name J708 Grand Polymer Co., Ltd.,] had the following physical properties.

The propylene homopolymer part of the propylene/ethylene block copolymer had a melting point (Tm) of 160° C., a MFR (ASTM D 1238, 230° C., 2.16 Kg load) of 40 g/10 min, a Mw/Mn ratio of 4.4 and a decane soluble component amount of 11.5 wt %. The n-decane soluble component had an intrinsic viscosity [η], as measured in decalin at 135° C., of 2.8 dl/g. In the decane insoluble component, with regard to the stereo-regularity of the polymer, the mmmm fraction was 96.5% and 2,1-insertion and 1,3-insertion were not detected.

Using the propylene block copolymer, a polyolefin resin composition was produced in the same procedure as Example 1d. The physical properties thereof were evaluated. The results are shown in Table 1d.

TABLE 1d

|  |  | Example | | Compara. Ex. | |
| --- | --- | --- | --- | --- | --- |
|  |  | 1d | 2d | 1d | 2d |
| Polyolefin resin composition (CC-3) <Composition> |  | [I] | [II] | [III] |  |
| Propylene polymer (PP-C) | wt % | 61 | 58 | 60 | 71 |
| Elastomer | wt % | 19 | 22 | 20 | 9 |
| Inorganic filler [Talc] | wt % | 20 | 20 | 20 | 20 |
| Irganox 1010 | phr | 0.1 | 0.1 | 0.1 | 0.1 |
| Irgafos 168 | phr | 0.1 | 0.1 | 0.1 | 0.1 |
| Calcium stearate | phr | 0.1 | 0.1 | 0.1 | 0.1 |
| ADK-STAB LA-52 | phr | 0.1 | 0.1 | 0.1 | 0.1 |
| Results of property evaluation | | | | | |
| Melt flow rate | g/10 min | 38 | 41 | 40 | 40 |
| Tensile elongation | % | >500 | >500 | >500 | >500 |
| Flexual modulus | Mpa | 1680 | 1620 | 1700 | 2000 |
| Izod impact strength (23° C.) | J/m | 55 | 58 | 58 | 40 |
| Flow marks | Observation | A | A | C | B-C |
| Gloss | % | 84 | 85 | 75 | 78 |

Note 1:
When flow marks were not observed, the molded article was indicated by A. When flow marks were slightly observed, the molded article was indicated by B. When flow marks were significantly observed, the molded article was indicated by C.
Note 2:
The unit of additive (phr) was based on the total amount of the propylene polymer, the elastomer and the inorganic filler.

Examples of the propylene elastomers (PBER) are described below.

[Tensile Test]

1. Modulus in Tension:

The modulus in tension was measured in accordance with JIS K6301, using a JIS No. 3 dumbell, at a spun distance of 30 mm, a tensile rate of 30 mm/min at 23° C.

[Haze (%)]

The haze was measured using a 1 mm thick specimen by means of a digital turbidity meter [NDH-20D] manufactured by Nippon Denshoku Kogyo Co., Ltd.

[Melting Point (Tm) and Glass Transition Temperature (Tg)]

The endothermic curve of DSC was determined and the temperature at the most peak position was taken as Tm.

In the measurement, a specimen was packed in an aluminum pan, heated to 200° C. at an elevating rate of 100° C./min, and kept at 200° C. for 5 min. Thereafter the specimen was cooled to −150° C. at a cooling rate of 10° C./min and then heated at an elevating rate of 10° C./min. In the temperature elevating, the temperature was determined from the endothermic curve. In measuring DSC, from the endothermic peak, the amount of heat of fusion per unit weight was determined, and then the amount was divided by the amount of heat of fusion of polyethylene crystal 70 cal/g to determine a crystallinity (%).

[Intrinsic viscosity [η]]

The intrinsic viscosity was measured in decalin at 135° C.

[Mw/Mn]

The Mw/Mn ratio was measured using a GPC(Gel permeation chromatography) with ortho-dichloro benzene solvent at 140° C.

Example 1e

Synthesis of Propylene Elastomer (PBER) (Hereinafter Occasionally Referred to as Propylene/Ethylene/Butene Copolymer)

To a 2000 ml polymerization reactor thoroughly purged with nitrogen, 833 ml of dried hexane, 100 g of 1-butene and triisobutyl aluminum (1.0 mmol) were fed at room temperature. Thereafter, the internal temperature of the polymerization reactor was elevated to 40° C., the pressure in the system was set to 0.76 Mpa by pressurization with propylene and the pressure in the system was regulated to 0.8 Mpa with ethylene. Subsequently, a toluene solution prepared by allowing 0.001 mmol of dimethylmethylene (3-tert-butyl-5-methylcyclopentadienyl)fluorenyl zirconium dichloride to contact with 0.3 mmol, in terms of aluminum, of methyl aluminoxane (manufactured by Tosoh Finechem Corporation) was added to the polymerization reactor and polymerized for 20 min while the internal temperature was kept to 40° C. and the system pressure was kept to 0.8 Mpa with ethylene. Adding 20 ml of methanol, the polymerization was stopped. The pressure was released, and then a polymer was precipitated from the polymerization solution in 2 L of methanol and dried at 130° C. in vacuo for 12 hr. The polymer was obtained in an amount of 46.4 g and had an intrinsic viscosity [η] of 1.81 dl/g. The physical properties of the resulting polymer were measured and were shown in Table 1e.

Example 2e

Synthesis of Propylene/Ethylene/Butene Copolymer

To a 2000 ml polymerization reactor thoroughly purged with nitrogen, 883 ml of dried hexane, 70 g of 1-butene and triisobutyl aluminum (1.0 mmol) were fed at room temperature. Thereafter, the internal temperature of the polymerization reactor was elevated to 40° C., the pressure in the system was set to 0.76 Mpa by pressurization with propylene and the pressure in the system was regulated to 0.8 Mpa with ethylene. Subsequently, a toluene solution prepared by allowing 0.001 mmol of dimethylmethylene (3-tert-butyl-5-methylcyclopentadienyl)fluorenyl zirconium dichloride to contact with 0.3 mmol in terms of aluminum of methyl aluminoxane (manufactured by Tosoh Finechem Corporation) was added to the polymerization reactor and polymerized for 30 min while the internal temperature was kept to 40° C. and the system pressure was kept to 0.8 Mpa with ethylene. Adding 20 ml of methanol, the polymerization was stopped. The pressure was released, and then a polymer was precipitated from the polymerization solution in 2 L of methanol and dried at 130° C. in vacuo for 12 hr. The polymer was obtained in an amount of 53.1 g and had an intrinsic viscosity [η] of 1.82 dl/g. The physical properties of the resulting polymer were measured and were shown in Table 1e.

Example 3e

Synthesis of propylene/Ethylene/Butene Copolymer

To a 2000 ml polymerization reactor thoroughly purged with nitrogen, 917 ml of dried hexane, 50 g of 1-butene and triisobutyl aluminum (1.0 mmol) were fed at room temperature. Thereafter, the internal temperature of the polymerizer was elevated to 70° C., the pressure in the system was set to 0.76 Mpa by pressurization with propylene and the pressure in the system was regulated to 0.78 Mpa with ethylene. Subsequently, a toluene solution prepared by allowing 0.002 mmol of diphenylmethylene (3-tert-butyl-5-methylcyclopentadienyl)(2,7-di-tert-butyl-fluorenyl)zirconium dichloride to contact with 0.6 mmol in terms of aluminum of methyl aluminoxane (manufactured by Tosoh Finechem Corporation) was added to the polymerization reactor and polymerized for 30 min while the internal temperature was kept to 70° C. and the system pressure was kept to 0.78 Mpa with ethylene. Adding 20 ml of methanol, the polymerization was stopped. The pressure was released, and then a polymer was precipitated from the polymerization solution in 2 L of methanol and dried at 130° C. in vacuo for 12 hr. The polymer was obtained in an amount of 67.6 g and had an intrinsic viscosity [η] of 1.42 dl/g. The physical properties of the resulting polymer were measured and were shown in Table 1e.

Example 4e

Synthesis of Propylene/Ethylene/Butene Copolymer

To a 2000 ml polymerization reactor thoroughly purged with nitrogen, 859 ml of dried hexane, 85 g of 1-butene and triisobutyl aluminum (1.0 mmol) were fed at room temperature. Thereafter, the internal temperature of the polymerization reactor was elevated to 65° C., the pressure in the system was set to 0.76 Mpa by pressurization with propylene and the pressure in the system was regulated to 0.77 Mpa with ethylene. Subsequently, a toluene solution prepared by allowing 0.002 mmol of diphenylmethylene (3-tert-butyl-5-methylcyclopentadienyl)(2,7-di-tert-butyl-fluorenyl)zirconium dichloride to contact with 0.6 mmol in terms of aluminum of methyl aluminoxane (manufactured by Tosoh Finechem Corporation) was added to the polymerization reactor and polymerized for 30 min while the internal temperature was kept to 65° C. and the system pressure was kept to 0.77 Mpa with ethylene. Adding 20 ml of methanol, the polymerization was stopped. The pressure was released, and then a polymer was precipitated from the polymerization solution in 2 L of methanol and dried at 130° C. in vacuo for 12 hr. The polymer was obtained in an amount of 67.6 g and had an intrinsic viscosity [α] of 1.42 dl/g. The physical properties of the resulting polymer were measured and were shown in Table 1e.

Comparative Example 1e

Synthesis of Crystalline Propylene/Ethylene/Butene Copolymer

To a 1.5 L autoclave which had been dried under reduced pressure and purged with nitrogen, 675 ml of heptane was fed at room temperature. Subsequently, a 1.0 mmol/ml toluene solution of triisobutyl aluminum (hereinafter abbreviated as TIBA) was added in an amount of 0.3 ml i.e., in terms of aluminum atom of 0.3 mmol to the autoclave and then 28.5 L (25° C., 1 atm) of propylene and 10 L (25° C., 1 atm) of 1-butene were fed with stirring, and the temperature was elevated to 60° C. Thereafter, the internal system was pressurized to be 6.0 Kg/cm$^2$G with ethylene, and 7.5 ml of a toluene solution (0.0001 mM/ml) of rac-dimethylsilylene-bis (2-methyl-4-phenyl-1-indenyl) zirconium dichloride and 2.3 ml of a toluene solution (0.001 mM/ml) of triphenylcarbenium tetra(pentafluorophenyl)borate, which were synthesized in the conventionally known methods were added to start copolymerization of propylene, ethylene and 1-butene. In the copolymerization, based on the overall system, the catalyst concentration of rac-dimethylsilylene-bis(2-methyl-4-phenyl-1-indenyl) zirconium dichloride was 0.001 mmol/L and that of triphenylcarbenium tetra(pentafluoro-phenyl)borate was 0.003 mmol/L.

During the polymerization, ethylene was continuously fed and thereby the internal pressure was kept to 6.0 Kg/cm$^2$ G. After 15 min from the beginning of polymerization, the polymerization was stopped by adding methyl alcohol. The pressure was released and a polymer solution was taken out and washed with an aqueous solution prepared by adding 5 ml of concentrated hydrochloric acid to 1 L of water, in such an amount that the proportion of the polymer solution and the aqueous solution was 1:1. The catalyst residue was transferred to a water phase. The catalyst mixed solution was allowed to stand and the water phase was removed by separation. Further, the remainder was washed with distilled water twice to separate the polymerization liquid phase into oil and water. Next, the polymerization liquid phase was allowed to contact with 3 times the amount of acetone with vigorous stirring to precipitate a polymer. Thereafter, the polymer was sufficiently washed with acetone and the solid part (copolymer) was collected by filtration. The copolymer was dried in a stream of nitrogen at 130° C. at 350 mmHg for 12 hr. The propylene/butene/ethylene copolymer was obtained in a yield of 24 g and had an intrinsic viscosity [η] as measured in decalin at 135° C. of 1.9 dl/g. The physical properties of the resulting polymer were measured and were shown in Table 1e.

random copolymer and the propylene/1-butene random copolymer according to the present invention have excellent balance of transparency, flexibility and heat-seal properties. Further, the stretched films therefrom have excellent shrinking properties. Therefore, they are suitable for use as sheets or films for packaging food and the like.

The sheets and films prepared by the polypropylene compositions (CC-2, CC-3) containing the propylene/1-butene random copolymer and the propylene/1-butene random copolymer according to the present invention have excellent transparency, flexibility, blocking resistance and heat-seal properties. Particularly, they can be heat-sealed even at low temperatures so that they can be heat-sealed in a wide temperature range, and further have excellent heat-seal strength. Additionally even after long-term storage, the heat-seal temperature thereof is not changed with time and the stable heat-sealability is secured. The stretched films obtainable by stretching the above sheets or films have excellent heat-seal properties, blocking properties and shrinking properties.

The sheets, films and stretched films according to the present invention, further, have excellent transparency, scratching resistance and blocking resistance and can perform high-speed packaging. Therefore, they are suitably used for food packaging, packed wrapping, fiber packaging and other uses.

The transition metal compound having ligand such that a cyclopentadienyl group having substituent groups at two positions not adjacent each other and a fluorenyl group are bridged with a carbon atom substituted with an aryl group according to the present invention are novel and useful as an olefin polymerization catalyst component.

The use of the olefin polymerization catalyst containing the transition metal compound can give a process for producing an olefin copolymer having a high molecular weight.

The polyolefin resin composition (CC-3) of the present invention contains a specific propylene polymer (PP-C) and specific elastomer (EL) in a specific proportion so that it can prepare molded products (including injection molded prod- TABLE 1e

| Item | Ex. 1e | Ex. 2e | Ex. 3e | Ex. 4e | Com. Ex. 1e |
|---|---|---|---|---|---|
| Propylene elastomer [PBER] (Isotactic propylene/ ethylene/butene copolymer) | | | | | |
| C2 (mol %) | 17 | 13 | 18 | 10 | 10 |
| C4 (mol %) | 9 | 7 | 10 | 17 | 15 |
| C3/C2 (molar ratio) | 81/19 | 86/14 | 80/20 | 88/12 | 88/12 |
| [η] (dl/g) | 1.81 | 1.82 | 1.42 | 1.78 | 1.9 |
| Tm (° C.) | Not observed | Not observed | Not observed | Not observed | Not observed |
| Tg (° C.) | −27.6 | −26.9 | −29.3 | −23.9 | −25.1 |
| Mw/Mn | 2.2 | 2.1 | 2.2 | 2.1 | 2.4 |
| Modulus in tension (YM) (Mpa) | 2 | 10 | 7 | 10 | 42 |
| Transparency (Haze) (%) | 5 | 5 | 7 | 9 | 19 |

INDUSTRIAL APPLICABILITY

The sheets and films prepared by the polypropylene compositions (CC-2, CC-3) containing the propylene/1-butene ucts) having excellent balance in tensile strength, flexural modulus and impact resistance and excellent mechanical strength, high gloss and good appearance such that flow marks are hardly induced, or even if induced, flow marks are not prominent.

The polyolefin resin compositions of the present invention are suitably used in preparing various molded products typically in injection molded products by making use of the above properties.

What is claimed is:

1. A polypropylene composition comprising:
   5 to 95 wt % of polypropylene (PP-A)
   and
   95 to 5 wt % of a propylene/1-butene random copolymer (PBR) comprising:
   (1) 60 to 90 mol % of units derived from propylene and 10 to 40 mol % of units derived from 1-butene,
   and having
   (2) a triad isotacticity, as determined from a $^{13}$C-NMR spectrum, of not less than 85% and not more than 97.5%,
   (3) a molecular weight distribution (Mw/Mn), as determined by gel permeation chromatography (GPC), of from 1 to 3,
   (4) an intrinsic viscosity, as measured in decalin at 135° C., of from 0.1 to 12 dl/g,
   (5) a melting point (Tm), as measured on a differential scanning calorimeter, of from 40 to 66.5° C. and a crystallization rate (½ crystallization time) at 45° C. of 10 minutes or less, and satisfying
   (6) the following relation $$146 \exp(-0.022 M) \geq Tm \geq 125 \exp(-0.032 M)$$

wherein Tm represents a melting point and M (mol %) represents a content of 1-butene constituent units.

2. A sheet or film comprising a polypropylene composition as claimed in claim 1.

3. A stretched film obtainable by stretching a sheet or film as claimed in claim 2 in at least one direction.

* * * * *